(12) United States Patent
Inatani et al.

(10) Patent No.: US 7,313,800 B2
(45) Date of Patent: Dec. 25, 2007

(54) DISK CENTERING SYSTEM

(75) Inventors: Akihisa Inatani, Kanagawa (JP); Yasuo Osada, Saitama (JP); Toshimasa Takahashi, Tokyo (JP); Yasuhiro Suda, Tokyo (JP); Hiromu Watanabe, Tokyo (JP); Yutaka Shimada, Tokyo (JP); Shuji Koseki, Tokyo (JP); Yuji Sudo, Tochigi (JP)

(73) Assignee: Sony Corporation, Tokyo (JP)

( * ) Notice: Subject to any disclaimer, the term of this patent is extended or adjusted under 35 U.S.C. 154(b) by 484 days.

(21) Appl. No.: 10/824,947

(22) Filed: Apr. 15, 2004

(65) Prior Publication Data

US 2005/0022221 A1 Jan. 27, 2005

(30) Foreign Application Priority Data

Apr. 18, 2003 (JP) ............................. 2003-114264
Jun. 9, 2003 (JP) ............................. 2003-163793

(51) Int. Cl.
*G11B 17/04* (2006.01)

(52) U.S. Cl. ..................................... 720/704

(58) Field of Classification Search ................ 720/704
See application file for complete search history.

(56) References Cited

U.S. PATENT DOCUMENTS

| | | | | |
|---|---|---|---|---|
| 5,054,016 | A | * | 10/1991 | d'Alayer et al. ............. 720/704 |
| 5,097,460 | A | * | 3/1992 | Camps et al. ................ 720/621 |
| 5,940,550 | A | | 8/1999 | Plickert et al. |
| 6,376,765 | B1 | | 4/2002 | Wariishi et al. |
| 6,586,670 | B2 | | 7/2003 | Yoshikawa |
| 6,602,998 | B2 | | 8/2003 | Kobuke et al. |
| 6,766,817 | B2 | | 7/2004 | Silva |

(Continued)

FOREIGN PATENT DOCUMENTS

EP      1 058 260 A1    12/2000

(Continued)

OTHER PUBLICATIONS

Uchida, Satoshi, "Application of Titania Nanotubes to A Dye-Sensitized Solar Cell," Electrochemistry, Jun. 2002, vol. 70, No. 6, pp. 418-420.

(Continued)

*Primary Examiner*—Allen Cao
(74) *Attorney, Agent, or Firm*—Wolf, Greenfield and Sacks, P.C.

(57) ABSTRACT

A disk centering system includes: a disk mount portion having a disk mount surface on which a disk form recording medium is to be mounted, the disk mount portion being provided with a predetermined reference point; and at least three disk centering portions for pressing the outer circumferential edge of the disk form recording medium, the disk centering portions being located in radial directions with the reference point as a center, wherein each of the disk centering portions can be moved between a centering position at which the disk centering portion makes contact with the outer circumferential edge of the disk form recording medium mounted on the disk mount surface to thereby center the disk form recording medium and a stand-by position located on the outer side relative to the centering position, and the centering positions are located at an equal distance from the reference point in the radial directions with the reference point as a center.

12 Claims, 55 Drawing Sheets

U.S. PATENT DOCUMENTS

| | | |
|---|---|---|
| 6,911,595 B2 | 6/2005 | Yoshikawa et al. |
| 6,993,776 B2 * | 1/2006 | Yamanaka et al. .......... 720/623 |
| 2002/0015881 A1 | 2/2002 | Nakamura |
| 2002/0031080 A1 | 3/2002 | Inoue |
| 2003/0099182 A1* | 5/2003 | Maeda et al. .............. 369/77.1 |
| 2003/0107984 A1* | 6/2003 | Yamaguchi ................. 369/270 |
| 2003/0161244 A1* | 8/2003 | Yamanaka et al. ......... 369/77.1 |
| 2003/0183271 A1 | 10/2003 | Ikeda et al. |
| 2004/0251508 A1 | 12/2004 | Tomita |
| 2005/0050564 A1* | 3/2005 | Araki ......................... 720/623 |
| 2005/0160446 A1* | 7/2005 | Okazawa et al. ........... 720/738 |
| 2005/0218467 A1 | 10/2005 | Tomita |
| 2005/0224112 A1 | 10/2005 | Tokita et al. |
| 2006/0048812 A1 | 3/2006 | Tomita |
| 2006/0080685 A1* | 4/2006 | Kasuga ....................... 720/600 |
| 2006/0084257 A1 | 4/2006 | Tokita |
| 2006/0107994 A1 | 5/2006 | Morooka et al. |
| 2006/0112988 A1 | 6/2006 | Morooka |
| 2006/0137739 A1 | 6/2006 | Imoto et al. |

FOREIGN PATENT DOCUMENTS

| | | |
|---|---|---|
| EP | 1 100 086 A2 | 5/2001 |
| EP | 1 152 418 A1 | 11/2001 |
| EP | 1 156 488 A2 | 11/2001 |
| EP | 1 431 971 A1 | 6/2004 |
| JP | 52-105801 | 9/1977 |
| JP | 57-86106 | 5/1982 |
| JP | 60-131670 | 7/1985 |
| JP | 62-219363 | 9/1987 |
| JP | 62-229566 | 10/1987 |
| JP | 1-140739 | 6/1989 |
| JP | 2-8039 | 1/1990 |
| JP | 2-135930 | 11/1990 |
| JP | 4-81226 | 7/1992 |
| JP | 05-28541 | 2/1993 |
| JP | 07-211766 | 8/1995 |
| JP | 09-290340 | 11/1997 |
| JP | 10-255863 A | 9/1998 |
| JP | 10-320844 | 12/1998 |
| JP | 11-354169 A | 12/1999 |
| JP | 2000-100001 A | 4/2000 |
| JP | 2000-106222 A | 4/2000 |
| JP | 2000-195569 A | 7/2000 |
| JP | 2000-231942 A | 8/2000 |
| JP | 2000-268460 A | 9/2000 |
| JP | 2000-285975 A | 10/2000 |
| JP | 2001-93591 A | 4/2001 |
| JP | 2001-143771 A | 5/2001 |
| JP | 2001-253883 A | 9/2001 |
| JP | 2002-8740 A | 1/2002 |
| JP | 2002-8741 A | 1/2002 |
| JP | 2002-25635 A | 1/2002 |
| JP | 2002-175843 A | 6/2002 |
| JP | 2002-222971 A | 8/2002 |
| JP | 2002-289269 A | 10/2002 |
| JP | 2002-289274 A | 10/2002 |
| JP | 2002-319689 A | 10/2002 |
| JP | 2002-352868 A | 12/2002 |
| JP | 2002-352869 A | 12/2002 |
| JP | 2002-352870 A | 12/2002 |
| JP | 2002-353432 A | 12/2002 |

OTHER PUBLICATIONS

Adachi, Mononari, "Dye-Sensitized Solar Cells Using Semiconductor Thin Film Composed of Titania Nanotubes," Electrochemistry, Jun. 2002, vol. 70, No. 6, pp. 449-452.

Adachi, Motonari, "Formation, Characterization, and Functions of Ceramic Nanotubes," Transactions of the Materials Research Society of Japan, Sep. 2002, vol. 27, No. 3, pp. 505-508.

Ngamsinlapasathian, S., "Titania Nanotube o Mochiiru Shikiso Zokan Taiyodenchi no Kokoritsuka," The Society of Chemical Engineers, Japan Dai 35 Kai Shuki Taikai Kenkyu Happyo Koen Yoshishu, Aug. 2002, p. 843.

Ngamsinlapasathian, S., "Higher Efficiency in Dye-Sensitized Solar Cells Using Titania Nanotube,"2002 Nen Denki Kagaku Shuki Taikai Koen Yoshishu, Sep. 2002, p. 138.

Adachi, M., "Formation of Titanium Oxide Nanotubes and Application to Dye-Sensitized Solar Cells," The Electrochemical Society of Japan Dai 68 Kai Taikai Koen Yoshishu, Mar. 2001, p. 112.

Murata, Y., The Synthetic Conditions of Titania Nanotubes Using Template of Molecular Assemblies, CSJP: The Chemical Society of Japan Dai 82 Shuki Nenkai Koen Yokoshu, Sep. 2002, p. 178.

E-mail form Silva, E ; "U.S. Appl. No. 20060107994—Requesting IDS of 6,766,817"; May 25, 2006.

E-mail from Silva, E ; "U.S. Appl. No. 20050016578—Requesting IDS of 6,766,817"; May 25, 2006.

* cited by examiner

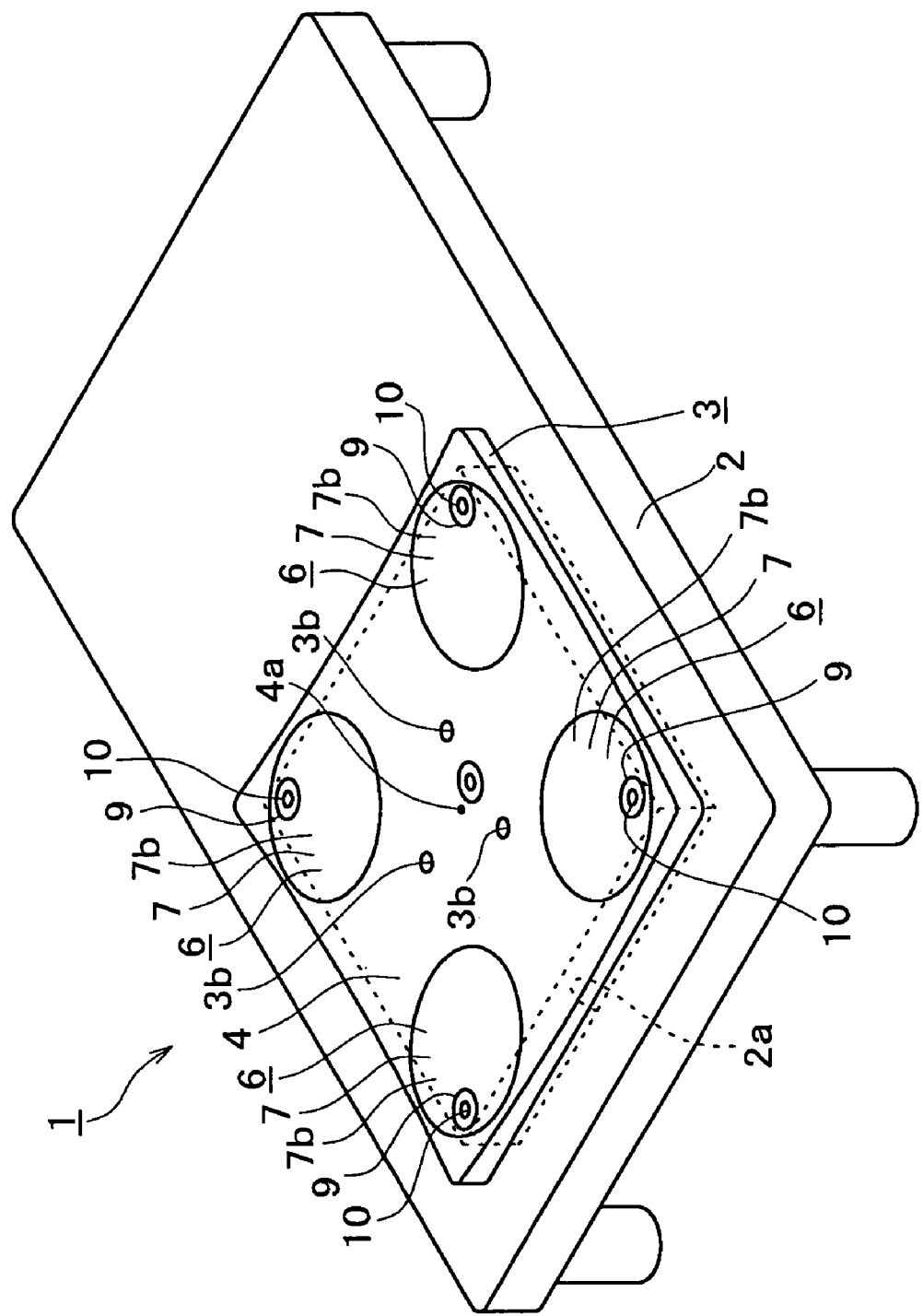

F I G. 3 1
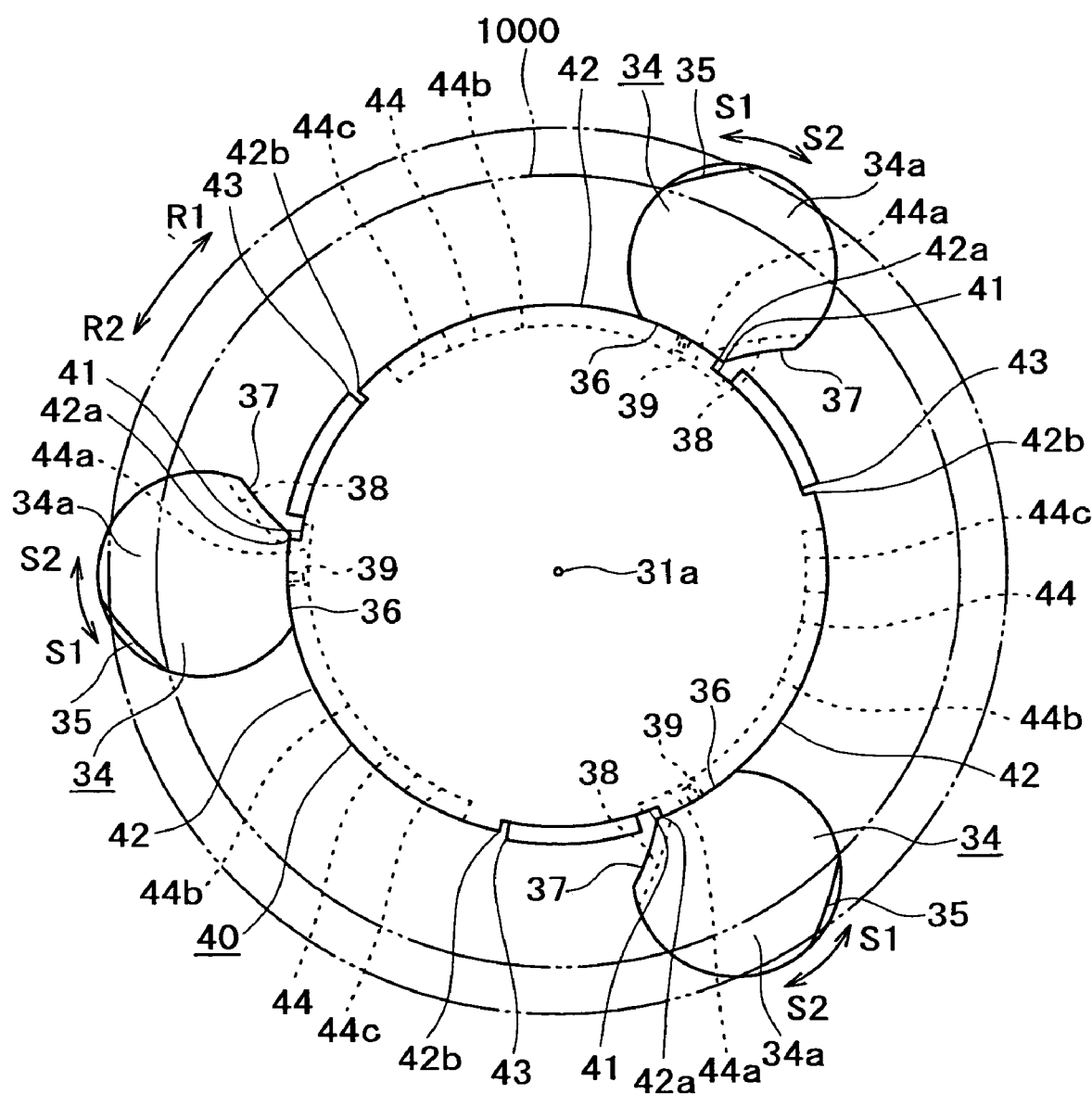

F I G. 3 5
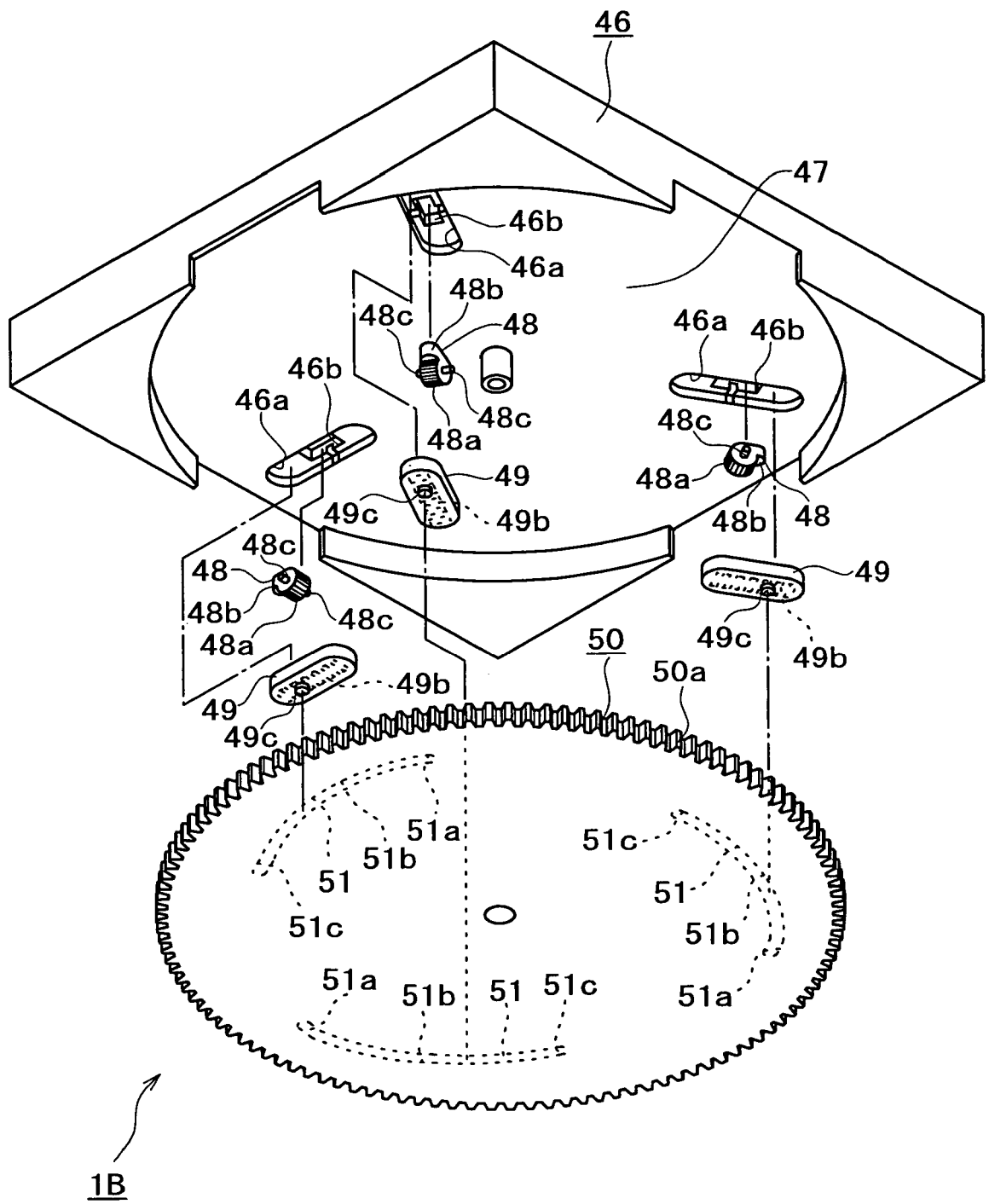

DISK CENTERING SYSTEM

BACKGROUND OF THE INVENTION

The present invention relates to a disk centering system. More particularly, the present invention relates to a technical field in which a disk form recording medium is centered by a plurality of disk centering members for pressing the outer circumferential edge of the disk form recording medium, whereby the disk form recording medium can be centered irrespectively of the size thereof and can be handled with enhanced ease.

Among disk drives capable of recording and/or reproduction of information signals onto and/or from a disk form recording medium such as an optical disk and a magneto-optical disk, there are those which are provided with a disk centering system for centering the disk form recording medium and which can perform recording and/or reproduction of information signals onto and/or from both the disk form recording media about 8 cm in diameter and the disk form recording media about 12 cm in diameter.

The disk centering systems provided in such disk drives include the following types.

A first type is a tray-type disk centering system including a disk tray which is supported on an outer casing of the disk drive so that it can be drawn out.

In the tray-type disk centering system, the disk tray is concentrically provided with a recessed portion for mounting a disk form recording medium about 8 cm in diameter and a recessed portion for mounting a disk form recording medium about 12 cm in diameter. When the disk tray with the disk form recording medium about 8 cm in diameter or the disk form recording medium about 12 cm in diameter being mounted in the relevant recessed portion is drawn into the inside of the outer casing and moved to a predetermined centering position, the disk form recording medium is mounted onto a disk table at the centering position. The recessed portions for mounting are formed to be slightly larger than the diameters of the respective disk form recording media.

A second type is a slot-in type disk centering system in which a disk form recording medium is inserted through a disk insertion port formed in the outer casing of the disk drive (see, for example, Japanese Patent Laid-open No. Hei 10-255366).

In the slot-in type disk centering system, when a disk form recording medium is inserted through the disk insertion port and fed into the inside of the outer casing by feeding rollers, the disk form recording medium is centered by a disk centering mechanism, and the disk form recording medium thus centered is mounted onto a disk table.

However, the conventional disk centering systems involve the following problems.

In the tray-type disk centering system, it is necessary to provide the disk tray with the recessed portions corresponding respectively to the sizes of the disk form recording media. On the other hand, there is a limitation as to the number of the recessed portions which can be formed in the disk tray. Therefore, the sizes (diameters) of the disk form recording media which can be mounted onto the disk table are limited.

In the slot-in type disk centering system, the sizes of the disk form recording media which can be used with the system are predetermined, and the size of the disk form recording medium drawn into the inside of the outer casing is detected mechanically or electrically, before the disk form recording medium is mounted onto the disk table. Thus, again, the kinds (sizes) of the disk form recording media which can be mounted onto the disk table are limited.

However, in view of the enhancement of the recording density on disk form recording media and the progress of variety of disk form recording media in the future, it is highly possible that disk form recording media with various diameter values will be commercialized, in addition to the disk form recording media about 8 cm or about 12 cm in diameter. It is impossible to cope with the disk form recording media having various diameter values by use of the conventional disk centering systems.

In addition, in the tray-type disk centering system, the difference in size between the recessed portion and the corresponding disk form recording medium is slight. Therefore, it is necessary to mount the disk form recording medium into the recessed portion with highly accurate alignment, which leads to a troublesome handling of the disk form recording medium.

Further, in the slot-in type disk centering system, also, it is necessary to insert each disk form recording medium into the disk insertion port with no positional misalignment therebetween, which leads to a troublesome handling of the disk form recording medium. Besides, in the slot-in type disk centering system, both sides of the disk form recording medium are clamped between a pair of rollers when the disk form recording medium is fed into the inside of the disk drive, so that the disk form recording medium may be scratched or damaged due to the contact thereof with the rollers.

On the other hand, among the disk drives, there are those in which a disk table is provided with engagement claws capable of elastic deformation in radial directions, and the inner circumferential edge of the disk form recording medium is pressed against the engagement claws to elastically deform the engagement claws at the time of mounting the disk form recording medium onto the disk table. In such a disk drive, since the inner circumferential edge of the disk form recording medium is pressed against the engagement claws, there is the problem that the inner circumferential edge of the disk form recording medium may be damaged or the disk form recording medium may be deformed.

SUMMARY OF THE INVENTION

The present invention has been made for solving the above-mentioned problems involved in the prior art. Accordingly, it is an object of the present invention to provide a disk centering system which makes it possible for disk form recording media to be centered irrespectively of the size thereof and to be handled with enhanced ease.

In order to attain the above object, in accordance with one aspect of the present invention, there is provided a disk centering system including: a disk mount portion on which a disk form recording medium is mounted; and at least three disk centering portions for pressing the outer circumferential edge of the disk form recording medium, the disk centering portions being disposed in radial directions, with a reference point set at an arbitrary position of the disk mount portion as a center, wherein each of the disk centering portions can be moved between a centering position at which the disk centering portion makes contact with the outer circumferential edge of the disk form recording medium mounted on a disk mount surface so that the center of rotation of the disk form recording medium substantially coincides with the reference point and a stand-by position located on the outer side of the centering position with reference to the reference point.

In the disk centering system as above, the disk form recording medium is centered when the disk centering portions are moved from the stand-by positions set on the outer side to the centering positions set on the inner side.

Besides, the disk form recording medium can be mounted at an arbitrary position in a predetermined range on the disk mount surface, the disk form recording medium can be handled easily by the operator, and the convenience in use of the disk centering system is enhanced.

In the disk centering system as above; the centering positions are preferably spaced by an equal distance from the reference point in the radial directions with the reference point as a center. In this case, since the centering positions are spaced by an equal distance from the reference point in the radial directions with the reference point as a center and the disk form recording medium is centered when the disk centering portions are moved from the stand-by positions to the centering positions, the disk form recording medium can be centered irrespectively of the size thereof.

Further, the disk centering system is free of the trouble that the inner circumferential portion of the disk form recording medium might be scratched or damaged, which would occur in the case of mounting a disk form recording medium to a centering portion of a disk table provided with engagement claws.

In the disk centering system, the disk centering portions may be moved between the centering positions and the stand-by positions by rotating the disk centering portion. This ensures that, when the disk centering portions make contact with the outer circumferential edge of the disk form recording medium, the burden exerted from the disk centering portions on the disk form recording medium is slight, and the outer circumferential edge of the disk form recording medium can be prevented from being broken or damaged.

In the disk centering system, the disk centering portions may be moved between the centering positions and the stand-by positions by moving the disk centering portions rectilinearly in the radial directions. This makes it possible to center the disk form recording medium swiftly.

In the disk centering system, preferably, the disk mount surface is formed as a recessed curved surface. In this case, it is possible to prevent the lower surface, or recording surface, of the disk form recording medium from being scratched.

In the disk centering system, preferably, the disk centering portions are so supported as to be movable in substantially the same direction as the center axis of the disk form recording medium mounted on the disk mount surface, and the disk centering portions are retracted into the inside of the disk mount portion when located at the stand-by positions and are projected from the disk mount surface when moved from the stand-by positions toward the centering positions. This ensures that, when the disk form recording medium is mounted onto the disk mount surface, the disk form recording medium does not contact with the disk centering portions, and the disk form recording medium is therefore prevented from being scratched.

In the disk centering system, preferably, the plurality of disk centering portions are moved synchronously with each other. In this case, it is possible to perform an efficient operation and to simplify the mechanism.

The disk centering system may further includes a disk lift-up portion supported on the disk mount portion so as to be movable in substantially the same direction as the center axis of the disk form recording medium mounted on the disk mount surface, the disk lift-up portion lifting up the centered disk form recording medium to a chucking position for chucking of the disk form recording medium by being moved in a direction for spacing away from the disk mount surface. In this case, preferably, the disk lift-up portion is moved upwards together with the disk centering portions so as thereby to lift up the centered disk form recording medium to the chucking position for chucking of the disk form recording medium. This configuration makes it possible to chuck the disk form recording medium easily.

In the disk centering system as just-mentioned, the disk lift-up portion and the disk centering portions may be formed as one body with each other. With this configuration, it is possible to reduce the number of component parts and to reduce the manufacturing cost.

The disk centering system as mentioned in the preceding paragraph may be provided in a disk drive including a disk chucking mechanism for chucking the disk form recording medium at the chucking position, wherein the disk lift-up portion is moved downwards when the chucking of the disk form recording medium by the disk chucking mechanism at the chucking position is canceled. With this configuration, the disk form recording medium can be taken out in the condition where a predetermined space is formed between the disk form recording medium and the disk mount surface.

In accordance with another aspect of the present invention, there is provided a recording and/or reproduction system including: a disk mount portion on which a disk form recording medium is mounted; at least three disk centering portions for pressing the outer circumferential edge of the disk form recording medium, the disk centering portions being provided in radial directions, with a reference point set at an arbitrary position of the disk mount portion as a center, and each of the disk centering portions being movable between a centering position at which the disk centering portion makes contact with the outer circumferential edge of the disk form recording medium mounted on a disk mount surface so that the center of rotation of the disk form recording medium substantially coincides with the reference point and a stand-by position located on the outer side of the centering position with reference to the reference point; and a recording and/or reproduction portion for recording and/or reproduction of information onto and/or from the disk form recording medium.

The recording and/or reproduction system as above may further include: a disk chucking mechanism for chucking the disk form recording medium at a chucking position; and a disk lift-up portion supported on the disk mount portion so as to be movable in substantially the same direction as the center axis of the disk form recording medium mounted on a disk mount surface, the disk lift-up portion being for feeding the disk form recording medium between the centering position and the chucking position, wherein the recording and/or reproduction portion performs recording and/or reproduction of information onto and/or from the disk form recording medium chucked at the chucking position.

The above and other objects, features and advantages of the present invention will become apparent from the following description and appended claims, taken in conjunction with the accompanying drawings which show by way of example some preferred embodiments of the invention.

BRIEF DESCRIPTION OF THE DRAWINGS

FIG. 1, together with FIGS. 2 to 21, illustrates a first embodiment of the present invention, in which FIG. 1 is a schematic side view of a disk drive provided with a disk centering system;

FIG. 3 is a perspective view of the disk centering system;

FIG. 9, together with FIGS. 10 to 21, illustrates the operations of the disk centering system, in which FIG. 9 is a plan view showing the condition before a centering operation is performed;

FIG. 22, together with FIGS. 23 to 34, illustrates a second embodiment of the present invention, in which FIG. 22 is an exploded perspective view of a disk centering system;

FIG. 26, together with FIGS. 27 to 34, illustrates the operations of the disk centering system, in which FIG. 26 is a plan view showing the condition before a centering operation is performed;

FIG. 31 is a plan view showing the condition where the centering of the disk form recording medium has been completed;

FIG. 35, together with FIGS. 36 to 45, illustrates a third embodiment of the present invention, in which FIG. 35 is an exploded perspective view of a disk centering system;

FIG. 39, together with FIGS. 40 to 45, illustrates the operations of the disk centering system, in which FIG. 39 is a plan view showing the condition before a centering operation is performed;

FIG. 46, together with FIGS. 47 to 55, illustrates a fourth embodiment of the present invention, in which FIG. 46 is an exploded perspective view of a disk centering system;

FIG. 49, together with FIGS. 50 to 55, illustrates the operations of the disk centering system, in which FIG. 49 is a plan view showing the condition before a centering operation is performed;

DETAILED DESCRIPTION OF THE PREFERRED EMBODIMENTS

Figure 1:
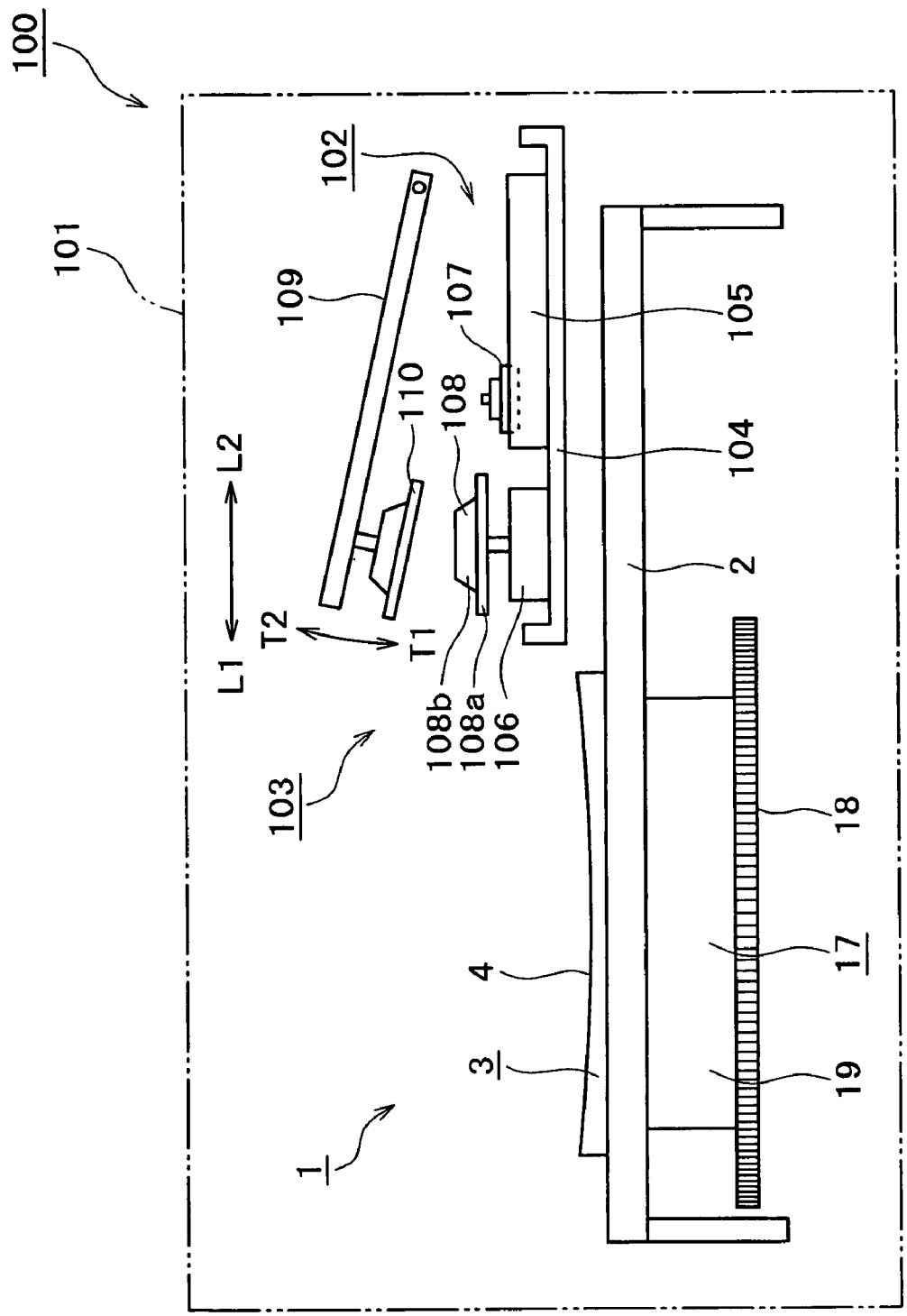

Now, some embodiments of the disk centering system according to the present invention will be described below, referring to the accompanying drawings.

First, a first embodiment of the disk centering system will be described (see FIGS. 1 to 21).

The disk centering system 1 is provided, for example, as a part of a disk drive 100, which includes required members and mechanisms arranged in the inside of an outer casing 101. The disk drive 100 is provided with a disk recording and reproduction portion 102, a disk chucking mechanism 103 and the like, in addition to the disk centering system 1.

The disk recording and reproduction portion 102 includes an arrangement base 104 and a base chassis 105 and a spindle motor 106 which are arranged on the arrangement base 104, with a light pickup 107 supported on the base chassis 105 so as to be movable in a predetermined direction.

The disk chucking mechanism 103 includes a disk table 108 fixed to the motor shaft of the spindle motor 106, a pulley support member 109 turnably supported on a support (not shown), and a chucking pulley 110 supported by the pulley support member 109. The disk table 108 includes a table portion 108a, and a centering projected portion 108b projected from a central portion of the table portion 108a, with a metallic plate embedded in the centering projected portion 108b. The chucking pulley 110 includes a magnet (not shown) which is supported at a tip end portion of the pulley support member 109 so as to be rotatable and movable in the axial direction and which attracts the metallic plate embedded in the centering projected portion 108b.

Figure 2:
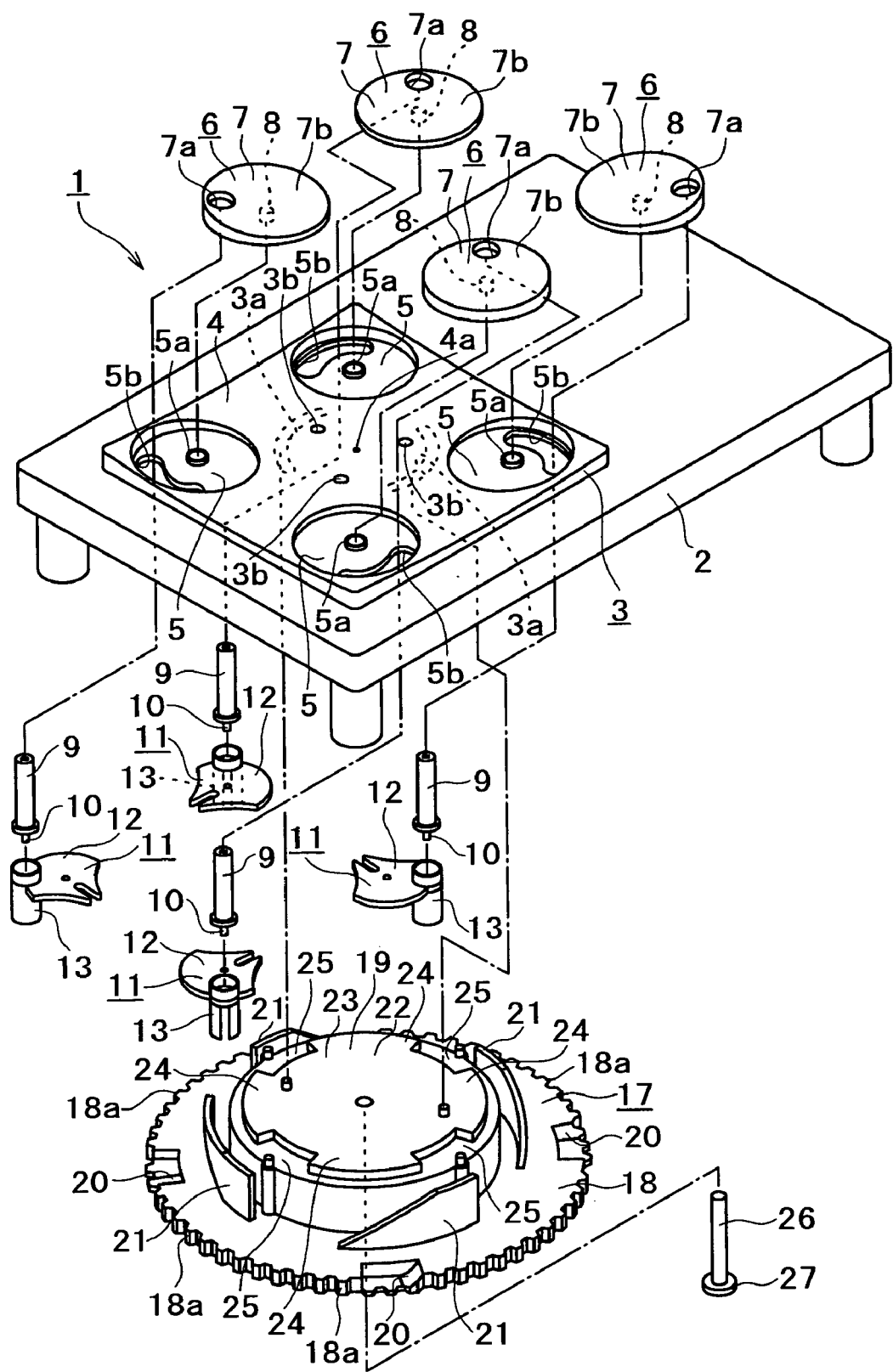
FIG. 2 is an exploded perspective view of the disk centering system.

The disk centering system 1 includes predetermined members arranged or supported on a base plate 2 (see FIGS. 2 and 3). The base plate 2 is provided with an arrangement hole 2a.

Figure 4:
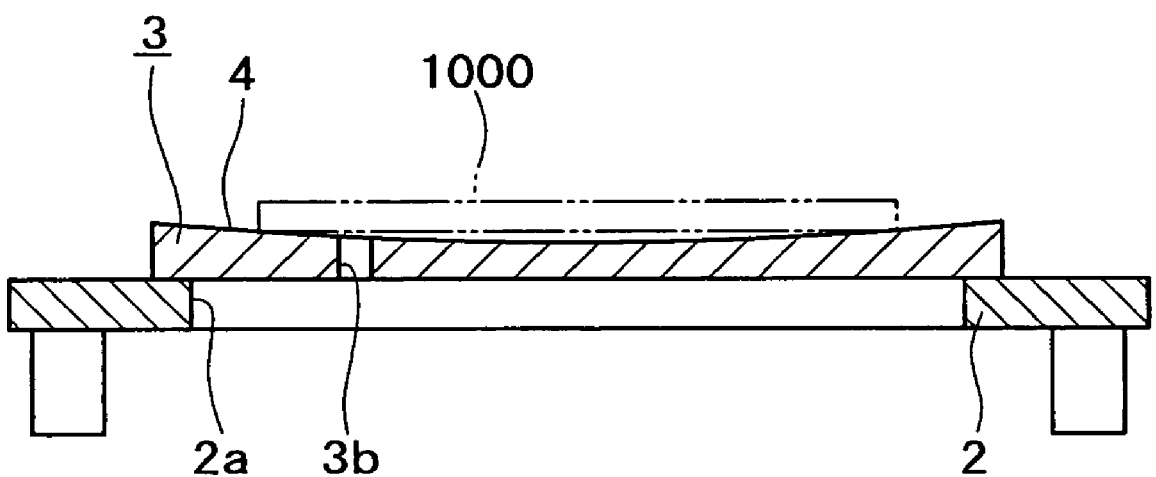
FIG. 4 is a schematic sectional view showing the condition where a disk form recording medium is mounted on a disk mount surface.

A substantially plate-like disk mount member 3 with a substantially square outside shape is mounted to the base plate 2 so as to cover the arrangement hole 2a. As shown in FIG. 4, the top face of the disk mount member 3 is formed to be a gentle recessed curved surface, for example, a gentle spherical surface, to constitute a disk mount surface 4 on which a disk form recording medium 1000 is to be mounted. Therefore, in the condition where the disk form recording medium 1000 is mounted on the disk mount surface 4, a gap is generated between the disk form recording medium 1000 and the disk mount surface 4, and the lower surface (recording surface) of the disk form recording medium 1000 does not make contact with the disk mount surface 4.

The center point of the disk mount surface 4 is formed as a reference point 4a which is located at the lowest position (see FIGS. 2 and 3), and the four corners of the disk mount surface 4 are located at the uppermost positions.

The disk mount member 3 is provided in its four corner portions with circular support recessed portions 5, 5, . . . opened to the upper side (see FIG. 2). Support holes 5a, 5a, . . . are provided respectively in central portions of the support recessed portions 5, 5, . . . , and insertion holes 5b, 5b, . . . formed in a circular arc shape with the support portions 5a, 5a, . . . as centers are provided at a lateral side of the support holes 5a, 5a, . . . , respectively. The support holes 5a, 5a, . . . and the insertion holes 5b, 5b, . . . are communicated with the arrangement hole 2a in the base plate 2.

As shown in FIG. 2, the lower surface of the disk mount member 3 is provided with guide grooves 3a, 3a formed in a circular arc shape with the center point of the lower surface as a center. The guide grooves 3a, 3a are located on the 180° opposite sides with respect to the center point of the lower surface of the disk mount member 3.

The disk mount member 3 is provided with sensor holes 3b, 3b, 3b penetrating vertically through the disk mount member 3, and photo sensors (not shown) are disposed directly below the sensor holes 3b, 3b, 3b. The photo sensors have the function of detecting the presence or absence of the disk form recording medium 1000. When the disk form recording medium 1000 is located on the upper side of the disk mount surface 4, detection light emitted from the photo sensors and passing through the sensor holes 3b, 3b, 3b is reflected by the disk form recording medium 1000, whereby the presence of the disk form recording medium 1000 is detected.

Figure 5:
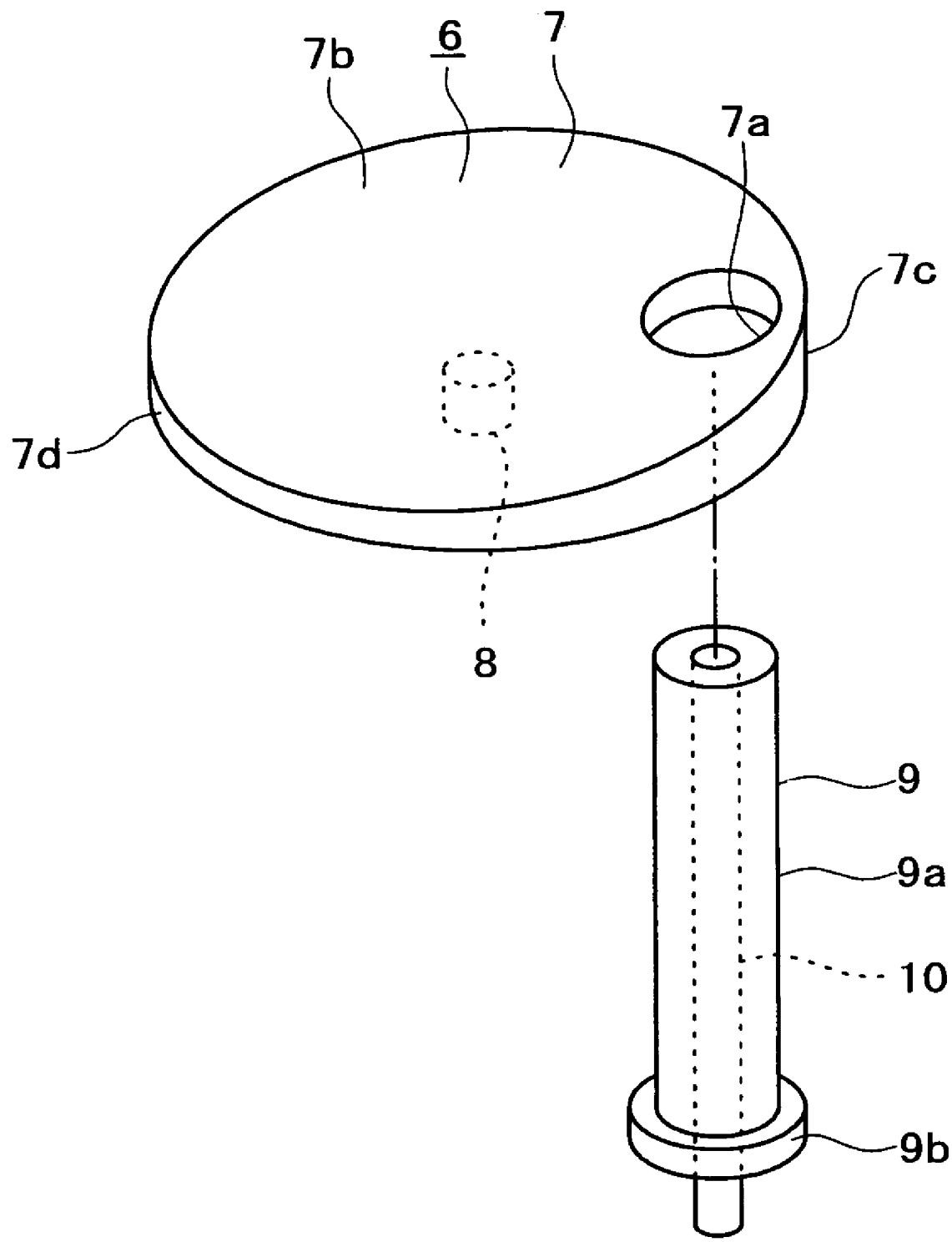
FIG. 5 is an enlarged perspective view showing, in a partly exploded condition, a rotary member, a disk lift-up member and a disk centering member.
Figure 6:
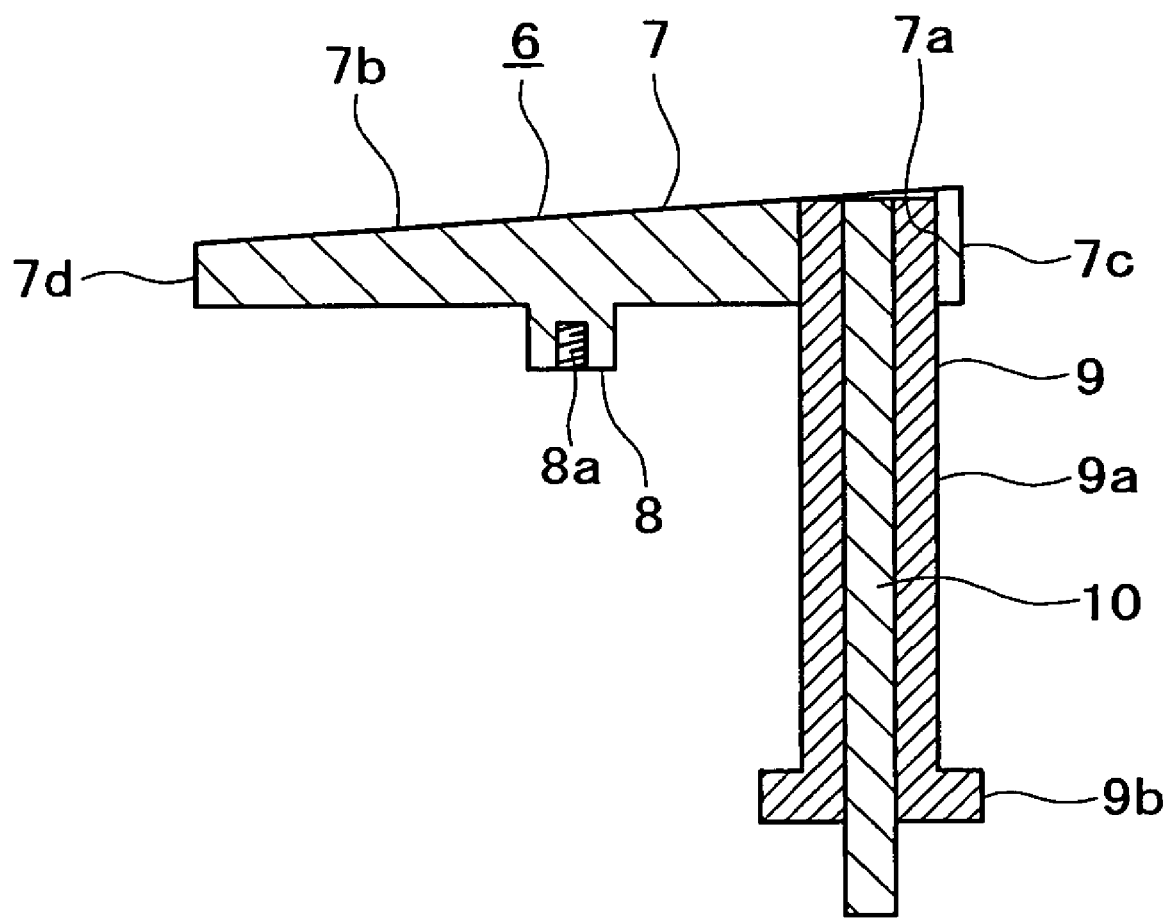
FIG. 6 is an enlarged sectional view showing the rotary member, the disk lift-up member and the disk centering member.

Rotary members 6, 6, . . . are rotatably supported respectively in the support recessed portions 5, 5, . . . of the disk mount member 3 (see FIGS. 2 and 3). As shown in FIGS. 5 and 6, the rotary member 6 includs a main body portion 7 formed in a circular disk-like shape, and a supported shaft portion 8 projected downwards from a central portion of the main body portion 7, and an insertion hole 7a is formed at a position near the circumferential edge of the main body portion 7. The top face 7b of the main body portion 7 is formed as a gently curved surface corresponding to the disk mount surface 4 of the disk mount member 3. Of the rotary member 6, a circumferential portion on one side of the main body portion 7, i.e., a circumferential portion on the side of the insertion hole 7a is formed as the thickest portion 7c, the thickness of the main body portion 7 is gradually reduced as one passes through a central portion toward a circumferential portion on the other side of the main body portion 7, and a circumferential portion on the other side of the main body portion 7a is formed as the thinnest portion 7d.

The supported shaft portions 8, 8, . . . are provided respectively with threaded holes 8a, 8a, . . . opened to the lower side.

The main body portions 7, 7, . . . of the rotary members 6, 6, . . . are inserted respectively into the support recessed portions 5, 5, . . . , and the supported shaft portions 8, 8, . . . are inserted respectively into the support holes 5a, 5a, . . . , whereby the rotary members 6, 6, . . . are supported on the disk mount member 3 so as to be rotatable with the supported shaft portions 8, 8, . . . as fulcrums.

In the condition where the rotary members 6, 6, . . . are supported respectively on the disk mount member 3, the thinnest portions 7d, 7d, . . . are located on the side of the reference point 4a, and the thickest portion 7c, 7c, . . . are located respectively on the sides of the corners of the disk mount member 3, the disk mount surface 4 of the disk mount member 3 and the top faces 6b, 6b, . . . of the rotary members 6, 6, . . . form a continuous curved surface.

Disk lift-up members 9, 9, . . . are supported on the rotary members 6, 6, . . . so as to be movable in the vertical direction (see FIGS. 5 and 6). The disk lift-up member 9 includes a tubular portion 9a formed in a vertically elongate substantially hollow cylindrical shape, and a flange portion 9b provided at a lower end portion of the tubular portion 9a. The disk lift-up members 9, 9, . . . are inserted respectively into the insertion holes 7a, 7a, . . . of the rotary members 6, 6, . . . from the lower side. Therefore, the disk lift-up members 9, 9, . . . can be moved upwards until the flange portions 9b, 9b, . . . make contact with the lower surfaces of the rotary members 6, 6, . . . .

Disk centering members 10, 10, . . . are supported respectively on the disk lift-up members 9, 9, . . . so as to be movable in the vertical direction (see FIGS. 5 and 6). The disk centering member 10 is formed in a slender shaft-like shape, and the length thereof in the axial direction is set to be larger than the length of the disk lift-up member 9 in the axial direction. The disk centering members 10, 10, are inserted respectively in the disk lift-up members 9, 9, . . . , and are prevented by retaining members (not shown) from slipping off from the disk lift-up members 9, 9, . . . . Lower end portions of the disk centering members 10, 10, . . . are projected downwards respectively from the bottom faces of the disk lift-up members 9, 9, . . . , and upper end portions of the disk centering members 10, 10, . . . are projected upwards respectively from the top faces of the disk lift-up members 9, 9, . . . when the disk centering members 10, 10 . . . are moved upwards.

In the condition where the disk lift-up members 9, 9, . . . are supported by the rotary members 6, 6, . . . , the disk centering members 10, 10, . . . are inserted upwards respectively through the insertion holes 5b, 5b, . . . formed in the support recessed portions 5, 5, . . . of the disk mount member 3.

Four cam levers 11, 11, . . . are rotatably supported on the lower surface of the disk mount member 3 (see FIG. 2).

Figure 7:
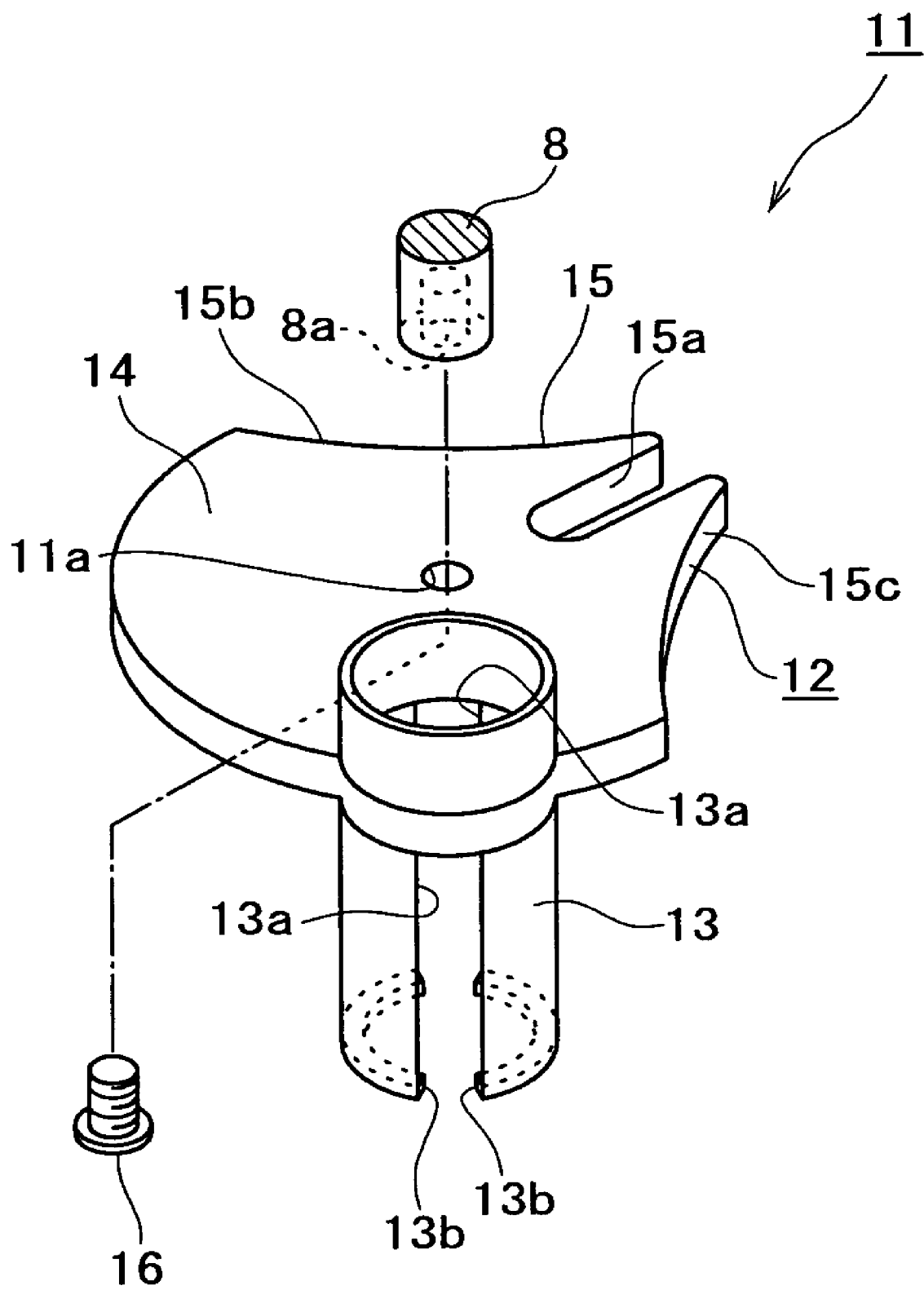
FIG. 7 is an enlarged perspective view of a cam lever.

The cam lever 11 is comprised integrally of a lever main body 12 formed in a flat plate-like shape, and a support tube 13 projected downwards from the lever main body 12 (see FIG. 7).

The lever main body 12 includes a principal surface portion 14 formed in a substantially semicircular shape, and a Geneva portion 15 continuous with the principal surface portion 14. The principal surface portion 14 is provided with a screw insertion hole 11a at a position corresponding to the center of the semicircular shape, and the position of the screw insertion hole 11a constitutes the center of rotation of the cam lever 11. The Geneva portion 15 is tapered in the direction of spacing away from the principal surface portion 14. The Geneva portion 15 is provided with a slide groove 15a opened at a tip end portion thereof and extending toward the side of the screw insertion hole 11a. Side edges on both sides of the slide groove 15a of the Geneva portion 15 are each formed in a gentle circular arc shape recessed to the side of the center of rotation of the cam lever 11, and the circular arc-shaped both side edges constitute Geneva edges 15b, 15c.

The support tube 13 is projected downwards from a portion of the outer circumferential edge of the principal surface portion 14, and is formed in a substantially hollow cylindrical shape. The circumferential surface of the support tube 13 is provided with vertically extending insertion slits 13a, 13a at positions on the 180° opposite sides. Internal flange portions 13b, 13b projected inwards are provided at the lower surface of the support tube 13.

The disk lift-up members 9, 9, . . . respectively supporting the disk centering members 10, 10, . . . are inserted downwards in the support tubes 13, 13, . . . (see FIG. 2), and the disk centering members 10, 10, . . . are supported by the support tubes 13, 13, . . . so as to be vertically movable. The bottom faces of the disk lift-up members 9, 9, . . . make contact with the upper surfaces of the internal flange portions 13b, 13b, . . . of the support tubes 13, 13, . . . , whereby the disk lift-up members 9, 9, . . . are prevented from slipping off to the lower side. In the condition where the disk lift-up members 9, 9, . . . are supported by the support tubes 13, 13, . . . , the lower end portions of the disk centering members 10, 10, . . . can be projected downwards from the support tubes 13, 13, . . . .

The cam levers 11, 11, . . . are mounted respectively to the rotary members 6, 6, . . . by the structure in which mount screws 16, 16, . . . passed through the screw insertion holes 11a, 11a, . . . are passed through the support holes 5a, 5a. . . in the disk mount member 3 and are engaged with the threaded holes 8a, 8a, . . . in the rotary members 6, 6, . . . . In this case, parts of the disk lift-up members 9, 9, . . . supported by the support tubes 13, 13, . . . are inserted respectively in the insertion holes 7a, 7a, . . . in the rotary members 6, 6, . . . , and the cam levers 11, 11, . . . and the rotary members 6, 6, . . . can be rotated integrally with each other. When the cam levers 11, 11, . . . and the rotary members 6, 6, . . . are rotated integrally with each other, the disk lift-up members 9, 9, . . . are moved in the state of being inserted through the insertion holes 5b, 5b, . . . in the disk mount member 3.

Figure 8:
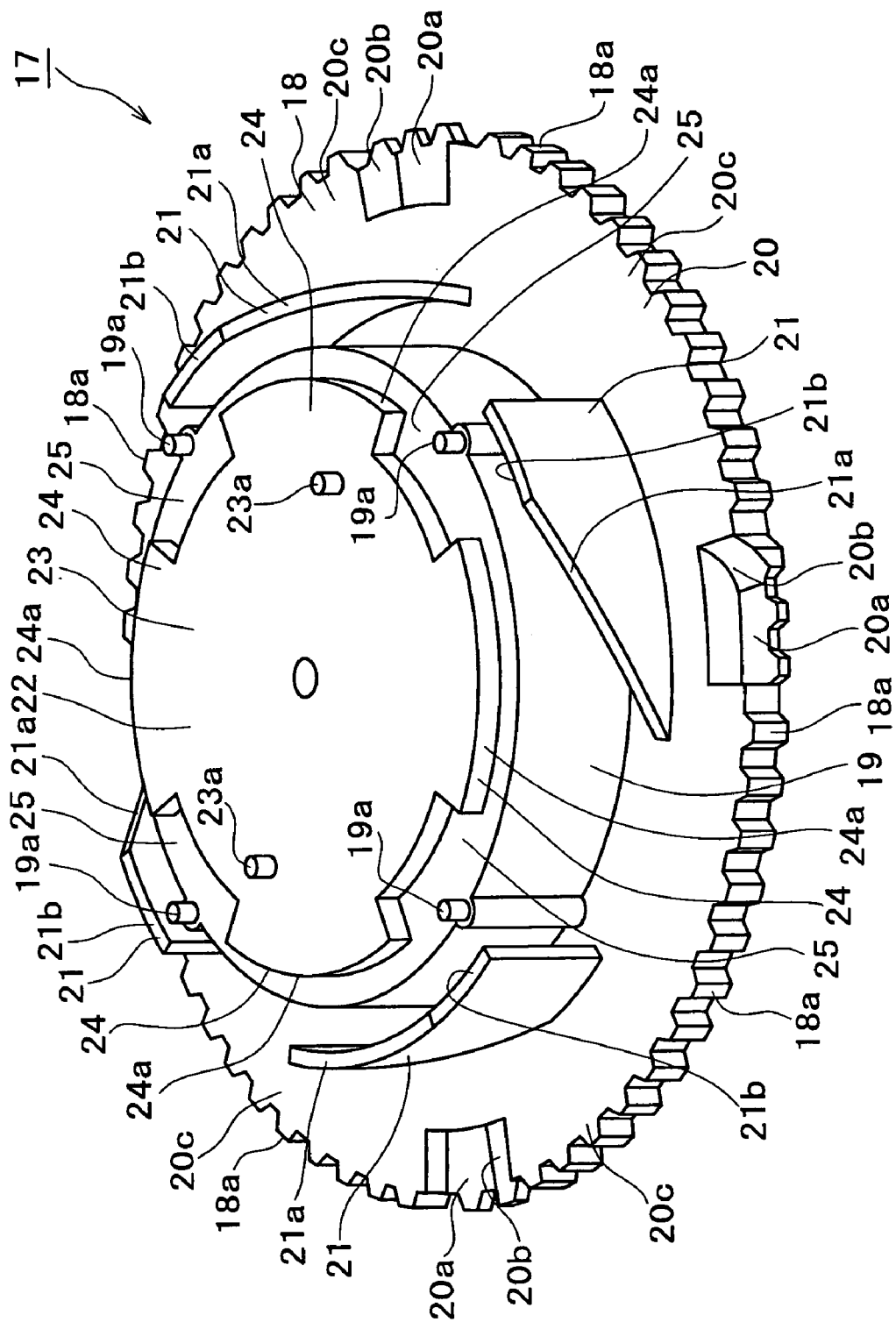
FIG. 8 is an enlarged perspective view of a cam meber.

On the lower surface of the disk mount member 3, a cam member 17 is rotatably supported in the condition where a part thereof is disposed in the arrangement hole 2a (see FIG. 2). As shown in FIG. 8, the cam member 17 includes a gear portion 18 formed in a roughly circular disk-like shape, and a projected portion 19 projected upwards from the gear portion 18, exclusive of a circumferential side portion thereof, and formed in a flat substantially cylindrical shape.

The gear portion 18 is provided with gear teeth 18a, 18a . . . along the circumferential edge thereof. The circumferential portion of the gear portion 18 is formed as a cam portion 20. The cam portion 20 is provided with four recessed portions equally spaced along the circumferential direction, and the bottom surfaces of the recessed portions are formed as lower-side cam surface portions 20a, 20a, . . . . The cam portion 20 is provided with slant cam surface portions 20b, 20b, . . . respectively continuous with the lower-side cam surface portions 20a, 20a, . . . . The slant cam surface portions 20b, 20b, . . . are so inclined as to be displaced upwards as one goes away from the lower-side cam surface portions 20a, 20a, . . . in the circumferential direction. Of the cam portion 20, the other surfaces than the lower-side cam surface portions 20a, 20a, . . . and the slant cam surface portions 20b, 20b, . . . are formed as upper-side cam surface portions 20c, 20c, . . . .

The gear portion 18 is provided with cam walls 21, 21, . . . . The cam walls 21, 21, . . . are provided along the circumferential surface of the projected portion 19, at regular intervals along the circumferential direction. The upper edge of the cam wall 21 is formed to be a slant cam portion 21a which is inclined and a horizontal cam portion 21b which is horizontal, wherein the slant cam portion 21a is so inclined as to be displaced upwards as one goes from the upper surface of the gear portion 18 toward the horizontal cam portion 21*b*.

The projected portion 19 is provided with four slide pins 19*a*, 19*a*, . . . projected upwards at the circumferential edge of the top face thereof. The slide pins 19*a*, 19*a*, . . . are provided at regular intervals along the circumferential direction.

The top face of the projected portion 19 is provided with a projected plate portion 22 at its portion exclusive of the circumferential portion. The projected plate portion 22 includes a base portion 23 formed in a circular disk-like shape, and four projected portions 24, 24, . . . projected radially from the circumferential edge of the base portion 23. The base portion 23 is provided with guided pins 23*a*, 23*a* projected upwards at positions on the 180° opposite sides with respect to the center of the projected portion 19. The projected portions 24, 24, . . . are provided at regular intervals along the circumferential direction, and the outer circumferential edges of the projected portions 24, 24, . . . are formed as rotation-restrictive portions 24*a*, 24*a*, . . . .

Recessed portions between the projected portions 24, 24, . . . are formed as operating recessed portions 25, 25, . . . . The above-mentioned slide pins 19*a*, 19*a*, . . . are located at positions corresponding to the operating recessed portions 25, 25, . . . .

A support shaft 26 is passed through a central portion of the cam member 17 (see FIG. 2). A retaining ring 27 is attached to the bottom surface of the support shaft 26. The cam member 27 is rotatable relative to the support shaft 26, and an upper end portion of the support shaft 26 is attached to a central portion of the lower surface of the disk mount member 3, whereby the cam member 17 is rotatably supported on the disk mount member 3 through the support shaft 26. The cam member 17 is prevented by the retaining ring 27 from slipping off from the support shaft 26.

In the condition where the cam member 17 is supported on the disk mount member 3, the slide pins 19*a*, 19*a*, . . . of the projected portions 19, 19, . . . can be slidably engaged respectively with the slide grooves 15*a*, 15*a*, . . . of the cam levers 11, 11, . . . . In addition, the guided pins 23*a*, 23*a*, . . . of the projected plate portion 22 are slidably engaged respectively with the guide grooves 3*a*, 3*a* formed in the lower surface of the disk mount member 3.

Figure 9:
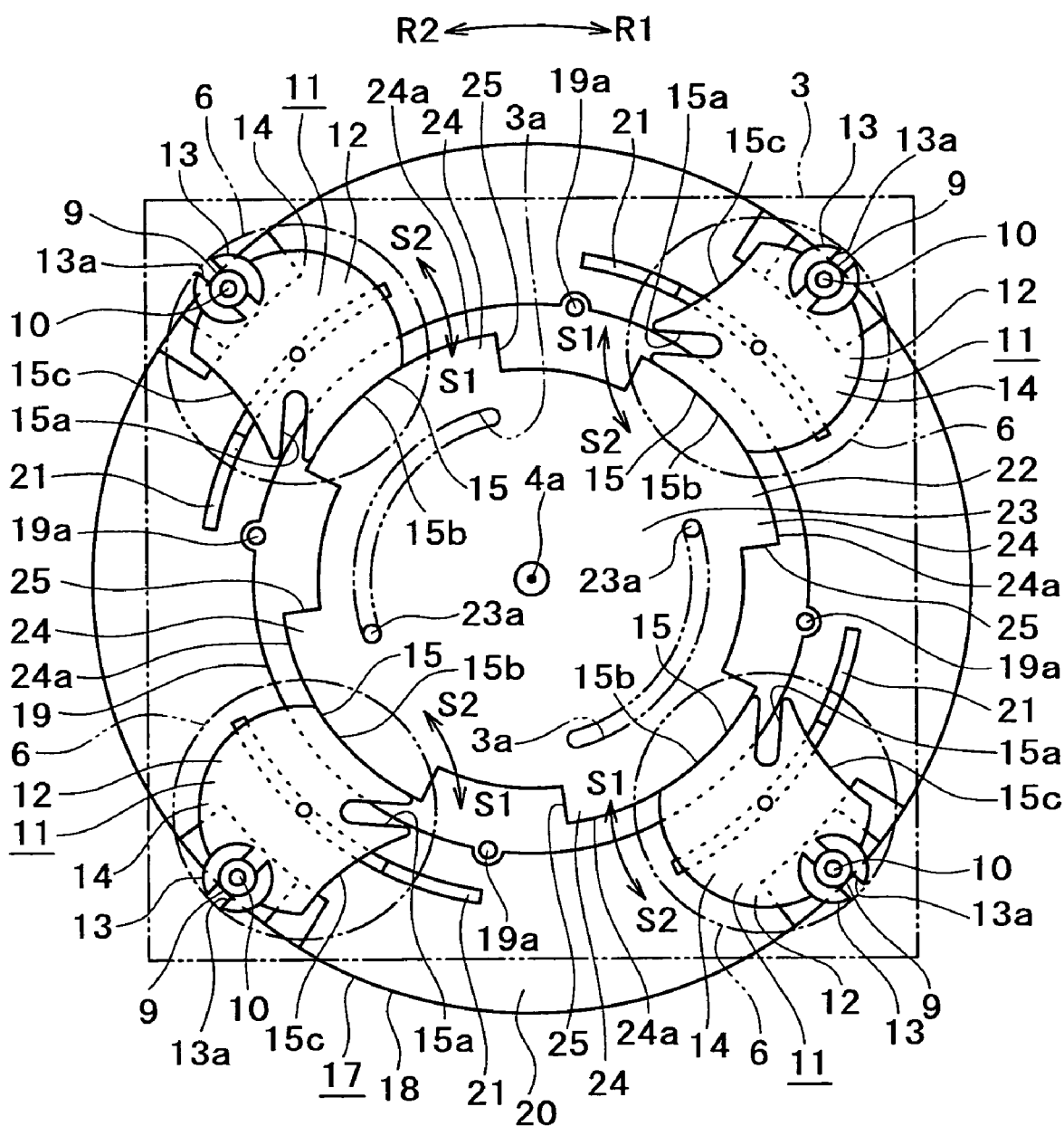

The cam member 17 is rotated by a drive force generated by a driving motor (not shown) and transmitted to the gear portion 18, and is rotated according to the rotating direction of the driving motor, i.e., in direction R1 or R2 shown in FIG. 9.

Now, a centering operation of the disk centering system 1 will be described below (see FIGS. 9 to 21).

First, the states of component portions before centering of the disk form recording medium is performed will be described (see FIGS. 9 and 10).

The guided pins 23*a*, 23*a* of the cam member 17 are engaged respectively with one-end portions of the guide groove 3*a*, 3*a* in the disk mount member 3 (see FIG. 9). The Geneva edges 15*b*, 15*b*, . . . of the cam levers 11, 11, . . . are engaged respectively with the rotation-restrictive portions 24*a*, 24*a*, . . . of the cam member 17, whereby rotation of the cam levers 11, 11, . . . is restricted. The slide pin 19*a*, 19*a*, . . . of the cam member 17 are not inserted in the slide grooves 15*a*, 15*a*, . . . in the cam levers 11, 11, . . . .

As mentioned above, the rotary members 6, 6, . . . are in their initial positions while being restrained from rotation, and the disk lift-up members 9, 9, . . . are located at the outermost side (see FIG. 9). In this instance, the disk centering members 10, 10, . . . are also located at the outermost positions, i.e., stand-by positions. The disk lift-up members 9, 9, . . . are located at movement ends on the lower side under gravity, and are not projected upwards from the rotary members 6, 6, . . . (see FIG. 10). The disk centering members 10, 10, . . . are located at positions corresponding respectively to the lower-side cam surface portions 20*a*, 20*a*, . . . of the cam portion 20 of the cam member 17, and their lower end portions are projected downwards from the bottom faces of the disk lift-up members 9, 9, . . . . Therefore, the upper end portions of the disk centering members 10, 10, . . . are not projected upwards from the disk lift-up members 9, 9, . . . .

Figure 11:
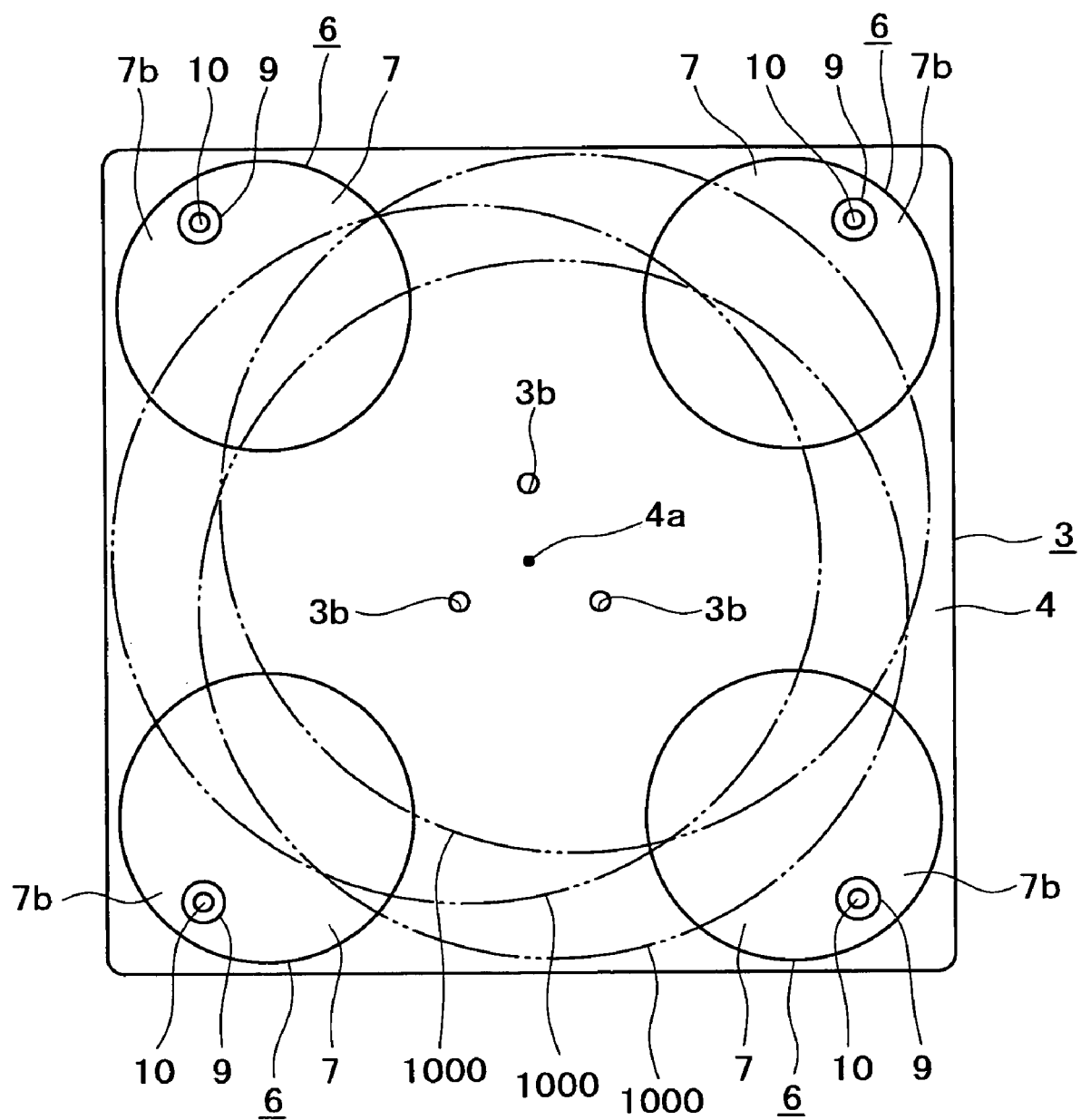
FIG. 11 is a schematic plan view showing the positions where the disk form recording medium can be mounted onto the disk mount surface.

When the disk form recording medium 1000 is mounted on the disk mount surface 4 of the disk mount member 3 and an operating button (not shown) is operated, the driving motor is rotated and the cam member 17 is rotated in the direction R1 shown in FIG. 9. In this instance, the disk form recording medium 1000 can be mounted at an arbitrary position on the disk mount surface 4, as shown in FIG. 11, provided that the whole part of the disk form recording medium 1000 is located on the inner side of the disk centering members 10, 10, . . . .

When the disk form recording medium 1000 is mounted on the disk mount surface 4 of the disk mount member 3, the presence of the disk form recording medium 1000 is detected by the above-mentioned photo sensors.

Figure 12:
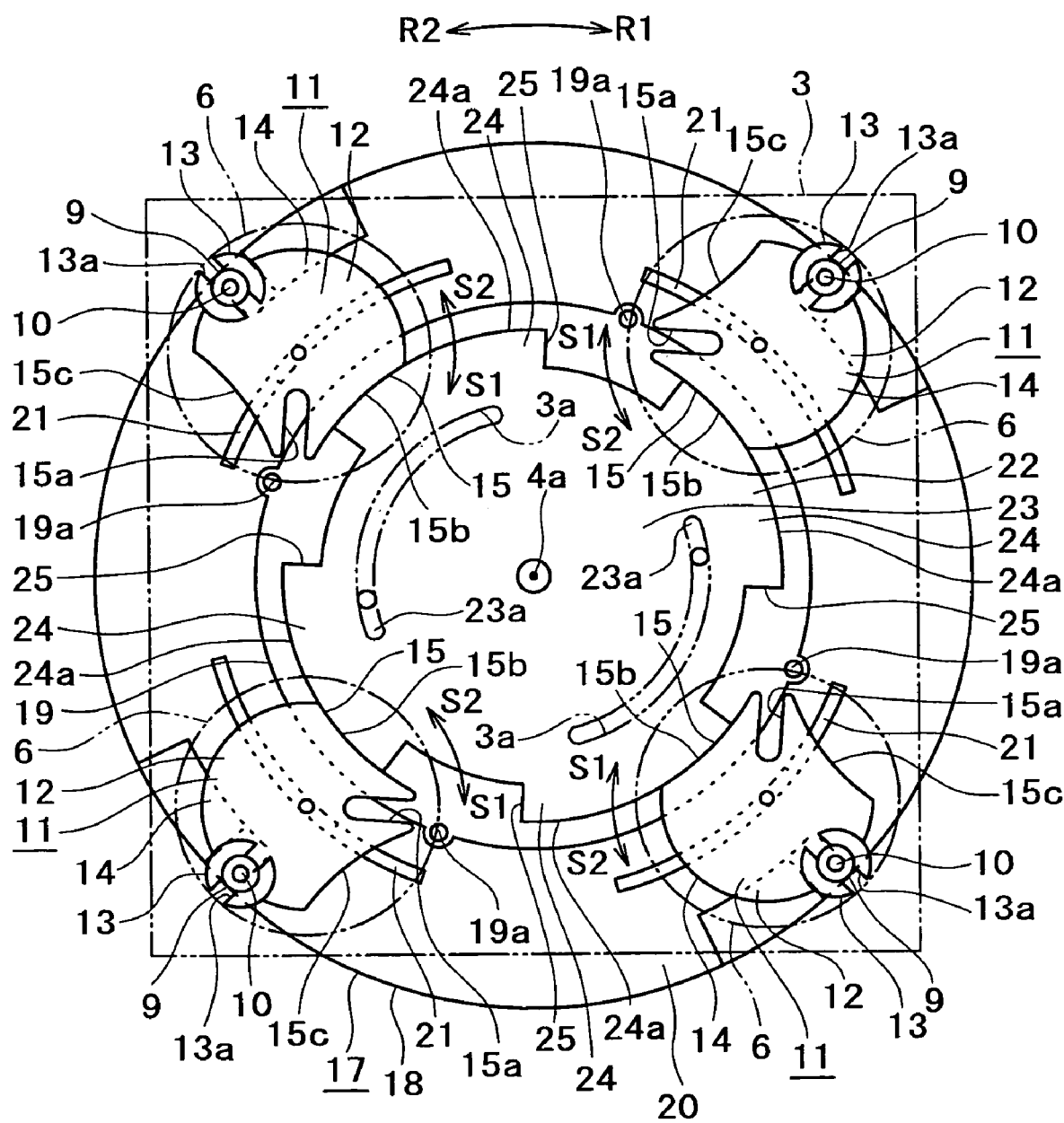
FIG. 12 is a plan view showing the condition immediately after the centering operation is started.

When the cam member 17 is rotated in the direction R1, the guided pins 23*a*, 23*a* are gradually moved from the one-end portions toward the other-end portions of the guide grooves 3*a*, 3*a* in the disk mount member 3 (see FIG. 12). In this instance, the rotation-restrictive portions 24*a*, 24*a*, . . . of the cam member 17 make sliding contact respectively with the Geneva edges 15*b*, 15*b*, . . . of the cam levers 11, 11, . . . , and the rotation of the cam members 11, 11, . . . remains restrained. The slide pins 19*a*, 19*a*, . . . of the cam member 17 gradually approach the openings of the slide grooves 15*a*, 15*a*, . . . in the cam levers 11, 11, . . . .

Figure 13:
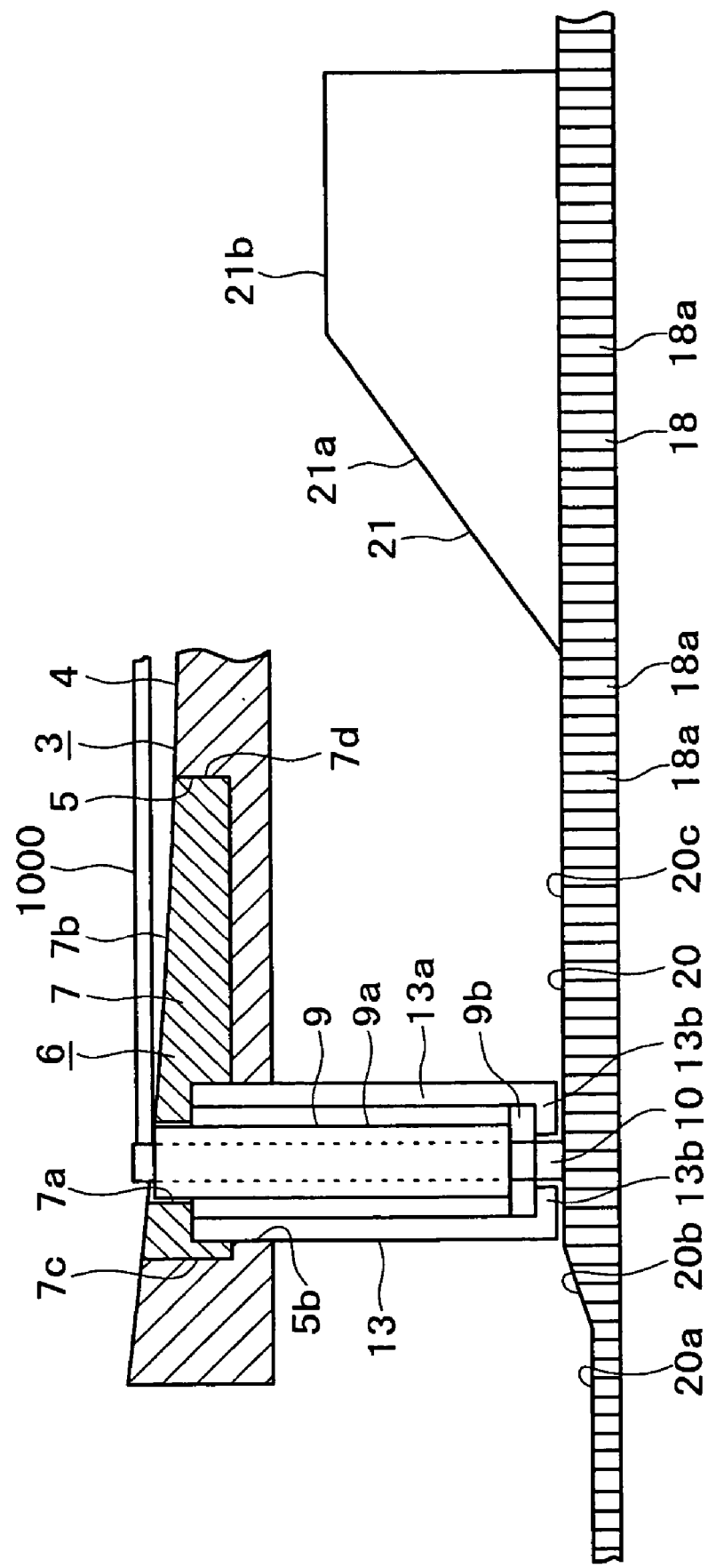
FIG. 13 is an enlarged sectional view showing the condition where the centering operation has been started and the disk centering member is projected from the disk mount surface.
Figure 14:
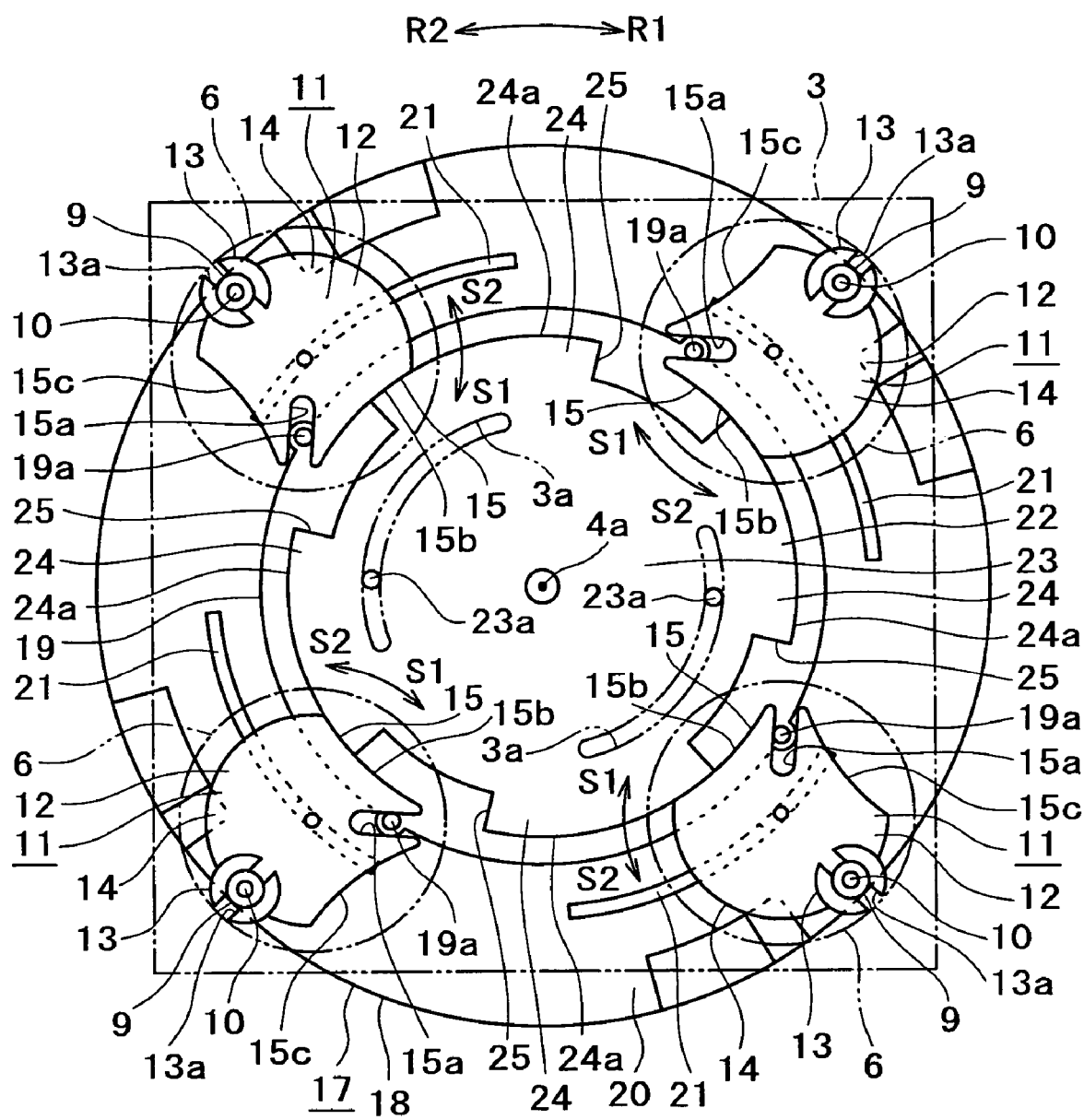
FIG. 14 is a plan view showing the condition where, following to FIG. 12, a slide pin of the cam member is inserted into a slide groove of the cam lever.

By the rotation of the cam member 17, the disk centering members 10, 10, . . . are gradually moved upwards while the lower ends thereof make sliding contact sequentially with the lower-side cam surface portions 20*a*, 20*a*, . . . , then with the slant cam surface portions 20*b*, 20*b*, . . . and with the upper-side cam surface portions 20*c*, 20*c*, . . . , of the cam portion 20 of the cam member 17 (see FIG. 13). Therefore, the upper end portions of the disk centering members 10, 10, . . . are projected upwards from the disk lift-up members 9, 9, . . . and projected upwards from the disk mount surface 4.

When the cam member 17 is further rotated in the direction R1, the slide pins 19*a*, 19*a*, . . . of the cam member 17 are inserted into the slide grooves 15*a*, 15*a*, . . . in the cam levers 11, 11, . . . (see FIG. 14).

Figure 15:
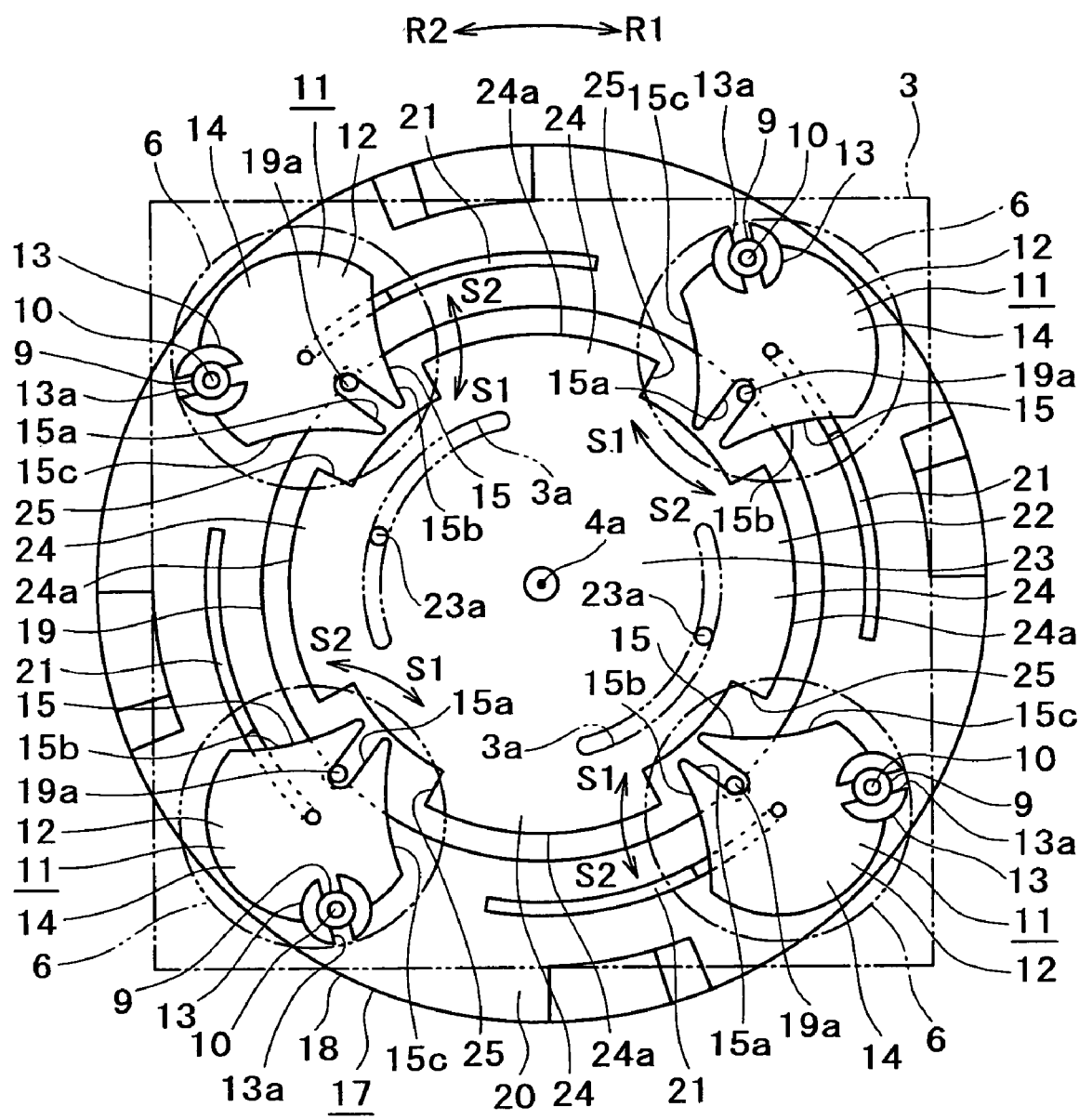
FIG. 15 is a plan view showing the condition where, following to FIG. 14, the rotary member is rotated.

Subsequently, when the cam member 17 is rotated in the direction R1, the rotation-restrictive portions 24*a*, 24*a*, . . . are separated respectively from the Geneva edges 15*b*, 15*b*, . . . , whereby the restraint of the rotation of the cam levers 11, 11, . . . is canceled (see FIG. 15). Therefore, the opening edges of the slide grooves 15*a*, 15*a*, . . . are pressed by the slide pins 19*a*, 19*a*, . . . , and, attendant on the rotation of the cam member 17, the cam levers 11, 11, . . . and the rotary members 6, 6, . . . are synchronously rotated in direction S1 shown in FIG. 15 integrally with each other. In this case, the slide pins 19*a*, 19*a*, . . . are so moved as to reciprocate in the slide grooves 15*a*, 15*a*, . . . . The tip end portions of the Geneva portions 15, 15, . . . are moved respectively in the operating recessed portions 25, 25, . . . of the cam member 17.

The disk lift-up members 9, 9, . . . are rotated attendant on the rotation of the rotary members 6, 6, . . . , and the disk centering members 10, 10, . . . are also gradually rotated from the stand-by positions toward the centering positions for centering the disk form recording medium 1000, attendant on the rotation of the rotary members 6, 6, . . . .

With the rotary members 6, 6, . . . rotated in the direction S1, the disk centering members 10, 10, . . . make contact with the outer circumferential edge of the disk form recording medium 1000 mounted on the disk mount surface 4, and the disk form recording medium 1000 is moved while being pressed by the disk centering members 10, 10, . . . so that the center axis thereof will coincide with the reference point 4a.

Figure 16:
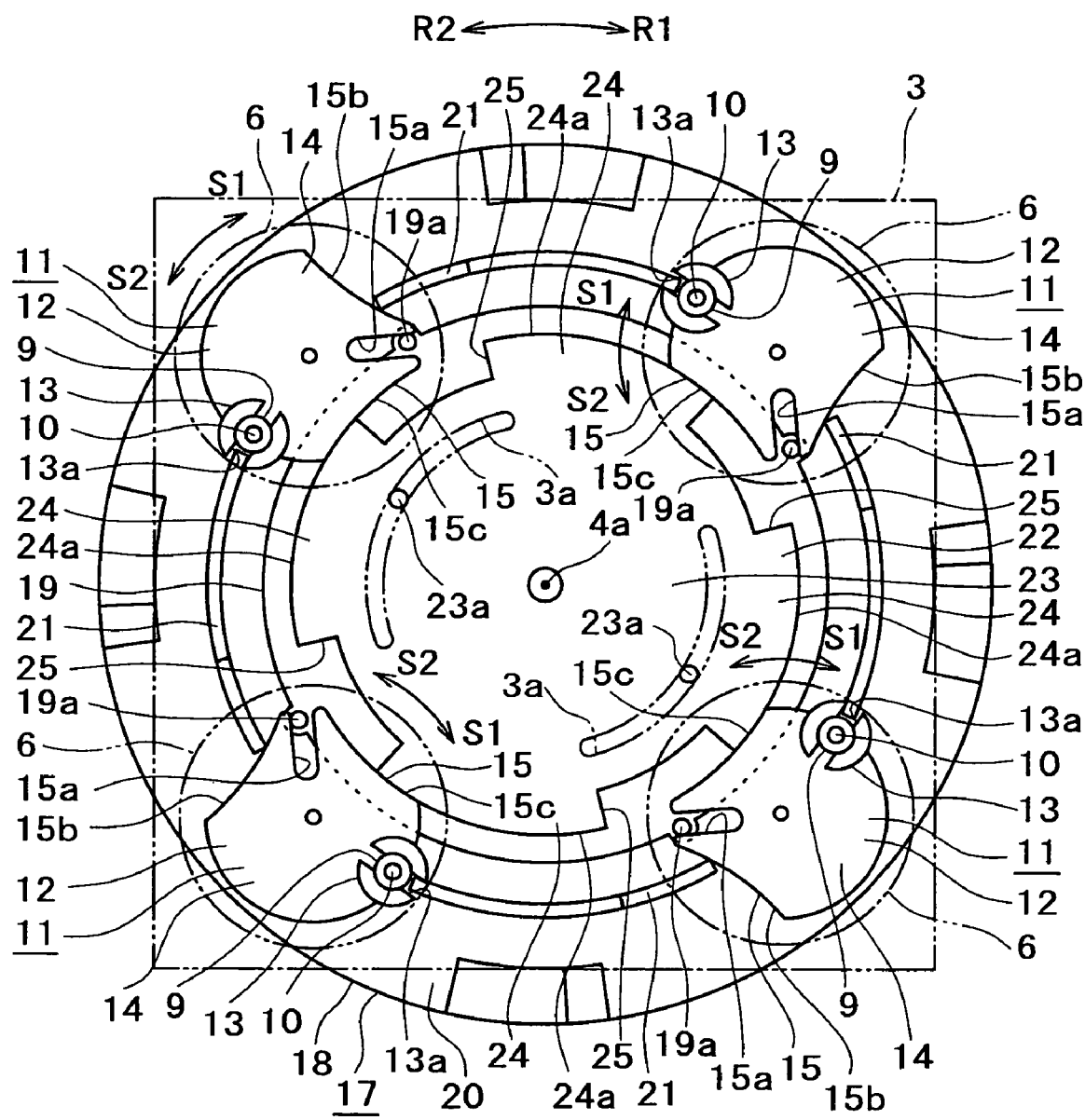
FIG. 16 is a plan view showing the condition where, following to FIG. 15, the cam lever is rotated.
Figure 17:
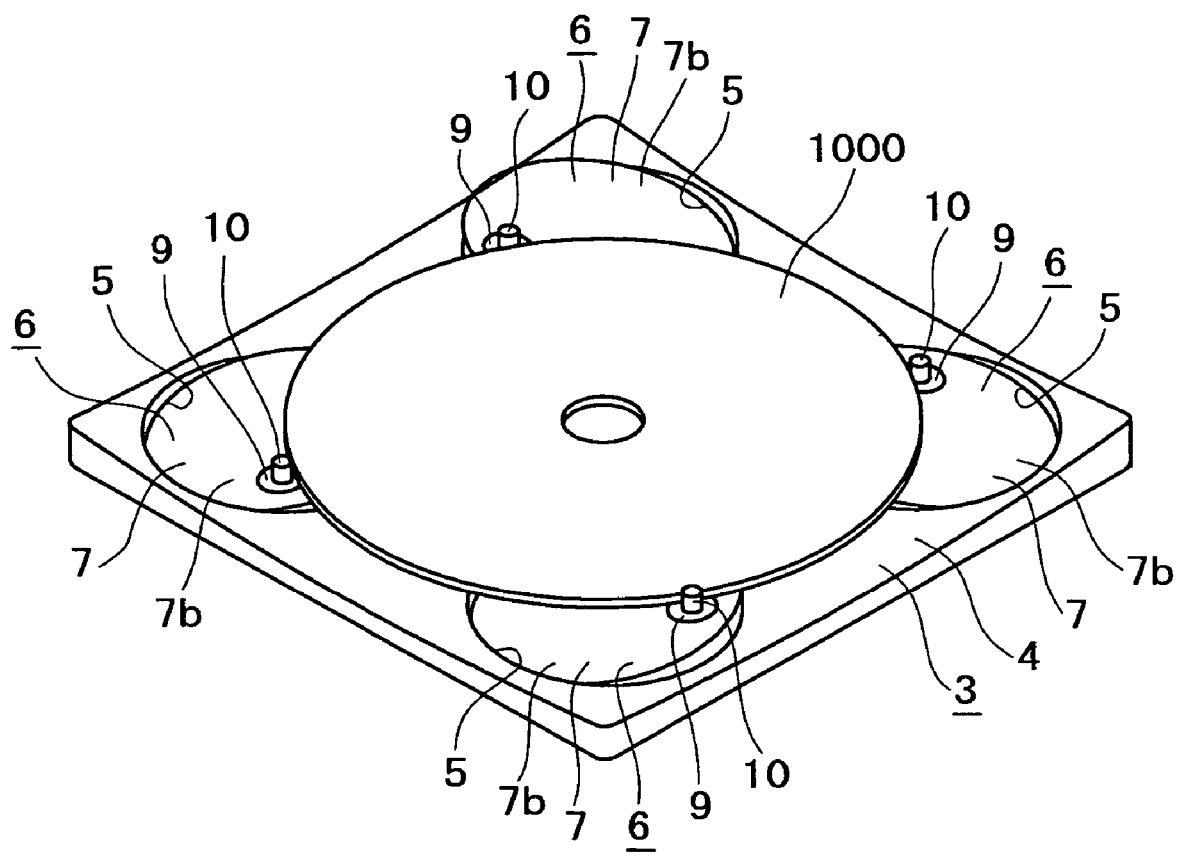
FIG. 17 is an enlarged sectional view showing the condition where the centering of the disk form recording medium has been completed.

The centering of the disk form recording medium 1000 is completed when the center axis of the disk form recording medium 1000 coincides with the reference point 4a (see FIGS. 16 and 17).

When the centering is completed, the Geneva edges 15c, 15c, . . . of the cam levers 11, 11, . . . are engaged respectively with the rotation-restrictive portions 24a, 24a, . . . of the cam member 17 (see FIG. 16). Therefore, the rotation of the rotary members 6, 6, . . . is again restrained. In this instance, the disk lift-up members 9, 9, . . . and the disk centering members 10, 10, . . . are located in proximity to the cam walls 21, 21, . . . of the cam member 17.

When the cam member 17 is further rotated in the direction R1, the cam walls 21, 21, . . . are gradually inserted respectively through the insertion slits 13a, 13a, . . . of the support tubes 13, 13, . . . of the cam levers 11, 11, . . . into the inside of the support tubes 13, 13, . . . , as shown in FIG. 16. In this instance, the slide pins 19a, 19a, . . . of the cam member 17 are drawn respectively out of the slide grooves 15a, 15a, . . . in the cam levers 11, 11, . . . . In addition, since the Geneva edges 15c, 15c, . . . of the cam levers 11, 11, . . . make sliding contact with the rotation-restrictiv portions 24a, 24a, . . . of the cam member 17, the rotary members 6, 6, . . . and the cam levers 11, 11, . . . are not rotated.

Figure 18:
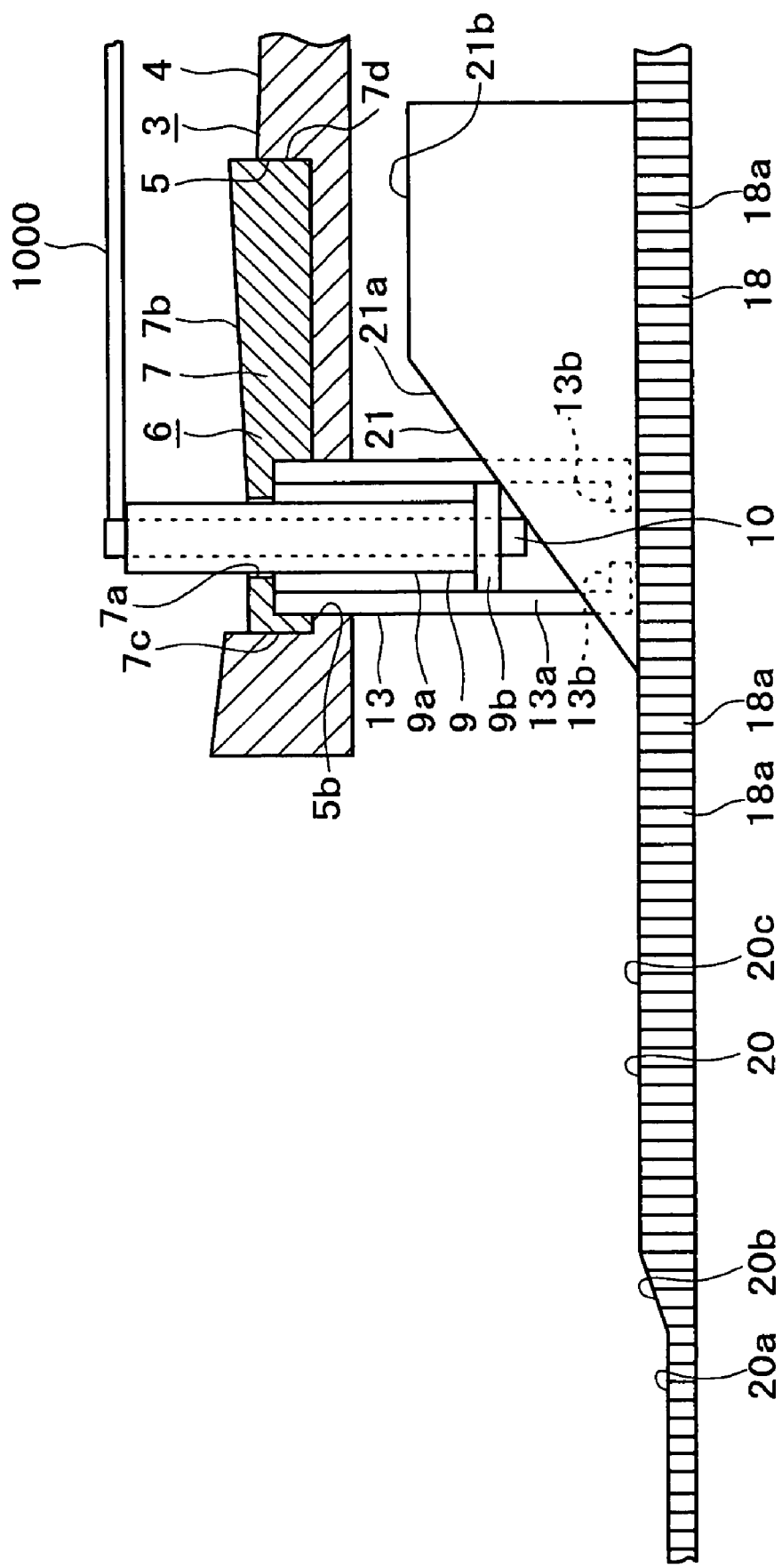
FIG. 18 is an enlarged sectional view showing the condition where the disk form recording medium is lifted up by the disk lift-up member.

As the cam walls 21, 21, . . . are inserted respectively through the insertion slits 13a, 13a, . . . into the inside of the support tubes 13, 13, . . . , the slant cam portions 21a, 21a, . . . are brought into sliding contact with the bottom faces of the disk lift-up members 9, 9, . . . and the bottom faces of the disk centering members 10, 10, . . . , as shown in FIG. 18, so that the disk lift-up members 9, 9, . . . and the disk centering members 10, 10, . . . are integrally moved upwards, whereby the disk form recording medium 1000 is gradually lifted up.

Figure 19:
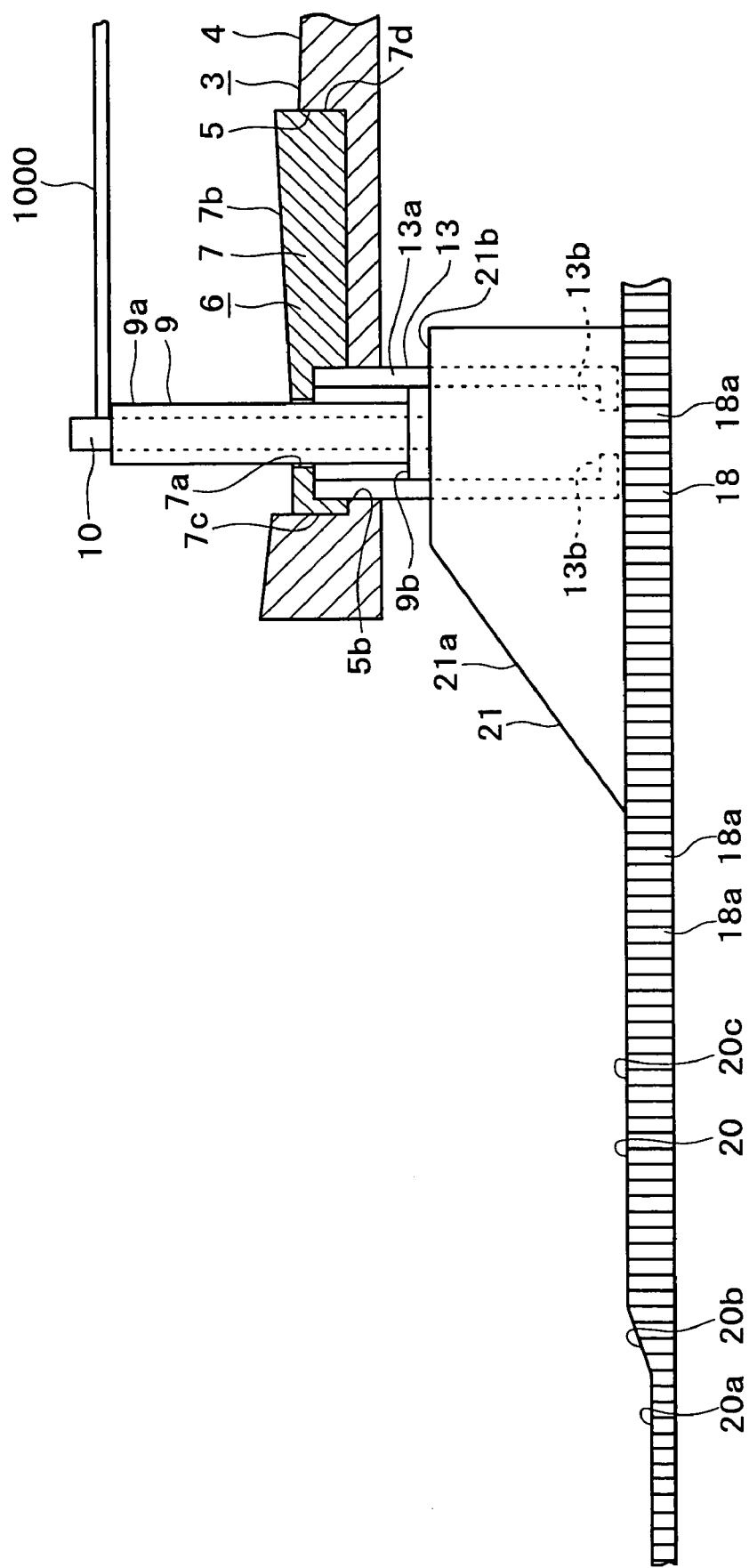
FIG. 19 is an enlarged sectional view showing the condition where, following to FIG. 18, the disk form recording medium has been lifted up to a chucking position by the disk lift-up member.
Figure 20:
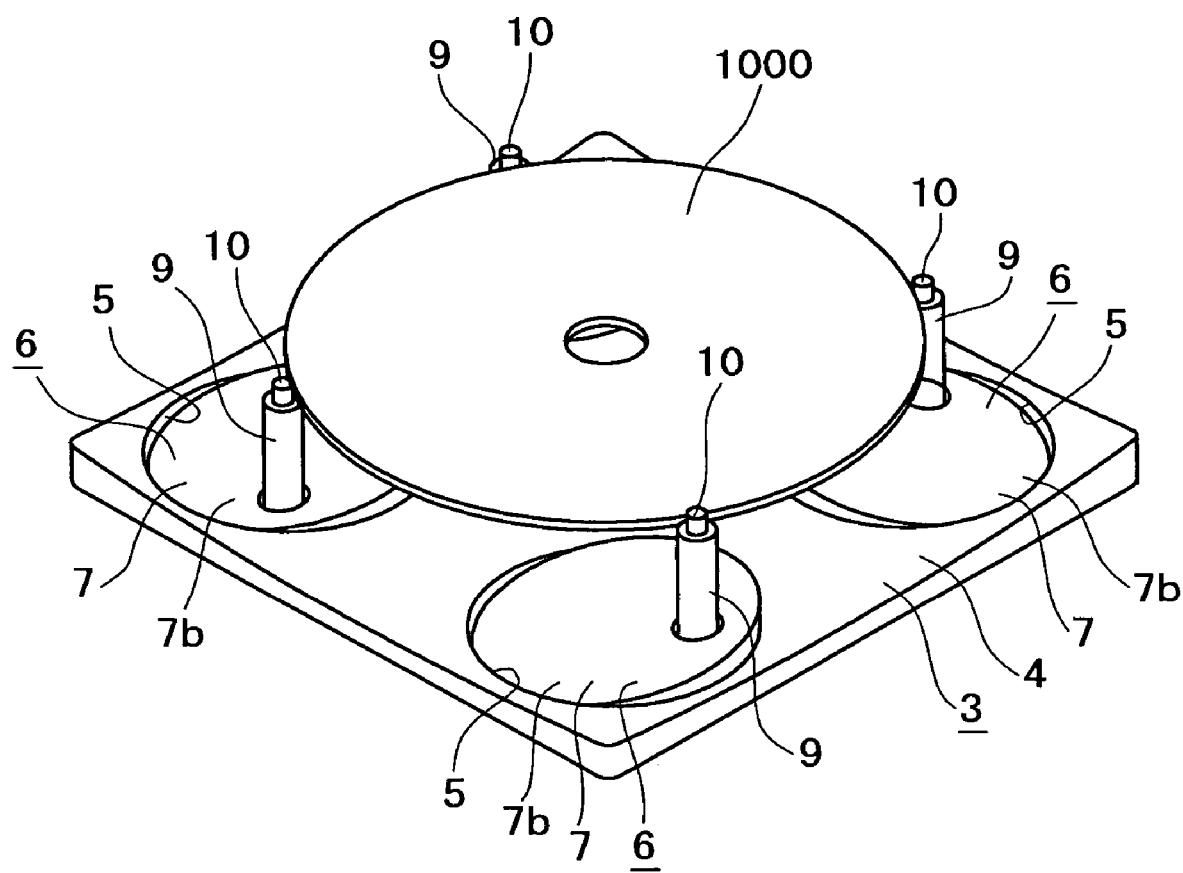
FIG. 20 is an enlarged perspective view showing the condition where the disk form recording medium has been lifted up to the chucking position.

When the cam member 17 is further rotated in the direction R1, as shown in FIG. 19, the horizontal cam portions 21b, 21b, . . . are brought into sliding contact with the bottom faces of the disk lift-up members 9, 9, . . . , the upward movement of the disk lift-up members 9, 9, . . . and the disk centering members 10, 10, . . . is stopped, and the disk form recording medium 1000 lifted up is brought to a chucking position (see FIG. 20).

The guided pins 23a, 23a of the cam member 17 are engaged with the other-end portions of the guide groove 3a, 3a in the disk mount member 3 (see FIG. 21), and the rotation of the driving motor is stopped, whereby the rotation of the cam member 17 is stopped.

Subsequently, the disk chucking mechanism 103 is moved in the direction (direction L1 shown in FIG. 1) of approaching the disk form recording medium 1000 lifted up by the disk lift-up members 9, 9, . . . . The movement of the disk chucking mechanism 103 in the direction L1 is stopped when the disk table 108 and the chucking pulley 110 are moved to a central portion of the disk form recording medium 1000, then the pulley support member 109 is turned in the direction (direction T1 shown in FIG. 1) of approaching the disk form recording medium 1000, and an inner circumferential portion of the disk form recording medium 1000 is clamped between the disk table 108 and the chucking pulley 110, i.e., the disk form recording medium 1000 is chucked.

Figure 21:
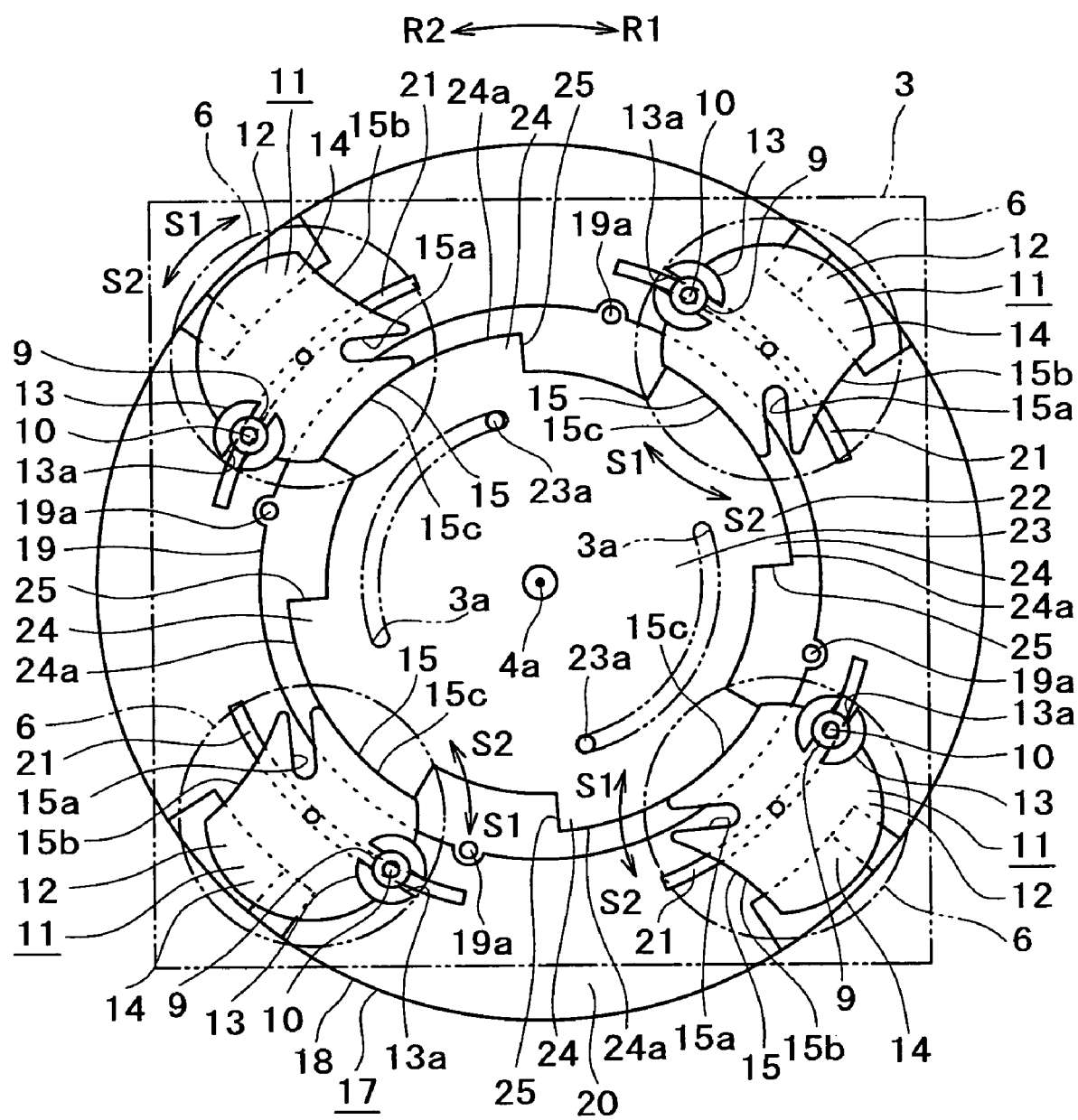
FIG. 21 is a plan view showing the condition of each portion when the disk form recording medium has been lifted up to the chucking position.

When the disk form recording medium 1000 is thus chucked, the driving motor is rotated in the direction reverse to the above, whereby the cam member 17 is rotated in direction R2 shown in FIG. 21, the bottom faces of the disk lift-up members 9, 9, . . . and the bottom faces of the disk centering members 10, 10, . . . are brought into sliding contact with the horizontal cam portions 21b, 21b, . . . and then with the slant cam portions 21a, 21a, . . . of the cam walls 21, 21, . . . and the disk lift-up members 9, 9, . . . and the disk centering members 10, 10, . . . are integrally moved downwards, to be separated downwards from the disk form recording medium 1000. The cam member 17 is stopped at a predetermined position, by stopping the driving motor.

When the disk lift-up members 9, 9, . . . and the disk centering members 10, 10, . . . are moved downwards, the disk form recording medium 1000 is rotated attendant on the disk table 108, and the light pickup 107 is driven, to perform recording or reproduction of information signals onto or from the disk form recording medium 1000.

When the recording or reproduction of information signals is finished, the driving motor is again rotated, to rotate the cam member 17 in the direction R1, the bottom faces of the disk lift-up members 9, 9, . . . and the bottom faces of the disk centering members 10, 10, . . . are brought into sliding contact with the slant cam portions 21a, 21a, . . . and then with the horizontal cam portions 21b, 21b, . . . , whereby the disk lift-up members 9, 9, . . . and the disk centering members 10, 10, . . . are integrally moved upwards, the top faces of the disk lift-up members 9, 9, . . . are brought into contact with the lower surface of the disk form recording medium 1000, and the disk centering members 10, 10, . . . are brought into contact with the outer circumferential edge of the disk form recording medium 1000. When the top faces of the disk lift-up members 9, 9, . . . make contact with the lower surface of the disk form recording medium 1000 and the disk centering members 10, 10, . . . make contact with the outer circumferential edge of the disk form recording medium 1000, the rotation of the driving motor is stopped, whereby the rotation of the cam member 17 is stopped.

Subsequently, the pulley support member 109 is turned in the direction (direction T2 shown in FIG. 1) of spacing away from the disk form recording medium 1000, whereby the chucking of the disk form recording medium 1000 is canceled, and the disk chucking mechanism 103 is moved in the direction (direction L2 shown in FIG. 1) of spacing away from the disk form recording medium 1000.

When the disk chucking mechanism 103 is moved in the direction of spacing away from the disk form recording medium 1000, the disk form recording medium 1000 is located at the chucking position, where the user can take out the disk form recording medium 1000 from the disk drive 100.

In the chucking position, the disk form recording medium 1000 is being lifted up by the disk lift-up members 9, 9, . . . , and a predetermined space is formed between the disk form recording medium 1000 and the disk mount surface 4 of the disk mount member 3 (see FIG. 20). Therefore, the user can insert his hand or fingers into the space and can easily take out the disk form recording medium 1000.

With the disk form recording medium 1000 taken out of the disk drive 100, the absence of the disk form recording medium 1000 is detected by the photo sensors.

Figure 10:
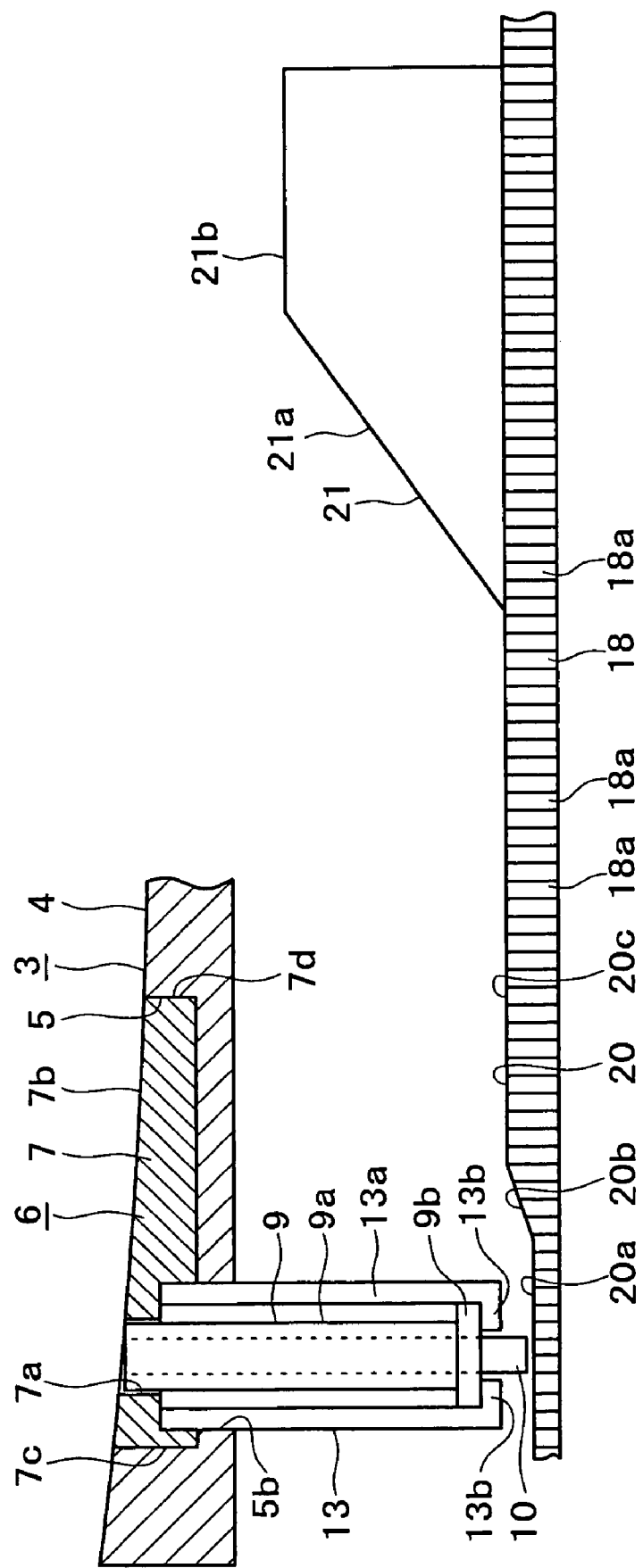
FIG. 10 is an enlarged sectional view showing the condition before the centering operation is performed.

When the absence of the disk form recording medium 1000 is thus detected by the photo sensors, the driving motor is rotated, to rotate the cam member 17 in the direction R2, whereby the disk lift-up members 9, 9, . . . and the disk centering members 10, 10, . . . are moved downwards, the disk form recording medium 1000 is mounted on the disk mount surface 4, the rotary members 6, 6, . . . are rotated in the direction S2 shown in FIG. 21, and the disk centering members 10, 10, . . . are spaced away from the disk form recording medium 1000; thus, the component portions are returned into the original conditions shown in FIGS. 9 and 10. Therefore, the rotary members 6, 6, . . . are returned into the initial positions, and, attendant on this, the disk centering members 10, 10, . . . are returned into the stand-by positions.

Incidentally, while an example in which the disk form recording medium 1000 is taken out of the disk drive 100 when the disk chucking mechanism 103 is moved in the direction (direction L2 shown in FIG. 1) of spacing away from the disk form recording medium 1000 has been described above, there may be adopted a method in which, for example, subsequent to the movement of the disk chucking mechanism 103 in the direction of spacing away from the disk form recording medium 1000, the disk lift-up members 9, 9, . . . and the disk centering members 10, 10, . . . are moved downwards to thereby once mount the disk form recording medium 1000 on the disk mount surface 4.

In this case, the disk form recording medium 1000 may be again lifted up by the disk lift-up members 9, 9, . . . and stopped at a predetermined position, to form a predetermined space between the disk form recording medium 1000 and the disk mount surface 4 of the disk mount member 3 so that the user can easily take out the disk form recording medium 1000.

As has been described above, in the disk centering system 1, the disk centering members 10, 10, . . . are moved from the stand-by positions toward the centering positions so as to make contact with the outer circumferential edge of the disk form recording medium 1000 mounted on the disk mount surface 4 and to thereby center the disk form recording medium 1000. Therefore, the disk form recording medium 1000 can be mounted at an arbitrary position in a predetermined range on the disk mount surface 4, the operator can easily handle the disk form recording medium 1000, and the convenience in use of the disk centering system 1 is enhanced.

In addition, the centering positions are located at an equal distance from the reference point 4*a* in the radial directions with the reference point 4*a* as a center, and the disk centering members 10, 10, . . . are moved from the stand-by positions to the centering positions to thereby center the disk form recording medium 1000. Therefore, centering of a disk form recording medium can be performed irrespectively of the size of the disk form recording medium.

Further, there is no fear of the trouble that the inner circumferential portion of the disk recording medium 1000 might be scratched or damaged, which trouble would be generated in the case where the disk form recording medium 1000 is mounted onto a centering portion of a disk table including engagement claws.

In addition, since the disk centering members 10, 10, . . . are rotated attendant on the rotary members 6, 6, . . . and the disk form recording medium 1000 is centered by the disk centering members 10, 10, . . . , the burden exerted on the disk form recording medium 1000 by the disk centering members 10, 10, . . . at the time of their contact with the outer circumferential edge of the disk form recording medium 1000 is slight, so that the outer circumferential edge of the disk form recording medium 1000 can be prevented from being broken or damaged.

In the disk centering system 1, as described above, the disk mount surface 4 is formed as a recessed curved surface, so that the lower surface, or recording surface, of the disk form recording medium 1000 can be prevented from being scratched.

Besides, in the disk centering system 1, the disk centering members 10, 10, . . . are projected upwards from the disk mount surface 4 when the movement of the disk centering members 10, 10, . . . from the stand-by positions is started. Therefore, at the time of mounting the disk form recording medium 1000 on the disk mount surface 4, the disk form recording medium 1000 does not make contact with the disk centering members 10, 10, . . . , and the disk form recording medium 1000 can be prevented from being scratched.

Furthermore, since the disk centering members 10, 10, . . . are moved synchronously, an efficient operation is performed, and the mechanism can be simplified.

In addition, in the disk centering system 1, the disk form recording medium 1000 having been centered is lifted up to the chucking position by the disk lift-up members 9, 9, . . . and is chucked. Therefore, chucking of the disk form recording medium 1000 can be performed easily.

Incidentally, while an example in which four rotary members 6, 6, . . . , four disk lift-up members 9, 9, . . . and four disk centering members 10, 10, . . . are provided has been described above, the numbers of these members are not limited to four, and it suffices to provide at least three rotary members 6, at least three disk lift-up members 9 and at least three disk centering members 10 in the radial directions with the reference point 4*a* as a center.

Next, a second embodiment of the disk centering system will be described (see FIGS. 22 to 34).

The disk centering system 1A is provided at a part of a disk drive, which is provided with a disk recording and/or reproduction portion 102 and a disk chucking mechanism 103, like the above-described disk drive 100.

Figure 22:
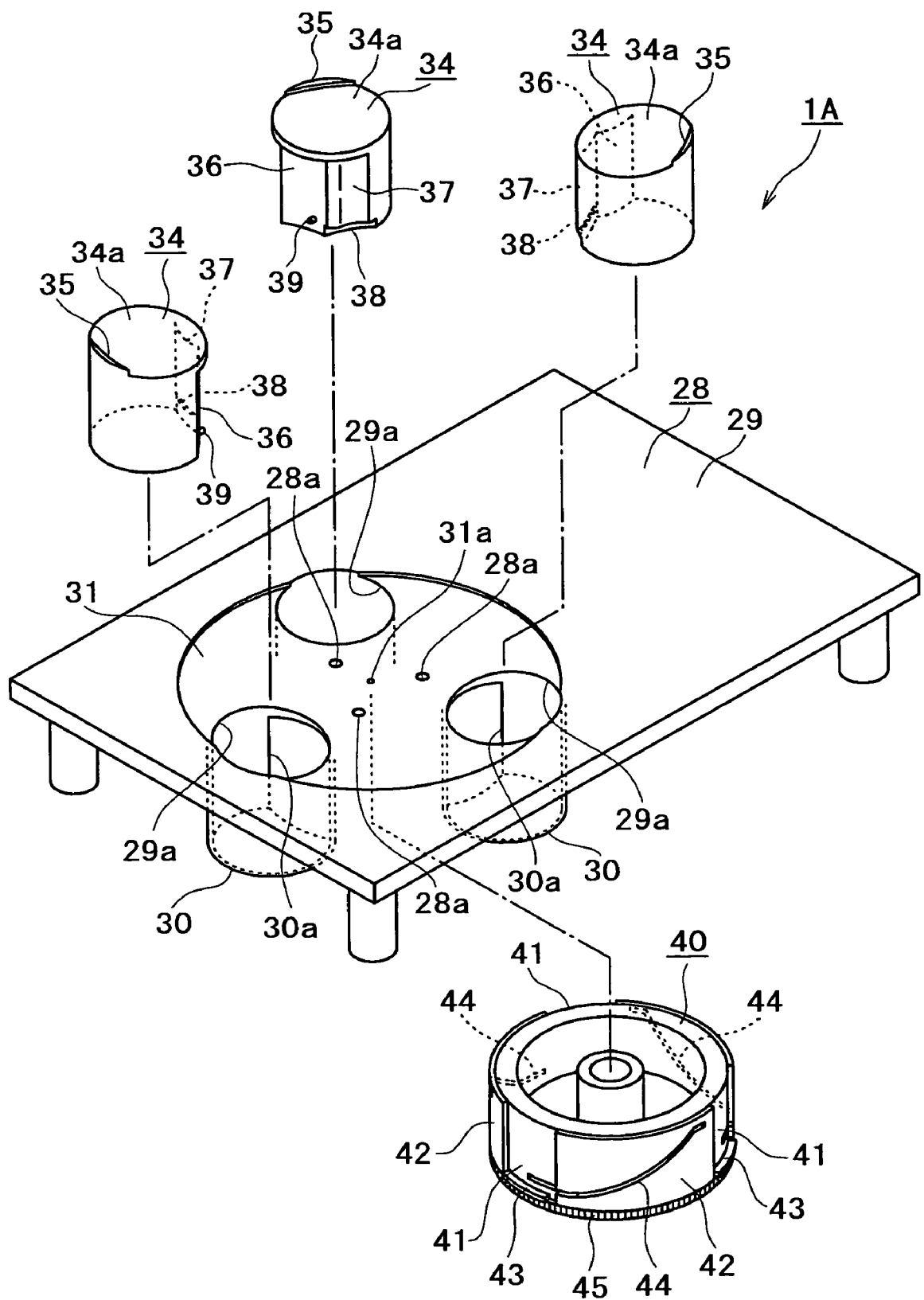
Figure 23:
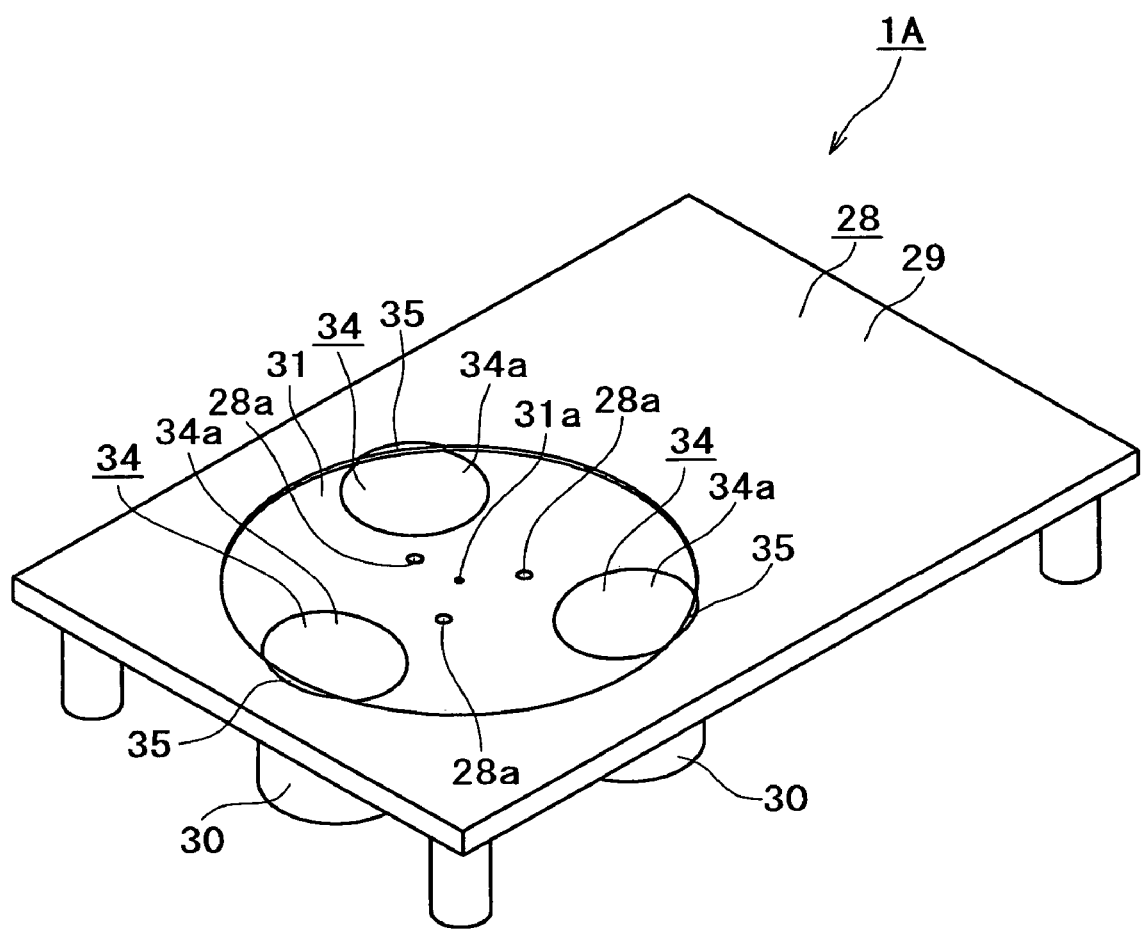
FIG. 23 is a perspective view of the disk centering system.

The disk centering system 1A comprises predetermined members supported on a disk mount member 28 (see FIGS. 22 and 23). The disk mount member 28 is comprised integrally of a base portion 29 formed in a substantially flat plate-like shape, and support tube portions 30, 30, 30 projected downwards from the base portion 29.

At the upper surface of the base portion 29, there is provided a disk mount surface 31 formed as a gentle recessed curved surface, for example, a gentle spherical surface. The disk mount surface 31 is formed, for example, in a circular shape in plan view, and the center point thereof is formed as a reference point 31*a* located at the lowermost position.

The disk mount member 28 is provided with sensor holes 28*a*, 28*a*, 28*a* penetrating vertically therethrough, and photo sensors (not shown) are disposed directly below the sensor holes 28*a*, 28*a*, 28*a*, respectively. The photo sensors have the function of detecting the presence or absence of a disk form recording medium 1000. When the disk form recording medium 1000 is located on the upper side of the disk mount surface 31, detection light emitted from the photo sensors and passing through the sensor holes 28a, 28a, 28a is reflected by the disk form recording medium 1000, whereby the presence of the disk form recording medium 1000 is detected.

The support tube portions 30, 30, 30 are projected downwards from portions on the circumferential side of the disk mount surface 31, and are opened to the upper side. Therefore, the base portion 29 is provided with three openings 29a, 29a, 29a, which are each formed ranging from the disk mount surface 31 to a portion directly on the outside of the disk mount surface 31. The support tube portions 30, 30, 30 are spaced at regular intervals along the circumferential direction, and the center axis thereof are located at an equal distance from the reference point 31a in the radial directions.

The support tube portion 30 includes a circular arc surface portion 32, and a closing surface portion 33 for closing the lower-side opening of the circular arc surface portion 32. Portions of the circular arc surface portion 32 and the closing surface portion 33 on the side of the reference point 31a are cut out, and the cutout is formed as an arrangement cutout 30a.

Rotary bodies 34, 34, 34 are rotatably supported respectively in the support tube portions 30, 30, 30 of the disk mount member 28 (see FIGS. 22 and 23). The rotary bodies 34, 34, 34 have the function of centering the disk form recording medium 1000, and function also as disk lift-up portions for lifting up the disk form recording medium 1000.

The rotary body 34 is formed in a substantially cylindrical shape, and the top face 34a thereof is formed as a gently curved surface corresponding to the disk mount surface 31 (see FIGS. 22 and 23). A disk centering portion 35 projected upwards is provided at one end portion of the top face 34a of the rotary body 34, and the disk centering portion 35 is formed in correspondence with the portion, ranging to the direct outside of the disk mount surface 31, of the opening 29a of the base portion 29.

The circumferential surface of the rotary body 34 is cut out at a portion exclusive of an upper end portion (see FIG. 22). With the cutout thus provided, the rotary body 34 is provided with a first Geneva surface 36 and a pressed surface 37 which are continuous with each other in the circumferential direction. The first Geneva surface 36 is formed as a recessed circular arc surface, while the pressed surface 37 is formed as a predetermined curved surface. A lower end portion of the pressed surface 37 is cut out, and, with the cutout thus provided, a second Geneva portion 38 is formed.

The rotary body 34 is provided with a slide pin 39 projected from a lower end portion of the first Geneva surface 36.

The rotary bodies 34, 34, 34 are inserted downwards respectively into the support tube portions 30, 30, 30 to be rotatably supported (see FIG. 23).

Figure 24:
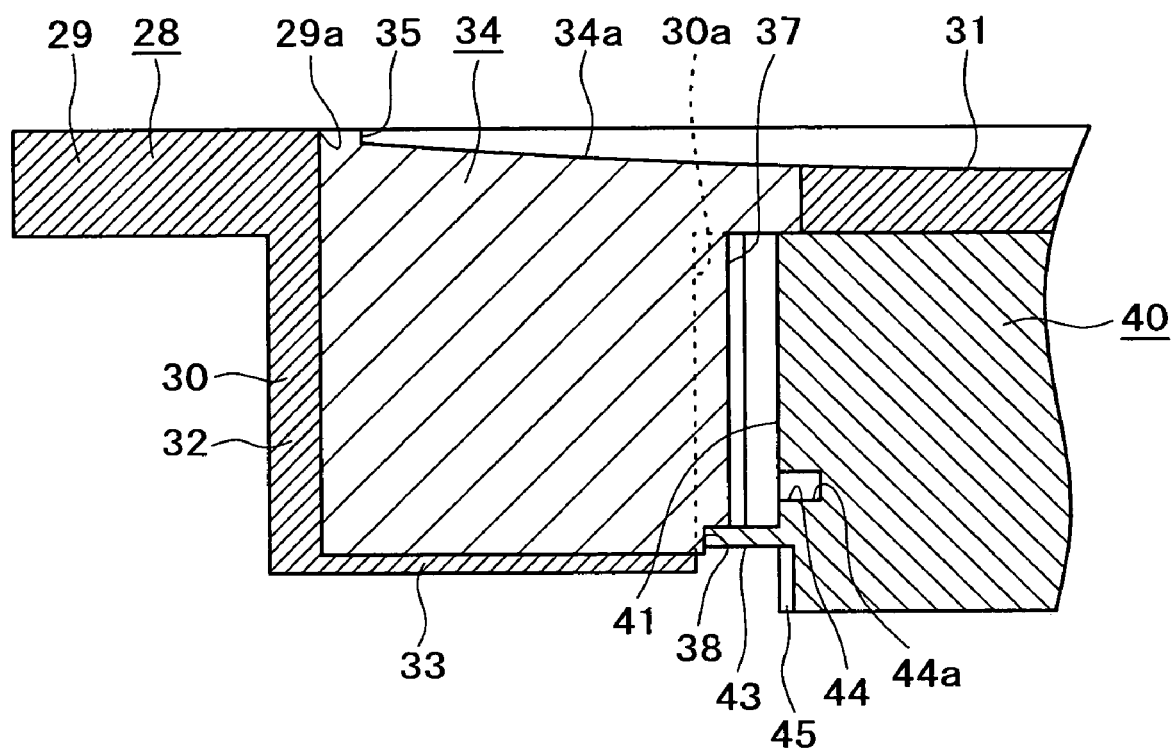
FIG. 24 is an enlarged sectional view of an essential part of the disk centering system.

In the condition where the rotary bodies 34, 34, 34 are supported respectively in the support tube portions 30, 30, 30 and the disk centering portions 35, 35, 35 are located at positions in correspondence with the portions on the direct outside of the disk mount surface 31 of the disk mount member 28, the disk mount surface 31 and the top faces 34a, 34a, 34a of the rotary members 34, 34, 34 form a continuous curved surface, as shown in FIG. 24.

On the lower surface of the base portion 29 of the disk mount member 28, a cam member 40 formed in a substantially cylindrical shape is rotatably supported (see FIG. 22).

Figure 25:
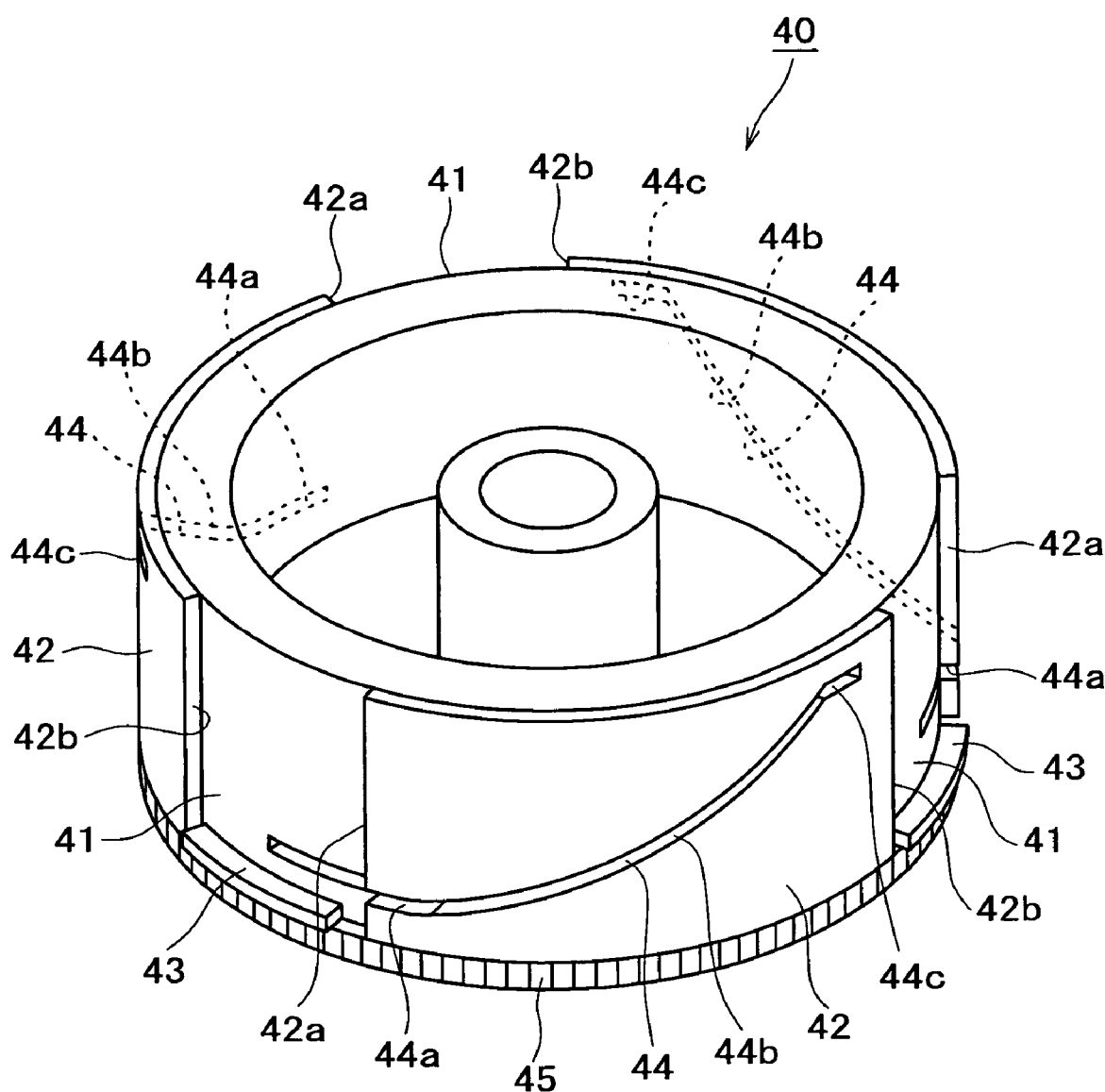
FIG. 25 is an enlarged perspective view of a cam member.

The cam member 40 is provided in its circumferential surface with three recessed portions 41, 41, 41 (see FIG. 25). The recessed portions 41, 41, 41 each have an outer surface formed as a circular arc surface projected outwards. Of the circumferential surface of the cam member 40, the other surfaces than the recessed portions 41, 41, 41 are formed as outside circumferential surface portions 42, 42, 42.

With the cam member 40 provided with the recessed portions 41, 41, 41, two each of step portions spaced from each other in the circumferential direction are formed respectively between the recessed portions 41, 41, 41 and the outside circumferential surface portions 42, 42, 42. The step portions on one side are provided as first pressing portions 42a, 42a, 42a, while the step portions on the other side are provided as second pressing portions 42b, 42b, 42b.

At lower end portions of the recessed portions 41, 41, 41 of the cam member 40, there are provided projection pieces 43, 43, 43 formed in a circular arc shape projected outwards, and the outer surfaces of the projection pieces 43, 43, 43 are formed as circular arc surfaces projected outwards. The outer surfaces of the projection pieces 43, 43, 43 are located on the slightly outer side relative to the outside circumferential surface portions 42, 42, 42.

The circumferential surface of the cam member 40 is provided with cam grooves 44, 44, 44 spaced at regular intervals in the circumferential direction. The cam groove 44 includes a lower-side horizontal portion 44a, a slant portion 44b so inclined as to be displaced upwards as one goes away from the lower-side horizontal portion 44a, and an upper-side horizontal portion 44c continuous with the slant portion 44b. The lower-side horizontal portion 44a is formed at a position ranging from the k recessed portion 41 to the outside circumferential surface portion 42, while the slant portion 44b and the upper-side horizontal portion 44c are formed at the outside circumferential surface portion 42.

The cam member 40 is provided at its lower end portion with a gear portion 45 extending in the circumferential direction.

The cam member 40 is, for example, rotatably supported on the disk mount member 28 through the support shaft 26, in the same manner as in the disk centering system 1.

In the condition where the cam member 40 is supported on the disk mount member 28, the outer circumferential portion of the cam member 40 is located at a position corresponding to the arrangement cutouts 30a, 30a, 30a.

Figure 26:
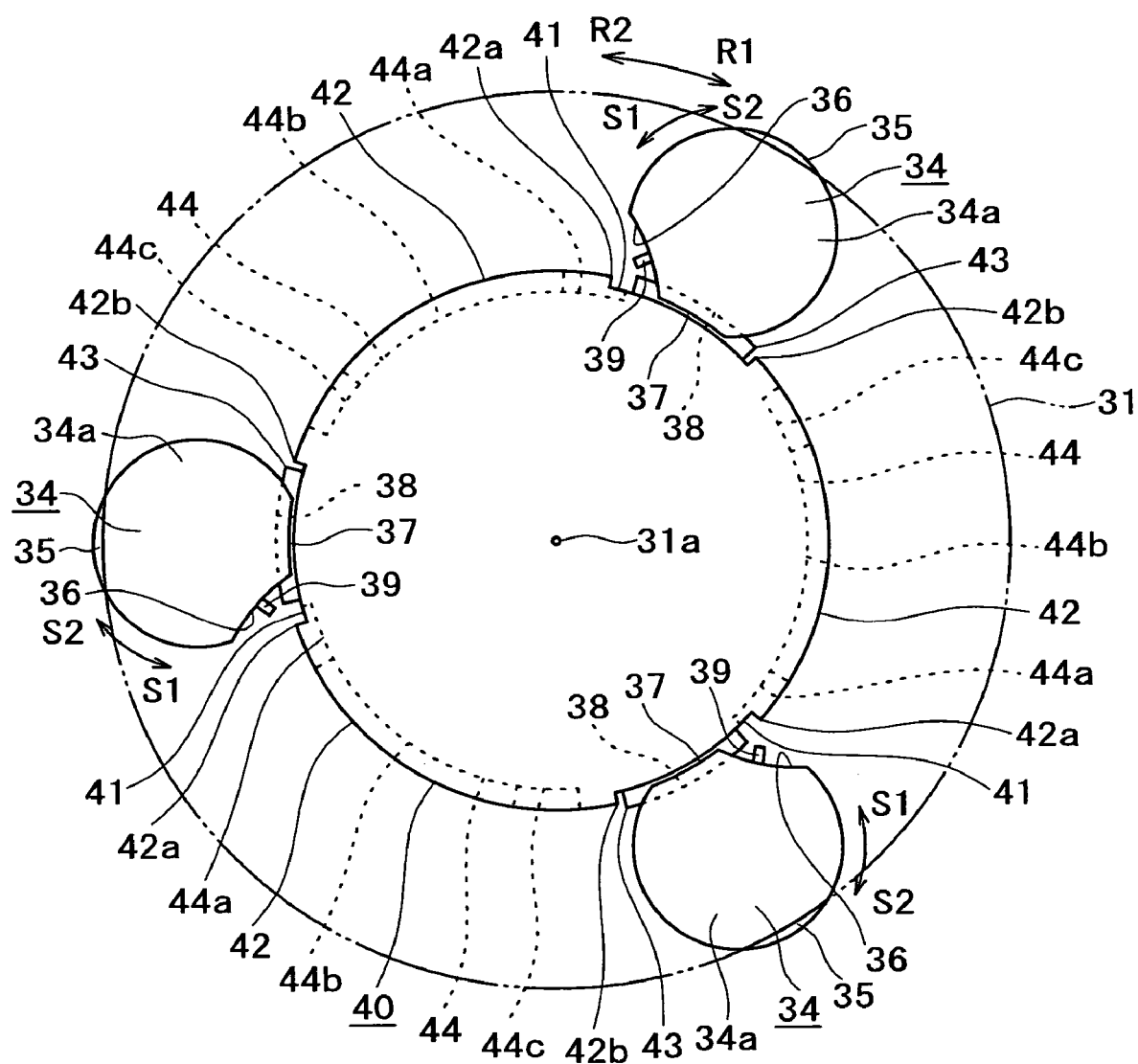

The cam member 40 is rotated by a drive force transmitted from a driving motor (not shown) to the gear portion 45, in a direction according to the rotating direction of the driving motor, i.e., in direction R1 or direction R2 shown in FIG. 26.

Now, a centering operation of the disk centering system 1A will be described below (see FIGS. 26 to 34).

First, the states of the portions before the centering of the disk form recording medium 1000 is performed will be described (see FIGS. 26 and 27).

As shown in FIG. 26, the projection pieces 43, 43, 43 of the cam member 40 are located at positions corresponding respectively to the arrangement cutouts 30a, 30a, 30a of the support tube portions 30, 30, 30 of the disk mount member 28, and the projection pieces 43, 43, 43 are engaged respectively with the second Geneva surfaces 38, 38, 38 of the rotary bodies 34, 34, 34. Therefore, the rotation of the rotary bodies 34, 34, 34 is restrained. The rotary bodies 34, 34, 34 are located at movement ends on the lower side, and are not projected upwards from the disk mount surface 31 of the disk mount member 28 (see FIG. 27).

Figure 27:
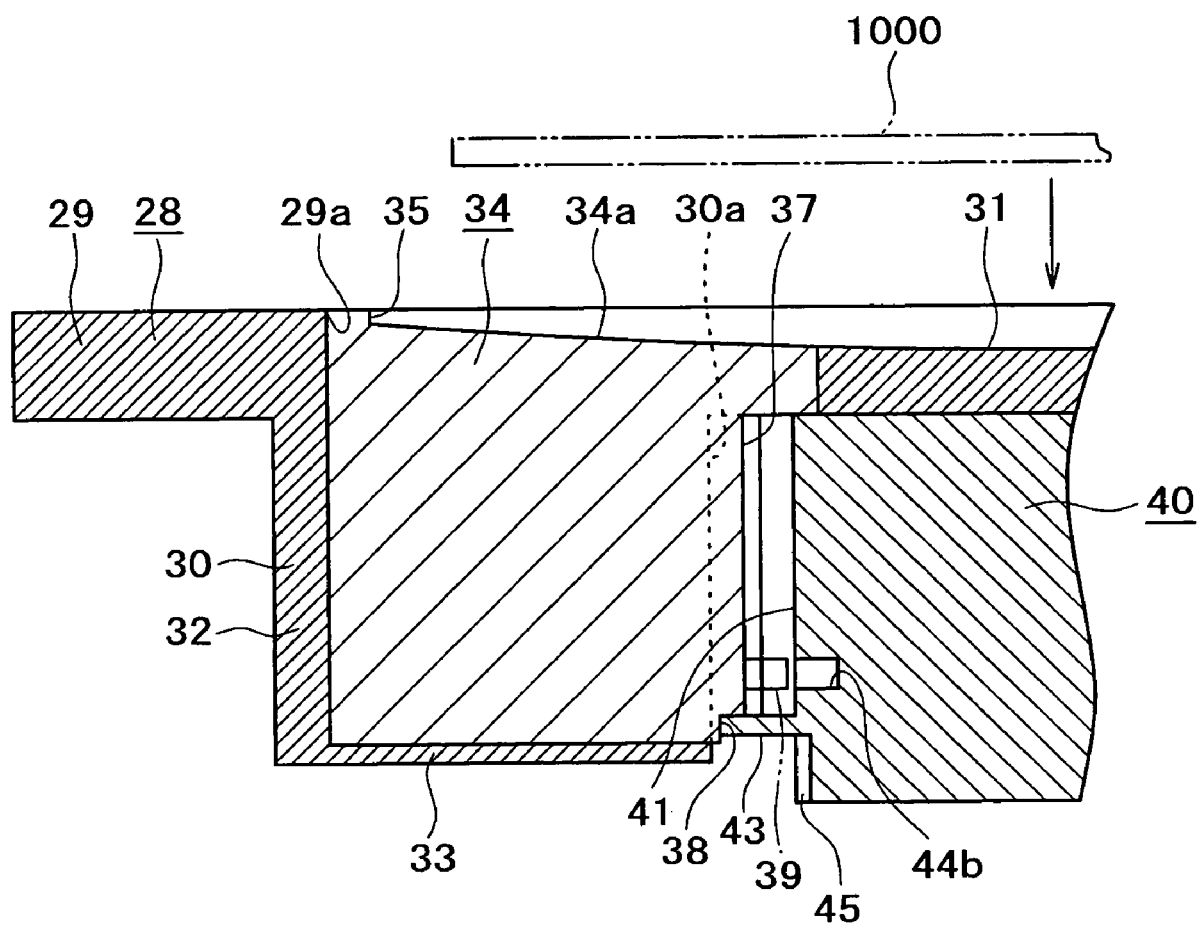
FIG. 27 is an enlarged sectional view showing the condition before the centering operation is performed.

The slide pins 39, 39, 39 of the rotary bodies 34, 34, 34 are not inserted in the cam grooves 44, 44, 44 of the cam member 40 (see FIG. 27).

As described above, the rotary bodies 34, 34, 34 are located at initial positions while being restrained from rotation, and the disk centering portions 35, 35, 35 are located on the outermost side (see FIG. 26). Therefore, the disk centering portions 35, 35, 35 are located on the direct outside of the disk mount surface 31.

Figure 28:
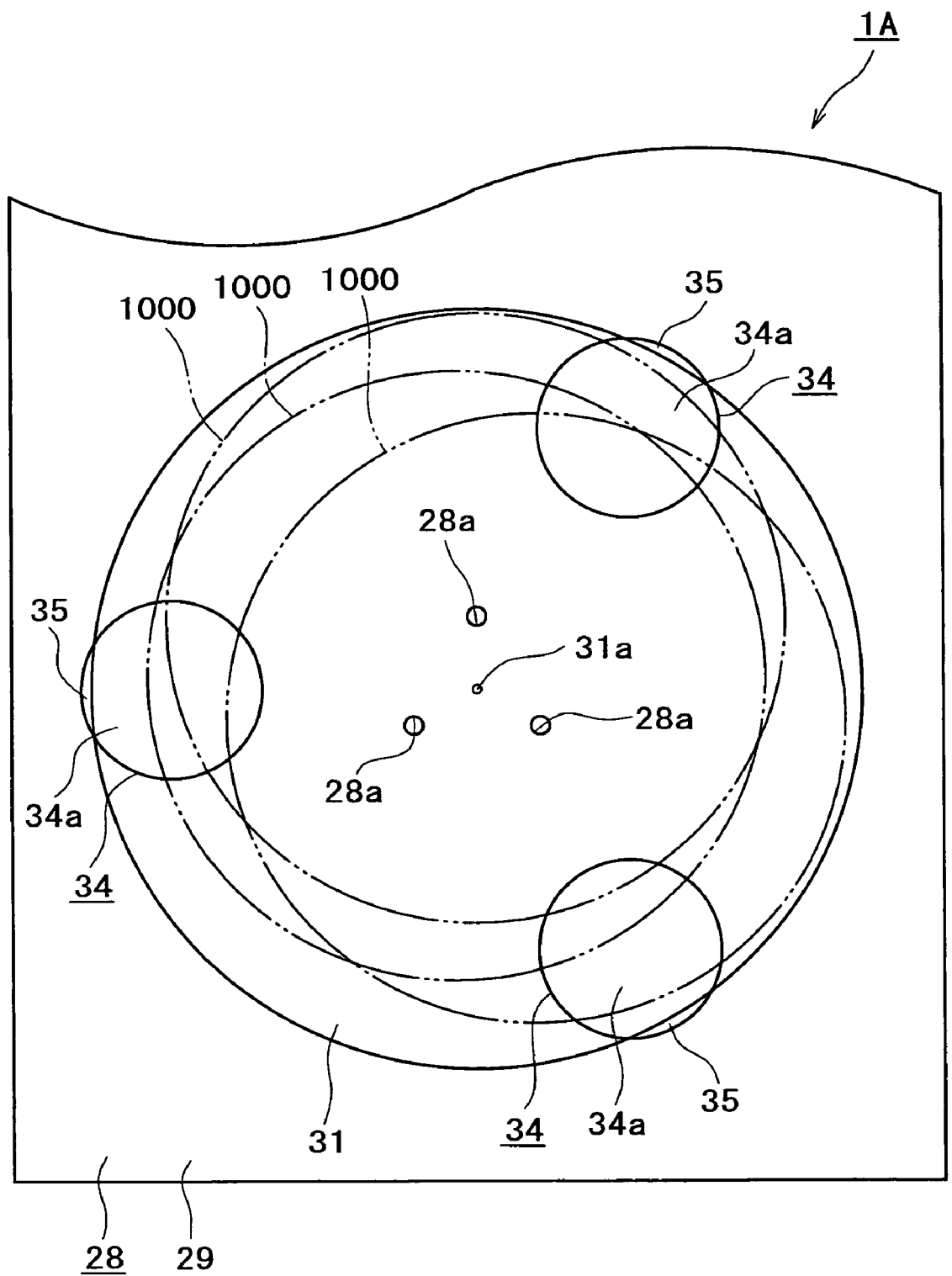
FIG. 28 is a schematic plan view showing the positions where a disk form recording medium can be mounted onto a disk mount surface.

When the disk form recording medium 1000 is mounted on the disk mount surface 31 of the disk mount member 28 and an operating button (not shown) is operated, the driving motor is rotated, whereby the cam member 40 is rotated in the direction R1 shown in FIG. 26. In this instance, as shown in FIG. 28, the disk form recording medium 1000 can be mounted at an arbitrary position, provided that the whole part thereof is in the portion located on the inside of the disk centering portions 35, 35, 35 of the rotary bodies 34, 34, 34, i.e., in the disk mount surface 31.

When the disk form recording medium 1000 is mounted on the disk mount surface 31 of the disk mount member 28, the presence of the disk form recording medium 1000 is detected by the above-mentioned photo sensors.

With the cam member 40 rotated in the direction R1 shown in FIG. 26, the projection pieces 43, 43, 43 make sliding contact respectively with the second Geneva surfaces 38, 38, 38 of the rotary bodies 34, 34, 34, while the rotary bodies 34, 34, 34 are not rotated, and the first pressing portions 42a, 42a, 42a of the cam member 40 gradually approach the rotary bodies 34, 34, 34.

Figure 29:
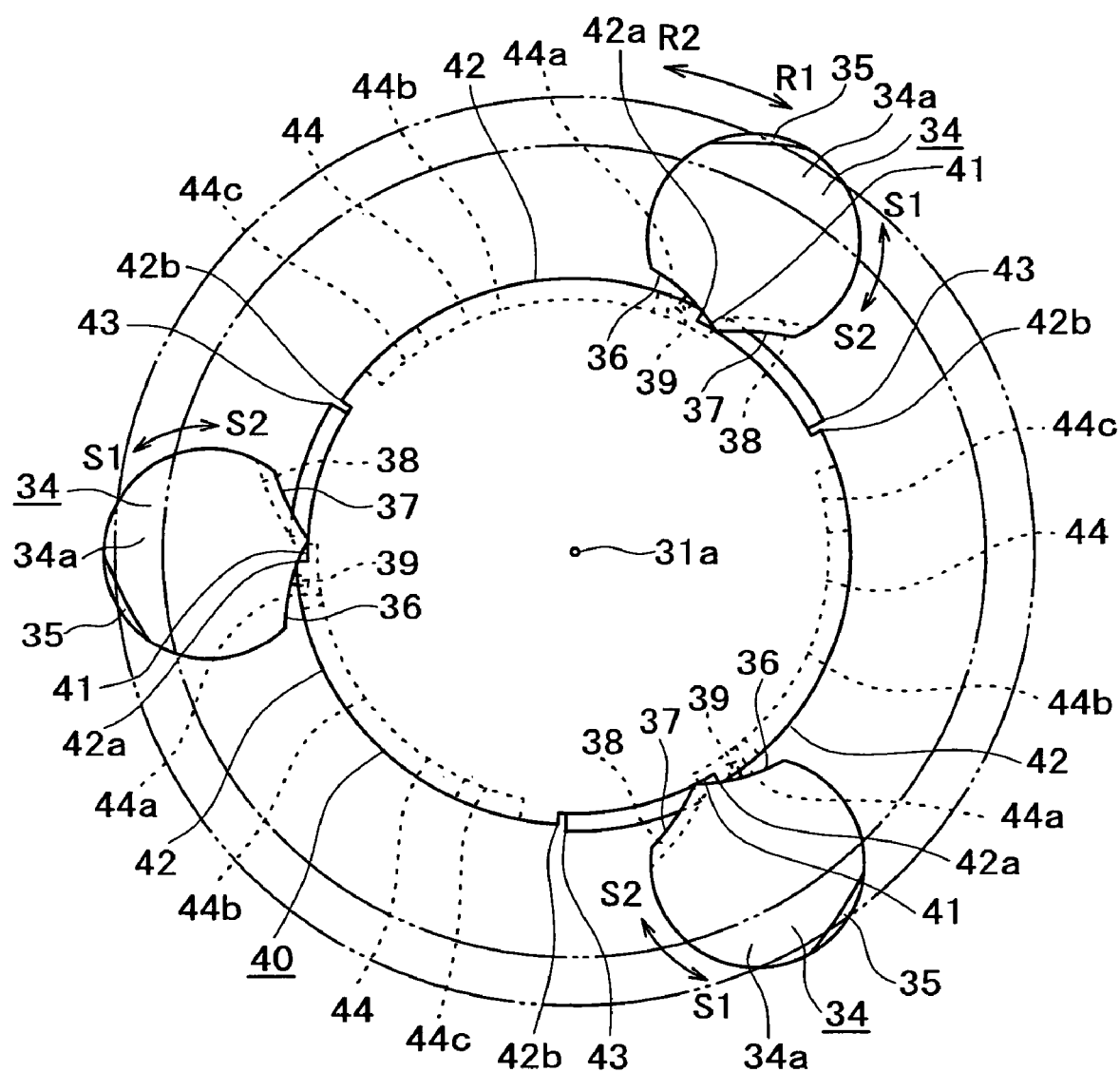
FIG. 29 is a plan view showing the condition immediately after the centering operation is started.
Figure 30:
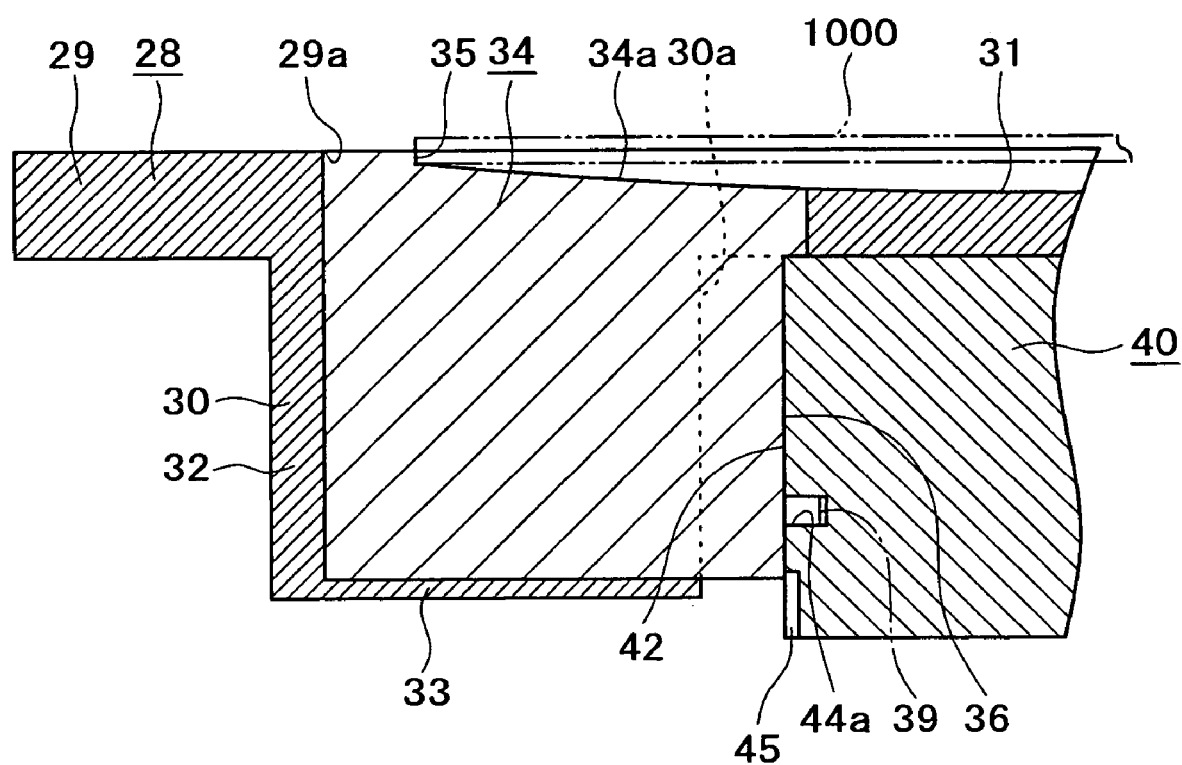
FIG. 30 is an enlarged sectional view showing the condition where the centering operation has been started and a slide pin of a disk centering member is inserted into a lower-side horizontal portion of a cam groove of the cam member.

Due to the rotation of the cam member 40, the first Geneva surfaces 36, 36, 36 of the rotary bodies 34, 34, 34 are pressed by the first pressing portions 42a, 42a, 42a (see FIG. 29), and the rotary bodies 34, 34, 34 are rotated in direction S1 shown in FIG. 29. With the rotary bodies 34, 34, 34 thus rotated in the direction S1, the slide pins 39, 39, 39 of the rotary bodies 34, 34, 34 are inserted respectively into the lower-side horizontal portions 44a, 44a, 44a of the cam grooves 44, 44, 44 in the cam member 40 (see FIG. 30).

By the rotation of the rotary bodies 34, 34, 34 in the direction S1, the disk centering portions 35, 35, 35 are rotated from the stand-by positions toward the centering positions for centering the disk form recording medium 1000, and the disk form recording medium 1000 is gradually moved by being pressed by the disk centering portions 35, 35, 35 so that the center thereof will coincide with the reference point 31a (see FIG. 29).

The centering of the disk form recording medium 1000 is completed when the center axis of the disk form recording medium 1000 comes to coincide with the reference point 31a (see FIG. 31).

Figure 32:
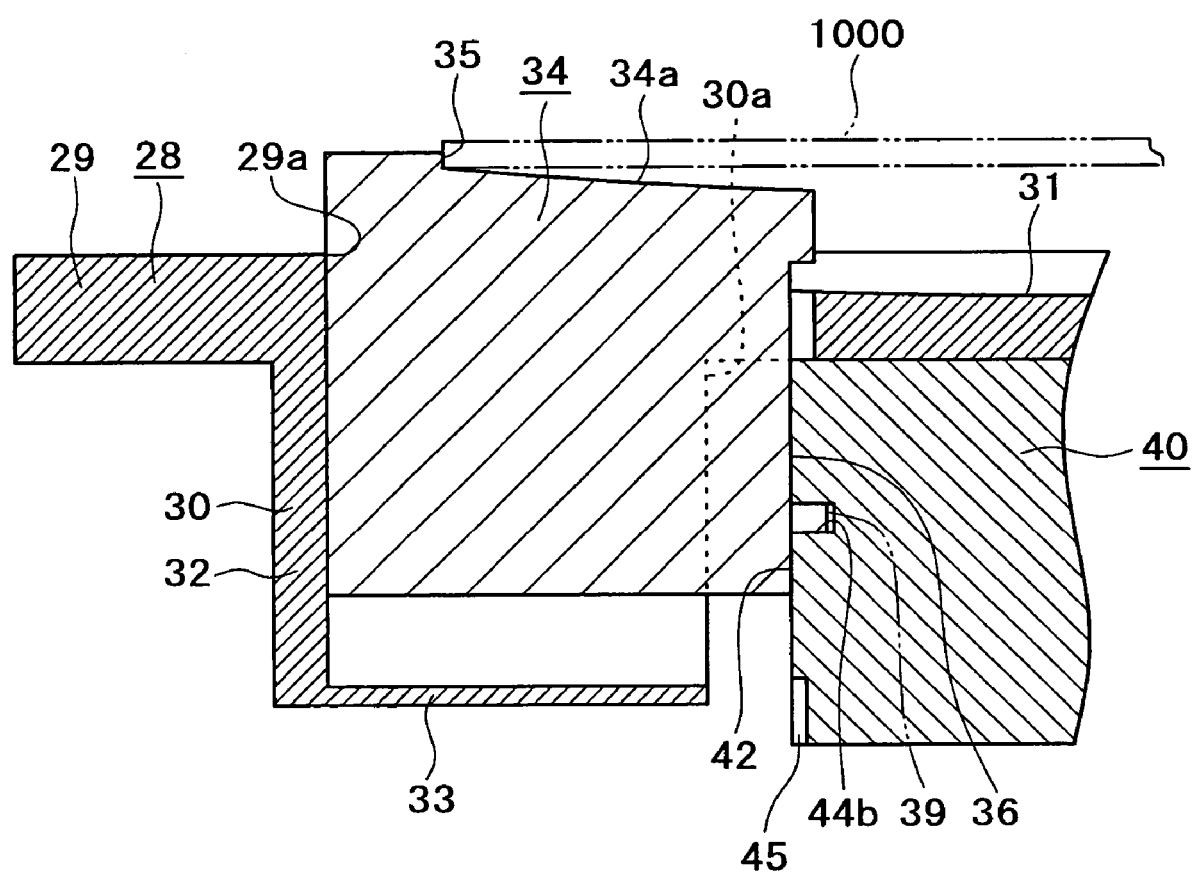
FIG. 32 is an enlarged sectional view showing the condition where the slide pin has been inserted into a slant portion of the cam groove and the disk form recording medium is lifted up by the disk centering member.

With the cam member 40 further rotated continuously, the slide pins 39, 39, 39 of the rotary bodies 34, 34, 34 are relatively moved from the lower-side horizontal portions 44a, 44a, 44a toward the slant portions 44b, 44b, 44b of the cam grooves 44, 44, 44 (see FIG. 32). Therefore, the rotary bodies 34, 34, 34 are moved upwards to project upwards from the disk mount surface 31, whereby the disk form recording medium 1000 is gradually lifted up. In this instance, as shown in FIG. 33, the rotary bodies 34, 34, 34 are not rotated because the first Geneva surfaces 36, 36, 36 of the rotary bodies 34, 34, 34 are in sliding contact respectively with the outside circumferential surface portions 42, 42, 42 of the cam member 40.

Figure 34:
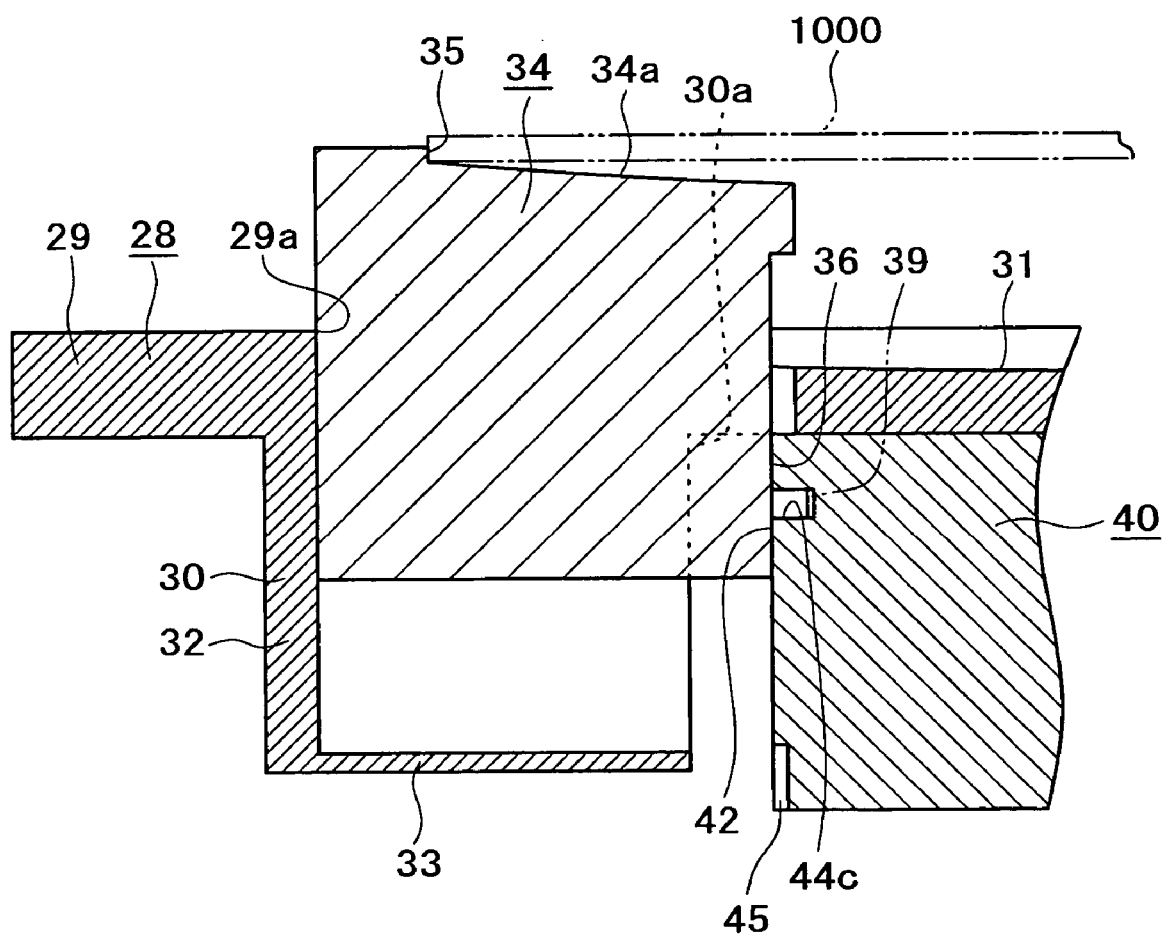
FIG. 34 is an enlarged sectional view showing the condition where the slide pin has been inserted into an upper-side horizontal portion of the cam groove and the disk form recording medium has been lifted up to a chucking position.

When the cam member 40 is further rotated continuously and the slide pins 39, 39, 39 of the rotary bodies 34, 34, 34 are relatively moved from the slant portions 44b, 44b, 44b to the upper-side horizontal portions 44c, 44c, 44c of the cam grooves 44, 44, 44, the rotary bodies 34, 34, 34 are moved to movement ends on the upper side, and the disk form recording medium 1000 reaches the chucking position (see FIG. 34). At the time of when the slide pins 39, 39, 39 of the rotary bodies 34, 34, 34 have been relatively moved respectively to the upper-side horizontal portions 44c, 44c, 44c, the rotation of the driving motor is stopped, and the rotation of the cam member 40 is stopped.

Subsequently, the disk chucking mechanism 103 is moved in the direction (direction L1 shown in FIG. 1) of approaching the disk form recording medium 1000 lifted up by the rotary bodies 34, 34, 34. At the time when the disk table 108 and the chucking pulley 110 have been moved to a central portion of the disk form recording medium 1000, the movement of the disk chucking mechanism 103 in the direction L1 is stopped, the pulley support member 109 is turned in the direction (direction T1 shown in FIG. 1) of approaching the disk form recording medium 1000, and an inner circumferential portion of the disk form recording medium 1000 is clamped between the disk table 108 and the chucking pulley 110, i.e., the disk form recording medium 1000 is chucked.

Figure 33:
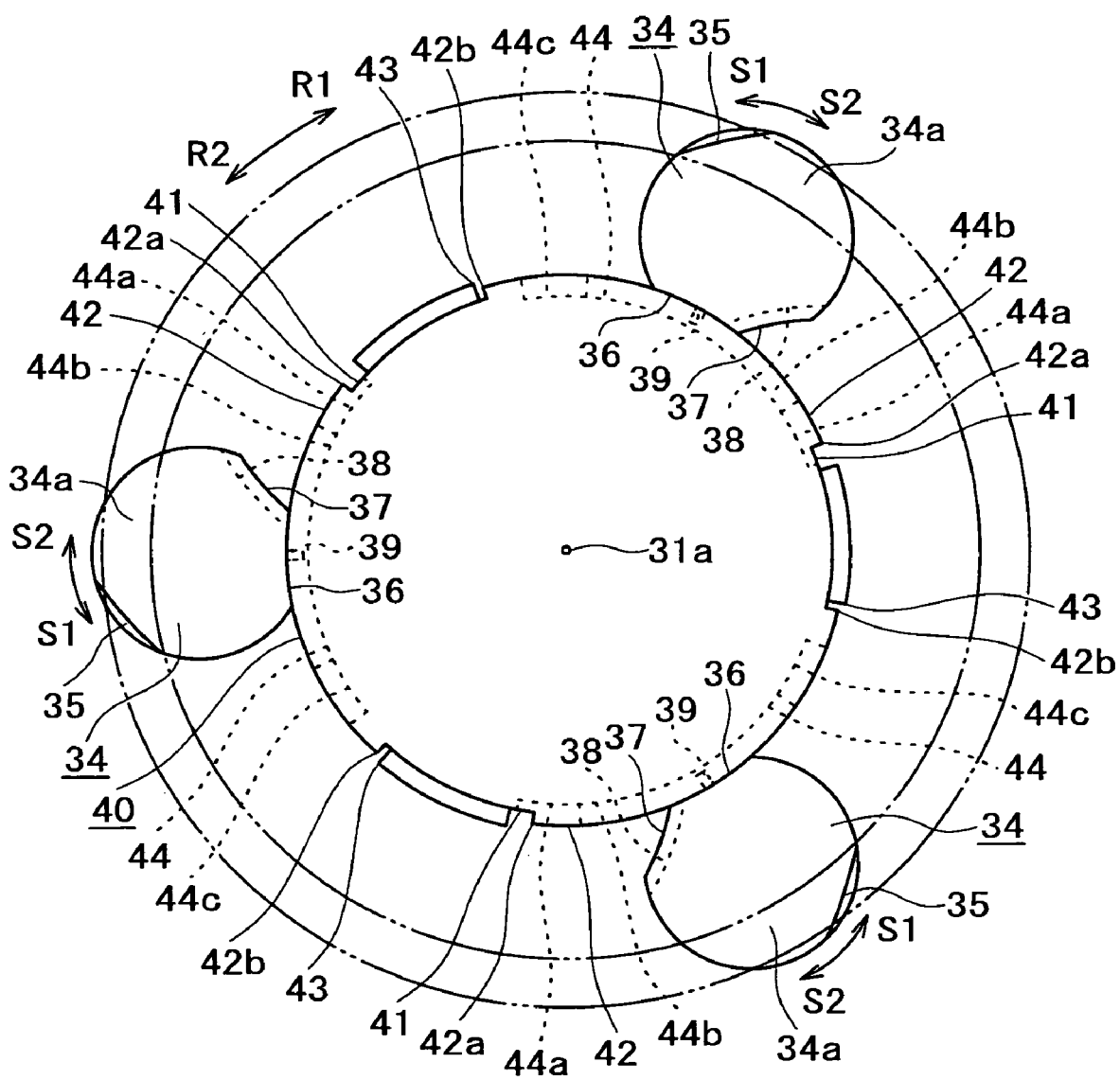
FIG. 33 is a plan view showing the condition where the rotation of the disk centering members is restricted when the disk form recording medium is being lifted up by the disk centering members.

With the disk form recording medium 1000 thus chucked, the driving motor is rotated in a direction reverse to the above, whereby the cam member 40 is rotated in direction R2 shown in FIG. 33, the slide pins 39, 39, 39 of the rotary bodies 34, 34, 34 are relatively moved from the upper-side horizontal portions 44c, 44c, 44c toward the slant portions 44b, 44b, 44b of the cam grooves 44, 44, 44, and the rotary bodies 34, 34, 34 are downwardly spaced away from the disk form recording medium 1000. The cam member 40 is stopped at a predetermined position by stopping the driving motor.

With the rotary bodies 34, 34, 34 moved downwards, the disk form recording medium 1000 is rotated attendant on the rotation of the disk table 108, and the light pickup 107 is driven to perform recording or reproduction of information signals onto or from the disk form recording medium 1000.

When the recording or reproduction of information signals is finished, the driving motor is again rotated, whereby the cam member 40 is rotated in the direction R1, the slide pins 39, 39, 39 of the rotary bodies 34, 34, 34 are relatively moved from the slant portions 44b, 44b, 44b to the upper-side horizontal portions 44c, 44c, 44c of the cam grooves 44, 44, 44, the top faces 34a, 34a, 34a of the rotary bodies 34, 34, 34 make contact with the lower surface of the disk form recording medium 1000, and the disk centering portions 35, 35, 35 make contact with the outer circumferential edge of the disk form recording medium 1000. When the top faces 34a, 34a, 34a of the rotary bodies 34, 34, 34 make contact with the lower surface of the disk form recording medium 1000 and the disk centering portions 35, 35, 35 make contact with the outer circumferential edge of the disk form recording medium 1000, the rotation of the driving motor is stopped, and the rotation of the cam member 40 is stopped.

Subsequently, the pulley support member 109 is turned in the direction (direction T2 shown in FIG. 1) of spacing away from the disk form recording medium 1000, whereby the chucking of the disk form recording medium 1000 is canceled, and the disk chucking mechanism 103 is moved in the direction (direction L2 shown in FIG. 1) of spacing away from the disk form recording medium 1000.

When the disk chucking mechanism 103 is moved away from the disk form recording medium 1000, the disk form recording medium 1000 is located at the chucking position, and, at this chucking position, the user can take out the disk form recording medium 1000 from the disk drive 100.

At the chucking position, the disk form recording medium 1000 is lifted up by the rotary bodies 34, 34, 34, to form a predetermined space between the disk form recording medium 1000 and the disk mount surface 31 of the disk mount member 28 (see FIG. 34). Therefore, the user can insert his hand or fingers into the space and can easily take out the disk form recording medium 1000.

When the disk form recording medium 1000 is taken out of the disk drive 100, the absence of the disk form recording medium 1000 is detected by the photo sensors.

With the absence of the disk form recording medium 1000 thus detected by the photo sensors, the driving motor is rotated, whereby the cam member 40 is rotated in the direction R2, the rotary bodies 34, 34, 34 are moved downwards, then the disk form recording medium 1000 is mounted on the disk mount surface 31, the rotary bodies 34, 34, 34 are rotated in the direction S2, and the disk centering portions 35, 35, 35 are spaced away from the outer circumferential edge of the disk form recording medium 1000; thus, the portions are returned into the original states shown in FIGS. 26 and 27. Therefore, the rotary bodies 34, 34, 34 are returned into the initial positions, and, attendant on this, the disk centering portions 35, 35, 35 are returned into the stand-by positions.

Incidentally, after the rotary bodies 34, 34, 34 are moved downwards by the rotation of the cam member 40 in the direction R2, the cam member 40 is further rotated in the direction R2, when the pressed surfaces 37, 37, 37 of the rotary bodies 34, 34, 34 are pressed by the projection pieces 43, 43, 43, whereby the rotary bodies 34, 34, 34 are rotated in the direction S2, to be returned into the initial positions.

While an example in which the disk form recording medium 1000 is taken out of the disk drive 100 when the disk chucking mechanism 103 has been moved in the direction (direction L2 shown in FIG. 1) of spacing away from the disk form recording medium 1000 has been described above, there may be adopted a method in which, subsequent to the movement of the disk chucking mechanism 103 away from the disk form recording medium 1000, the rotary bodies 34, 34, 34 are moved downwards to once mount the disk form recording medium 1000 on the disk mount surface 31.

In this case, the disk form recording medium 1000 is again lifted up by the rotary bodies 34, 34, 34 and stopped at a predetermined position, to form a predetermined space between the disk form recording medium 1000 and the disk mount surface 31 of the disk mount member 28 so that the user can easily take out the disk form recording medium 1000.

As has been described above, also in the disk centering system 1A, in the same manner as in the disk centering system 1, the disk centering portions 35, 35, 35 are moved from the stand-by positions toward the centering positions to make contact with the outer circumferential edge of the disk form recording medium 1000 mounted on the disk mount surface 31, thereby centering the disk form recording medium 1000; therefore, the disk form recording medium 1000 can be mounted at an arbitrary position in a predetermined range on the disk mount surface 31, the operator can easily handle the disk form recording medium 1000, and the convenience in use of the disk centering system 1A can be enhanced.

Besides, the centering positions are at an equal distance from the reference point 31a in the radial directions with the reference point 31a as a center, and the disk centering portions 35, 35, 35 are moved from the stand-by positions to the centering positions, whereby the disk form recording medium 1000 is centered, so that a disk form recording medium can be centered irrespectively of the size thereof.

Furthermore, there is no fear of the trouble that the inner circumferential portion of the disk form recording medium 1000 might be scratched or damage, which trouble would occur in the case where the disk form recording medium 1000 is mounted to a centering portion of a disk table provided with engagement claws.

In addition, since the disk centering portions 35, 35, 35 are rotated attendant on the rotation of the rotary bodies 34, 34, 34 to thereby center the disk form recording medium 1000, the burden exerted from the disk centering portions 35, 35, 35 on the disk form recording medium 1000 at the time of contact of the disk centering portions 35, 35, 35 with the outer circumferential edge of the disk form recording medium 1000 is slight, and the outer circumferential edge of the disk form recording medium 1000 can be prevented from being broken or damaged.

Also in the disk centering system 1A, in the same manner as in the disk centering system 1, the disk mount surface 31 is formed as a recessed curved surface, so that the lower surface, or recording surface, of the disk form recording medium 1000 can be prevented from being scratched.

Besides, in the disk centering system 1A, the disk centering portions 35, 35, 35 are projected upwards from the disk mount surface 31 after the movement of the disk centering portions 35, 35, 35 from the stand-by positions is started, so that, at the time of mounting the disk form recording medium 1000 on the disk mount surface 31, the disk form recording medium 1000 would not easily make contact with the disk centering portions 35, 35, 35, and the disk form recording medium 1000 can be prevented from being scratched.

Further, the disk centering portions 35, 35, 35 at the stand-by positions are located on the outside of the disk mount surface 31, so that, at the time of mounting the disk form recording medium 1000 on the disk mount surface 31, the disk form recording medium 1000 does not make contact with the disk centering portions 35, 35, 35, and the disk form recording medium 1000 can be prevented from being scratched.

Furthermore, since the rotary bodies 34, 34, 34 are moved synchronously, an efficient operation is performed and the mechanism can be simplified.

In addition, in the disk centering system 1A, the disk form recording medium 1000 having been centered is lifted up to the chucking position by the rotary bodies 34, 34, 34 before being chucked, the chucking of the disk form recording medium 1000 can be performed easily.

Besides, since the rotary bodies 34, 34, 34 functioning as the disk lift-up portions are integrally provided with the disk centering portions 35, 35, 35 for centering the disk form recording medium 1000, it is possible to reduce the number of component parts and, hence, to reduce the manufacturing cost.

Incidentally, while an example in which three rotary bodies 34, 34, 34 are provided has been described above, the number of the rotary bodies 34 is not limited to three, and four or more rotary bodies 34 may be provided in radial directions with the reference point 31a as a center.

Next, a third embodiment of the disk centering system will be described (see FIGS. 35 to 45).

The disk centering system 1B is provided as a part of a disk drive (not shown). The disk drive is provided, for example, with a taking-out and feeding mechanism for taking out and feeding a disk form recording medium 1000, a disk chucking mechanism for chucking the disk form recording medium 1000 having been taken out, and a disk recording or reproducing portion for recording or reproduction of information signals onto or from the disk form recording medium 1000.

Figure 36:
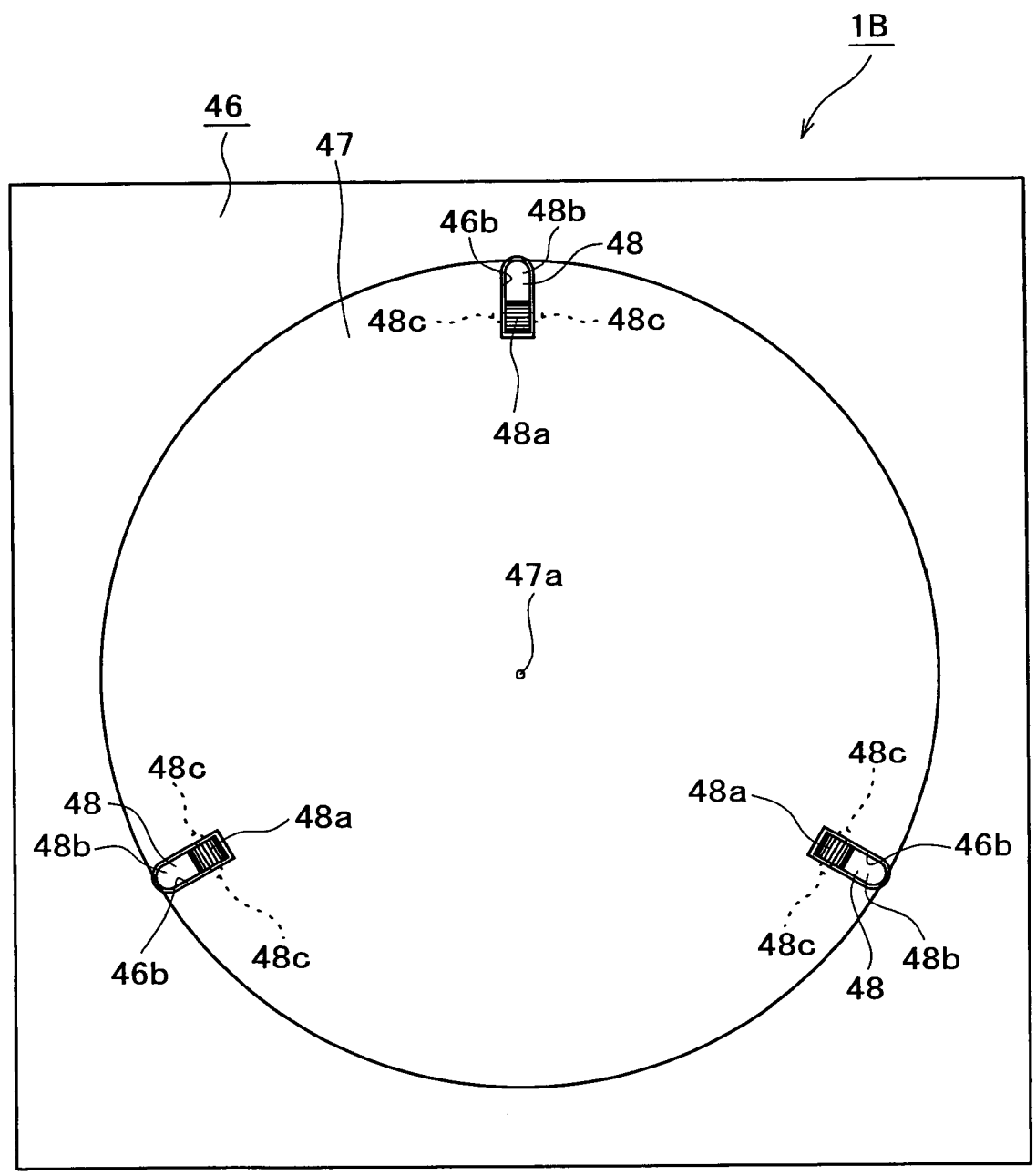
FIG. 36 is a plan view of the disk centering system.

The disk centering system 1B comprises predetermined members supported on a disk mount member 46 (see FIGS. 35 and 36). The disk mount member 46 is formed in a substantially flat plate-like shape, and is provided at its upper surface with a disk mount surface 47 formed as a gentle recessed curved surface, for example, a gentle spherical surface (see FIGS. 36 and 37). The disk mount surface 47 is formed, for example, to be circular in plan view, and the center point thereof is formed as a reference point 47a which is located at the lowermost position.

Figure 37:
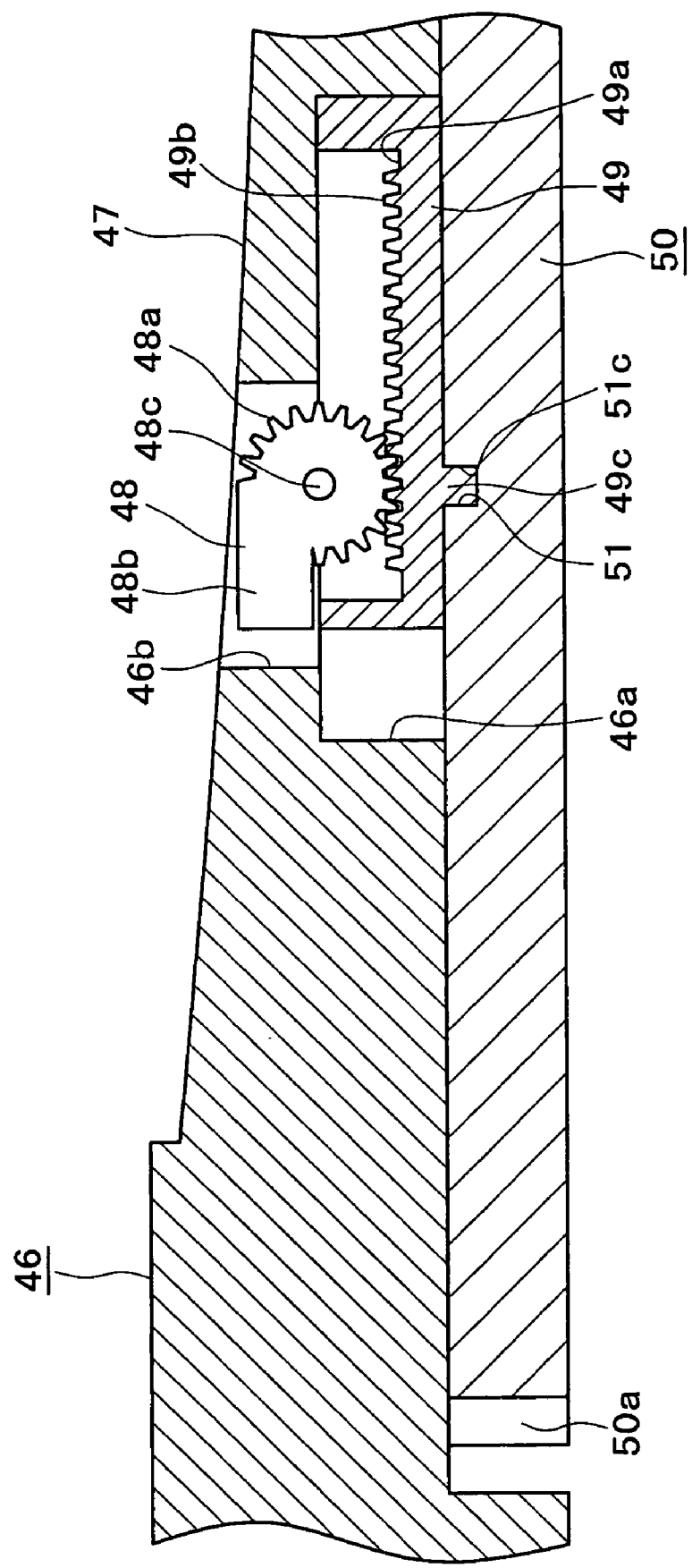
FIG. 37 is an enlarged sectional view of an essential part of the disk centering system.
Figure 38:
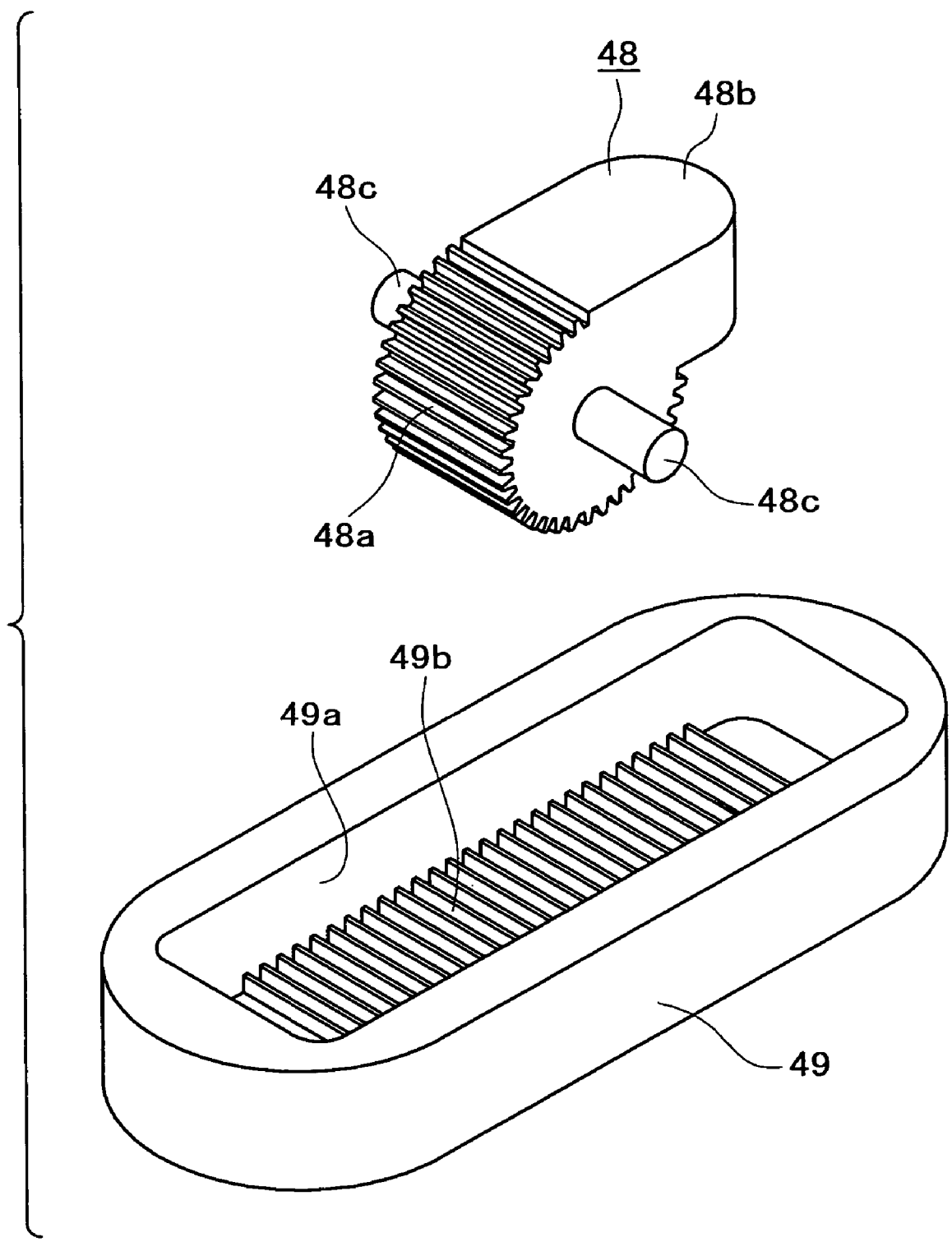
FIG. 38 is an enlarged exploded perspective view showing the disk centering member and a rack member.

The lower surface of the disk mount member 46 is provided with guide grooves 46a, 46a, 46a opened to the lower side (see FIGS. 35 and 37). The guide grooves 46a, 46a, 46a are located at regular intervals along the circumferential direction, and are formed to be elongate in radial directions at positions at an equal distance from the reference point 47a in the radial directions.

The guide groove 46a is provided with a communication hole 46b penetrating vertically. The guide groove 46a is provided, at a central portion in the longitudinal direction thereof, with support grooves 46c, 46c opened to the lower side. The support grooves 46c, 46c are formed at positions on the opposite sides with respect to the communication hole 46b, and are communicated with the communication hole 46b.

Disk centering members 48, 48, 48 are disposed respectively in the communication holes 46b, 46b, 46b (see FIG. 37). The disk centering member 48 includes a gear portion 48a, a disk centering portion 48b, and supported shaft portions 48c, 48c (see FIG. 38). The disk centering portion 48b is projected from a circumferential surface of the gear portion 48a. The supported shaft portions 48c, 48c are projected to the opposite sides from central portions of both side surfaces of the gear portion 48a.

The disk centering member 48 is supported with its supported shaft portions 48c, 48c inserted respectively in the support holes 46c, 46c, and is rotatable relative to the disk mount member 46. By being rotated relative to the disk mount member 46, the disk centering member 48 is projected upwards from the communication hole 46b or retracted into the communication hole 46b.

Rack members 49, 49, 49 are movably supported in the guide grooves 46a, 46a, 46a of the disk mount members 46, 46, 46 (see FIG. 37). The rack member 49 is formed in flat shape elongate in one direction, and is provided with an arrangement recessed portion 49a opened to the upper side (see FIG. 38). The arrangement recessed portion 49a is provided with a rack portion 49b. The rack member 49 is provided on its lower surface with a slide shaft portion 49c projected downwards.

The rack members 49, 49, 49 are movable in the longitudinal directions of the guide grooves 46a, 46a, 46a, and the rack portions 49b, 49b, 49b are meshed respectively with the gear portions 48a, 48a, 48a of the disk centering members 48, 48, 48 (see FIG. 37).

A cam member 50 is rotatably supported on the lower surface of the disk mount member 46 (see FIGS. 35 and 37). The cam member 50 is formed in a circular disk shape, and is provided in its upper surface with cam grooves 51, 51, 51 at regular intervals along the circumferential direction. The cam groove 51 includes an outside non-active portion 51a, an active portion 51b displaced toward a central portion of the cam member 50 as one goes away from the outside non-active portion 51a, and an inside non-active portion 51c continuous with the active portion 51b. The outside non-active portion 51a and the inside non-active portion 51c are each formed in a circular arc shape with the center of rotation of the cam member 50 as a center.

A circumferential portion of the cam member 50 is provided as a gear portion 50a.

The cam member 50 is rotatably supported on the disk mount member 46 through a support shaft 26, in the same manner as in disk centering system 1, for example.

In the condition where the cam member 50 is supported on the disk mount member 46, the slide shaft portions 49c, 49c, 49c of the rack members 49, 49, 49 are slidably engaged respectively with the cam grooves 51, 51, 51 of the cam member 50.

Figure 39:
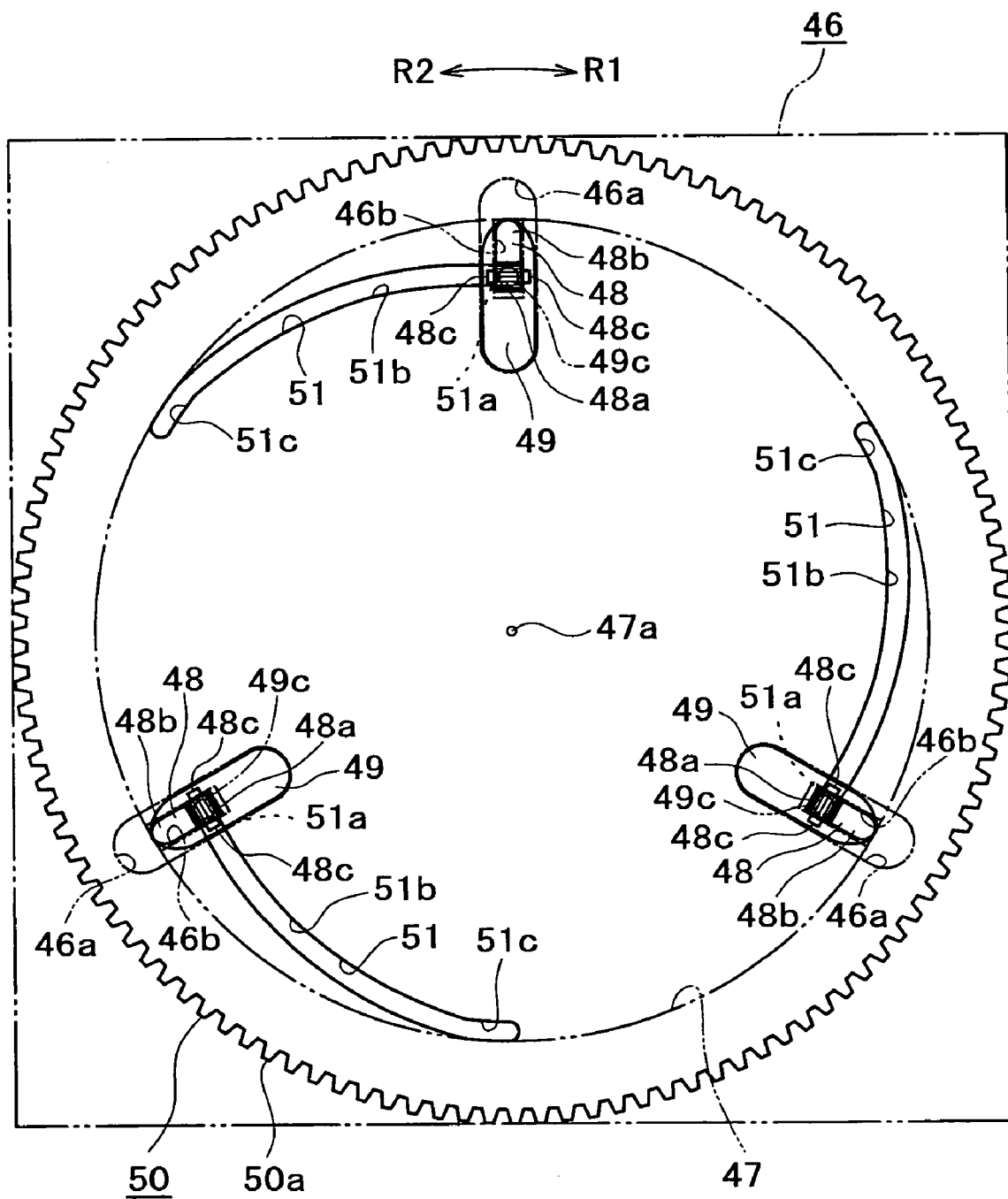

The cam member 50 is rotated by a drive force transmitted from a driving motor (not shown) to the gear portion 50a, in a direction according to the rotating direction of the driving motor, i.e., in direction R1 or direction R2 shown in FIG. 39.

Now, a centering operation of the disk centering system 1B will be described below (see FIGS. 39 to 45).

First, the states of portions before centering of the disk form recording medium 1000 is performed will be described (see FIGS. 39 and 40).

The slide shaft portions 49c, 49c, 49c of the rack members 49, 49, 49 are in engagement respectively with the inside non-active portions 51c, 51c, 51c of the cam grooves 51, 51, 51 in the cam member 50 (see FIG. 39). Therefore, the rack members 49, 49, 49 are located at movement ends on the inner side in the moving ranges, i.e., on the side for approaching the reference point 47a.

Of the disk centering members 48, 48, 48, the disk centering portions 48b, 48b, 48b are retracted into the communication holes 46b, 46b, 46b in the disk mount member 46 (see FIG. 40); thus, the disk centering portions 48b, 48b, 48b are located at stand-by positions.

Figure 41:
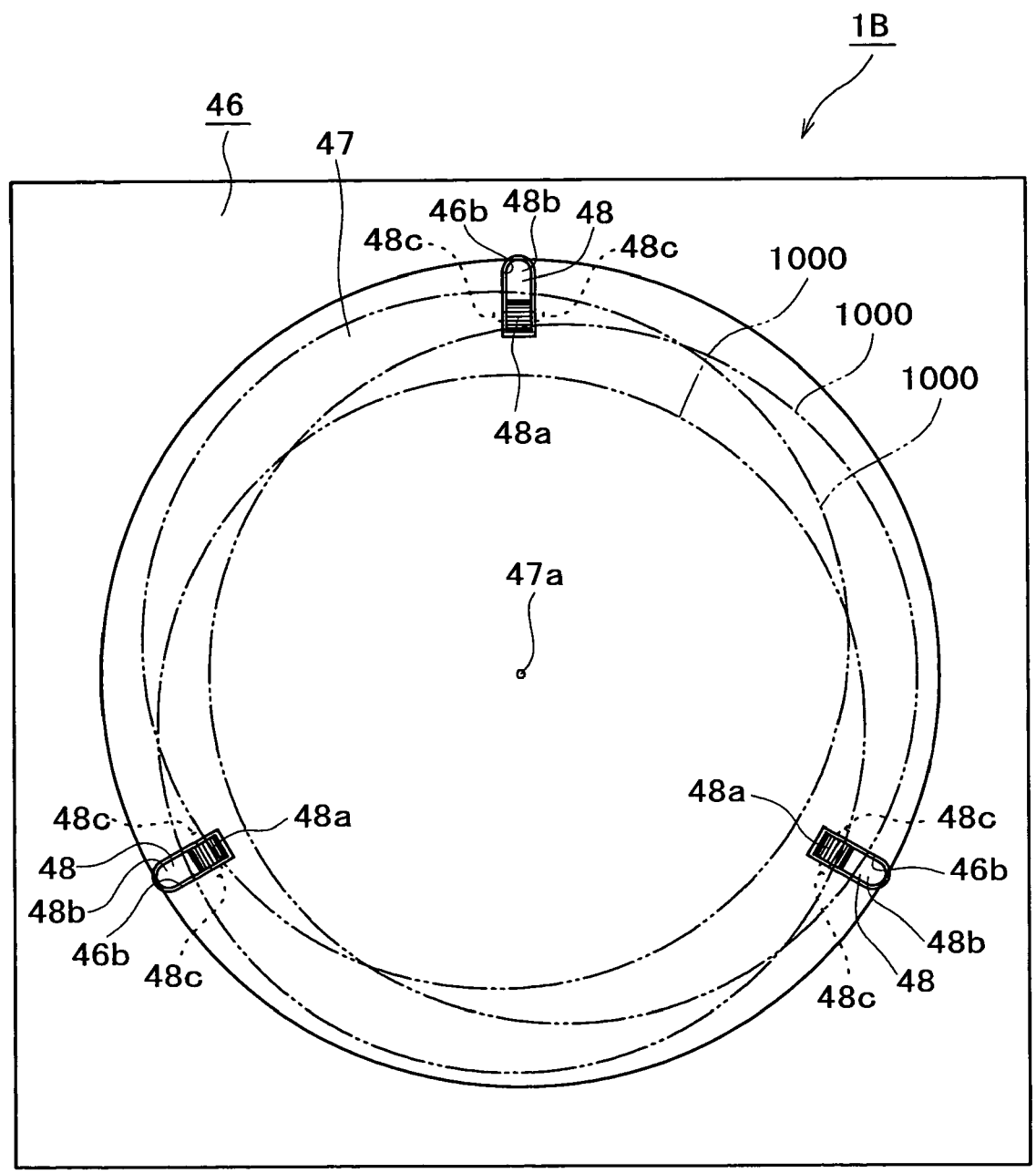
FIG. 41 is a schematic plan view showing the positions where the disk form recording medium is mounted onto a disk mount surface.

When the disk form recording medium 1000 is mounted on the disk mount surface 47 of the disk mount member 46 and an operating button (not shown) is operated, the driving motor is rotated, and the cam member 50 is rotated in direction R1 shown in FIG. 39. In this instance, as shown in FIG. 41, the disk form recording medium 1000 can be mounted at an arbitrary position, provided that the whole part thereof is located on the inside of the disk centering portions 48b, 48b, 48b of the disk centering members 48, 48, 48.

Figure 42:
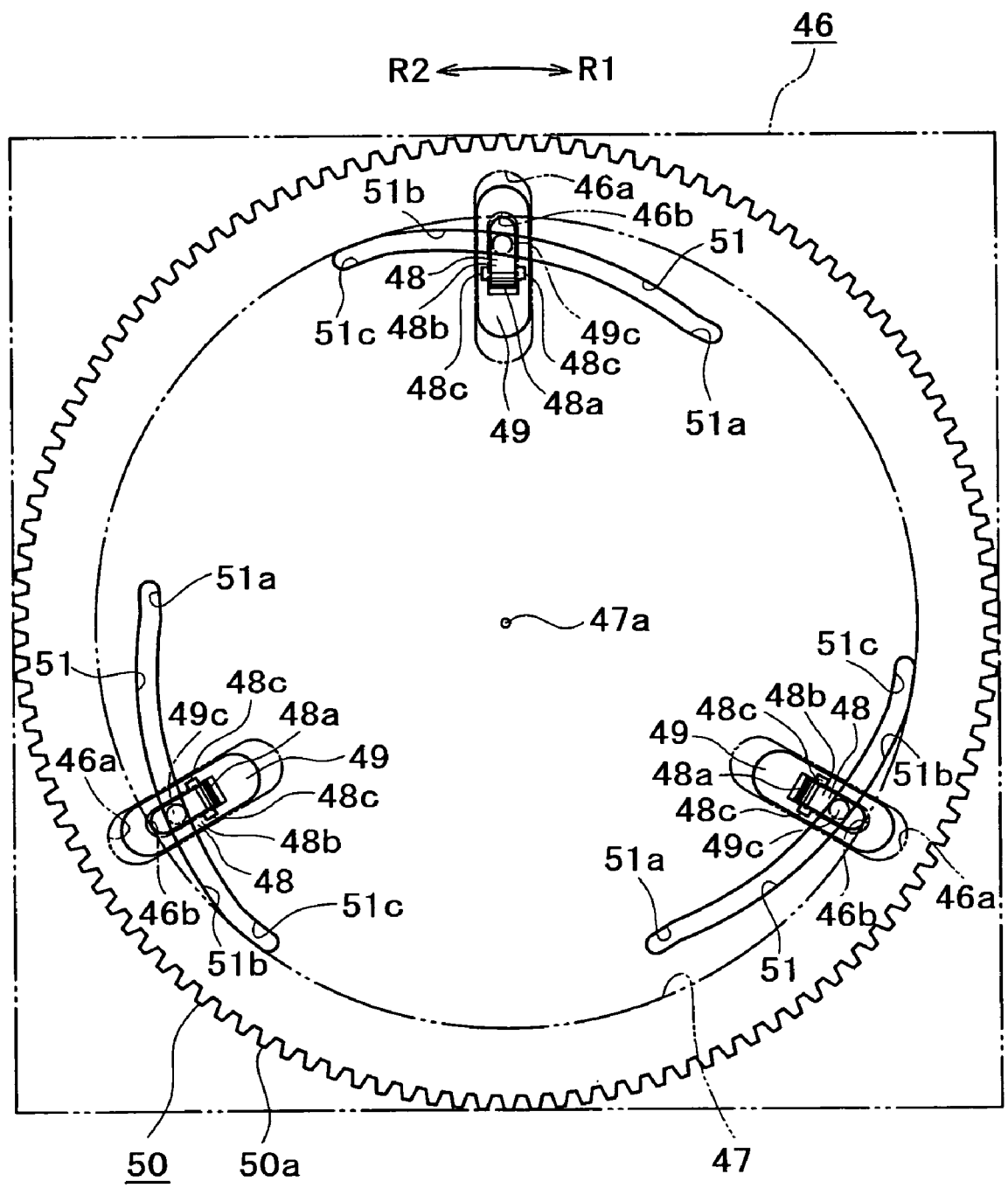
FIG. 42 is a plan view showing the condition where the centering operation has been started and slide shaft portions of the rack members are engaged with active portions of cam grooves of cam members.
Figure 43:
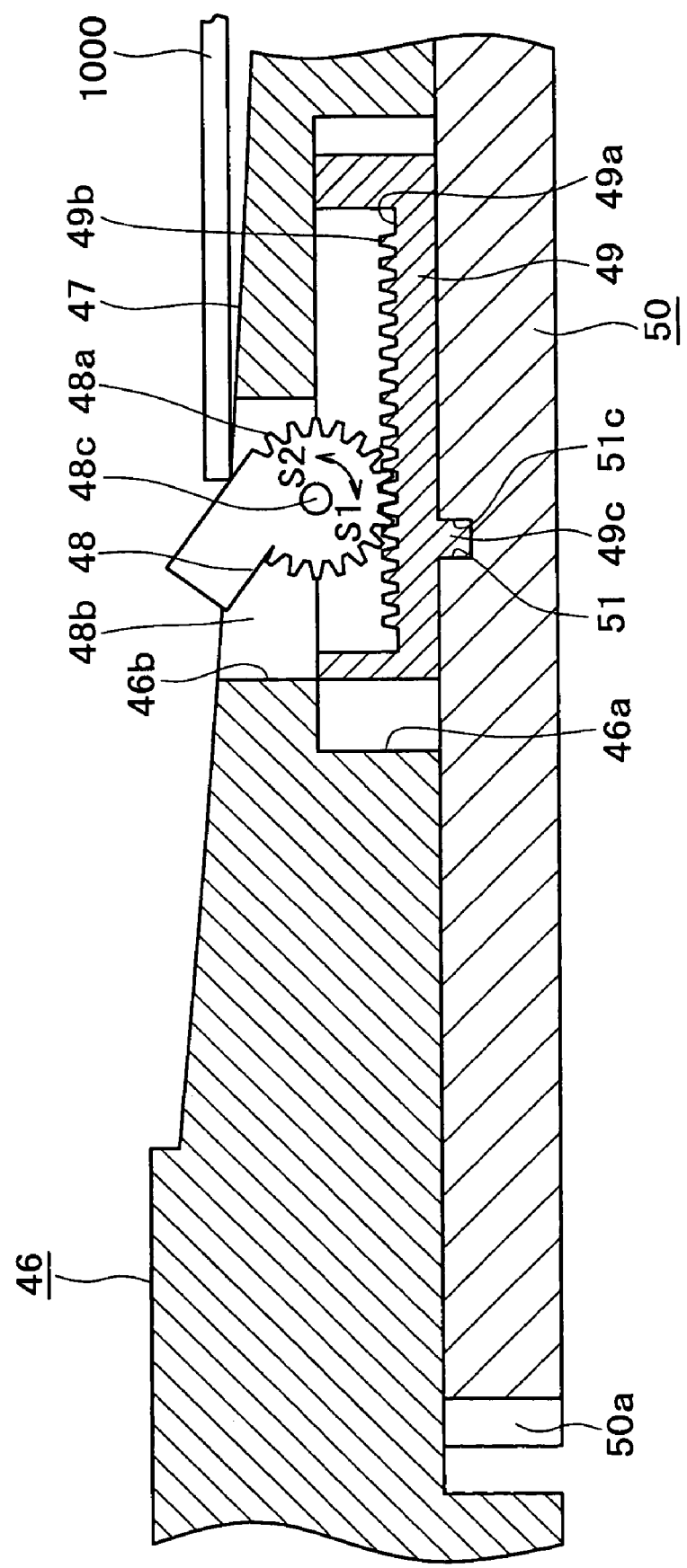
FIG. 43 is an enlarged sectional view showing the condition where the centering operation has been started and a centering member is being turned.

With the cam member 50 thus rotated in the direction R1, the slide shaft portions 49c, 49c, 49c of the rack members 49, 49, 49 are relatively moved respectively from the inside non-active portions 51c, 51c, 51c toward the active portions 51b, 51b, 51b of the cam grooves 51, 51, 51 in the cam member 50 (see FIG. 42). Therefore, the rack members 49, 49, 49 are gradually moved toward the outer side while being guided respectively by the support grooves 46c, 46c, 46c in the disk mount member 46, whereby the gear portions 48a, 48a, 48a meshed respectively with the rack portions 49b, 49b, 49b are fed, and the disk centering members 48, 48, 48 are each rotated in direction S1 shown in FIG. 40.

With the disk centering members 48, 48, 48 each rotated in the direction S1, the disk centering portions 48b, 48b, 48b are projected respectively from the communication holes 46b, 46b, 46b in the disk mount member 46 (see FIG. 43), and are gradually moved from the stand-by positions toward the centering positions for centering the disk form recording medium 1000, whereby the disk form recording medium 1000 is gradually moved by being pressed by the disk centering portions 48b, 48b, 48b so that the center axis thereof will coincide with the reference point 47a.

Figure 44:
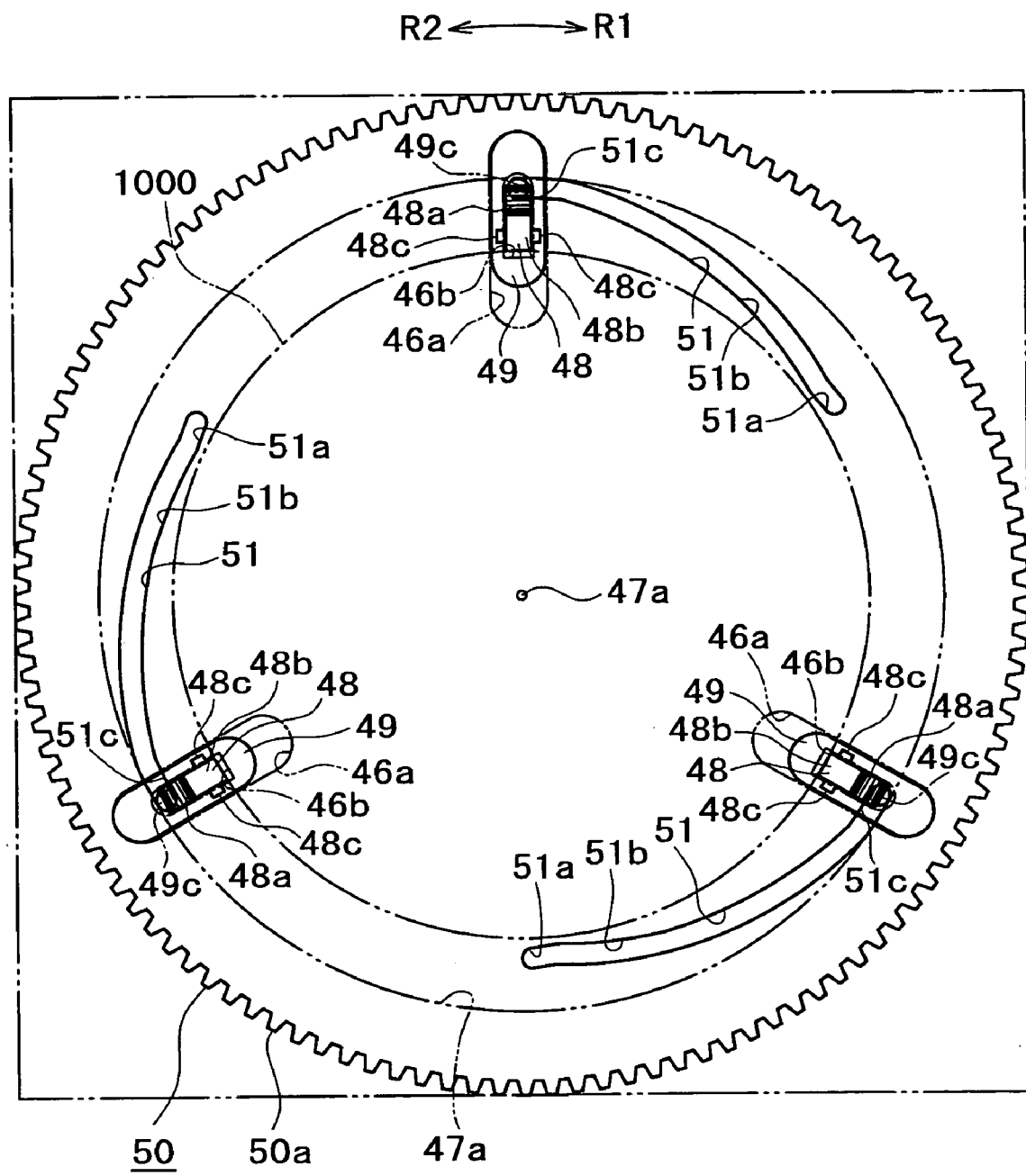
FIG. 44 is a plan view showing the condition where the centering of the disk form recording medium has been completed.
Figure 45:
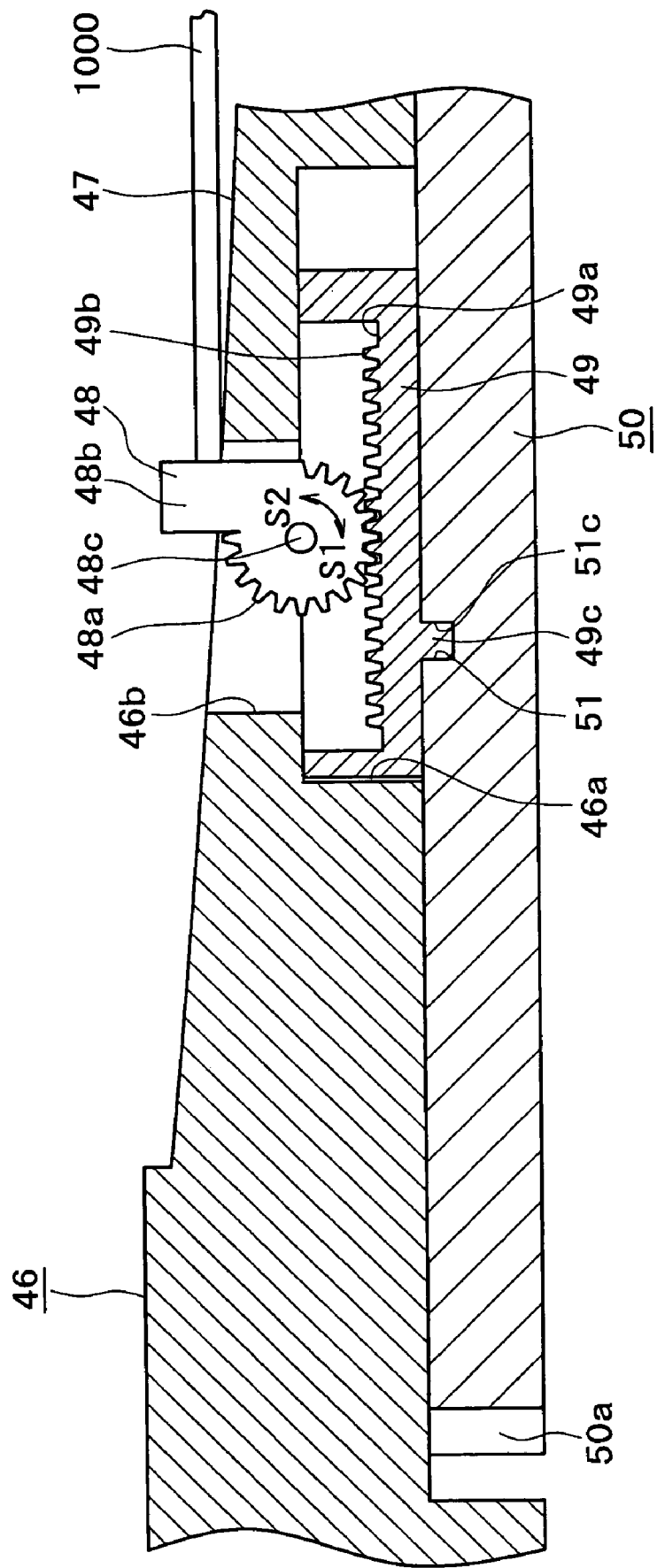
FIG. 45 is an enlarged sectional view showing the condition where the centering of the disk form recording medium has been completed.

With the cam member 50 further rotated in the direction R1 continuously, the slide shaft portions 49c, 49c, 49c are relatively moved respectively from the active portions 51b, 51b, 51b to the outside non-active portions 51a, 51a, 51a of the cam grooves 51, 51, 51, and the rack members 49, 49, 49 are moved to movement ends on the outer side (see FIG. 44). Therefore, the disk centering members 48, 48, 48 are further rotated in the direction S1, and the disk centering portions 48b, 48b, 48b are moved respectively to the centering positions (see FIG. 45).

At the time when the slide shaft portions 49c, 49c, 49c have been relatively moved respectively to the outside non-active portions 51a, 51a, 51a, the rotation of the driving motor is stopped, and the rotation of the cam member 50 is thereby stopped.

Upon the movement of the disk centering portions 48b, 48b, 48b respectively to the centering positions, the center axis of the disk form recording medium 1000 coincides with the reference point 47a, and, thus, the centering of the disk form recording medium 1000 is completed.

Subsequently, the disk form recording medium 1000 thus centered is taken out and fed to a predetermined chucking position by the taking-out and feeding mechanism, and is chucked by the disk chucking mechanism. With the disk form recording medium 1000 thus chucked, the disk form recording medium 1000 is rotated attendant on the rotation of the disk table, and the light pickup is driven to perform recording or reproduction of information signals onto or from the disk form recording medium 1000.

When the recording or reproduction of information signals is finished, the chucking of the disk form recording medium 1000 is canceled, and the disk form recording medium 1000 is fed to the disk mount surface 47 by the taking-out and feeding mechanism.

Figure 40:
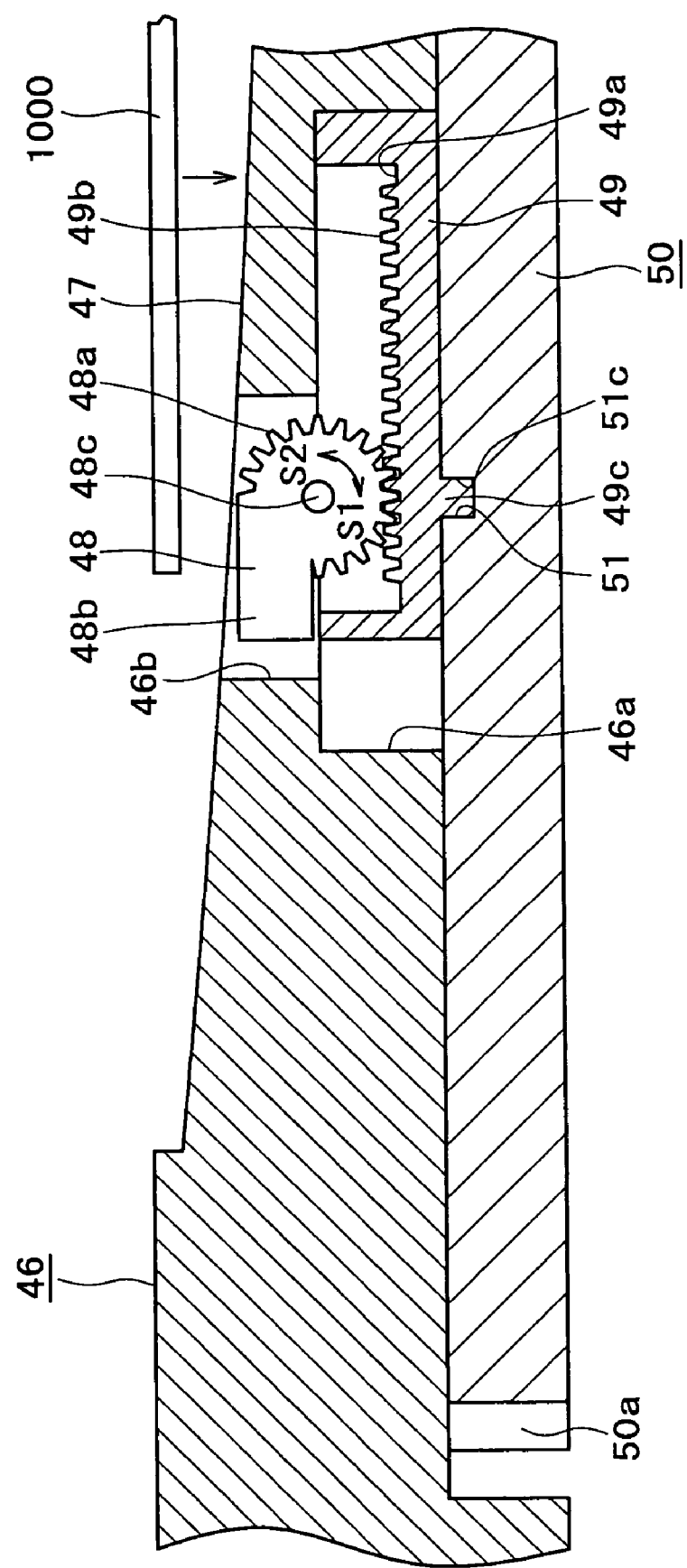
FIG. 40 is an enlarged sectional view showing the condition before the centering operation is performed.

Incidentally, when the centered disk form recording medium 1000 is taken out by the taking-out and feeding mechanism, the driving motor is rotated in a direction reverse to the above, and the portions are returned into the original conditions shown in FIGS. 39 and 40.

As has been described above, also in the disk centering system 1B, in the same manner as in the disk centering system 1, the disk centering portions 48b, 48b, 48b are moved from the stand-by positions toward the centering positions, and make contact with the outer circumferential edge of the disk form recording medium 1000 mounted on the disk mount surface 47, to thereby center the disk form recording medium 1000; therefore, the disk form recording medium 1000 can be mounted at an arbitrary position in the predetermined range on the disk mount surface 47, the operator can easily handle the disk form recording medium 1000, and the convenience in use of the disk centering system 1B can be enhanced.

In addition, since the centering positions are at an equal distance from the reference point 47a in the radial directions with the reference point 47a as a center and the disk centering portions 48b, 48b, 48b are moved from the standby positions to the centering positions to thereby center the disk form recording medium 1000, a disk form recording medium can be centered irrespectively of the size thereof.

Further, there is no fear of the trouble that the inner circumferential portion of the disk form recording medium 1000 might be scratched or damaged, which trouble would occur in the case where the disk form recording medium 1000 is mounted to a centering portion of a disk table provided with engagement claws.

Also in the disk centering system 1B, in the same manner as in the disk centering system 1, the disk mount surface is formed as a recessed curved surface, so that the lower surface, or recording surface, of the disk form recording medium can be prevented from being scratched.

Besides, in the disk centering system 1B, the disk centering portions 48b, 48b, 48b are projected upwards from the disk mount surface 47 when the movement of the disk centering portions 48b, 48b, 48b from the stand-by positions is started. Therefore, at the time of mounting the disk form recording medium 1000 on the disk mount surface 47, the disk form recording medium 1000 does not make contact with the disk centering portions 48b, 48b, 48b, and the disk form recording medium 1000 can be prevented from being scratched.

Furthermore, since the disk centering members 48, 48, 48 are turned synchronously, an efficient operation is performed and the mechanism can be simplified.

Incidentally, an example in which three disk centering members 48, 48, 48 and three rack members 49, 49, 49 are provided has been described above, the numbers of these members are not limited to three, and four or more disk centering members 48 and four or more rack members 49 may be provided in the radial directions with the reference point 47a as a center.

Next, a fourth embodiment of the disk centering system will be described (see FIGS. 46 to 55).

The disk centering system 1C is provided as a part of a disk drive (not shown). The disk drive is provided, for example, with a taking-out and feeding mechanism for taking out and feeding a disk form recording medium 1000, and a disk chucking mechanism for chucking the disk form recording medium 1000 taken out.

Figure 46:
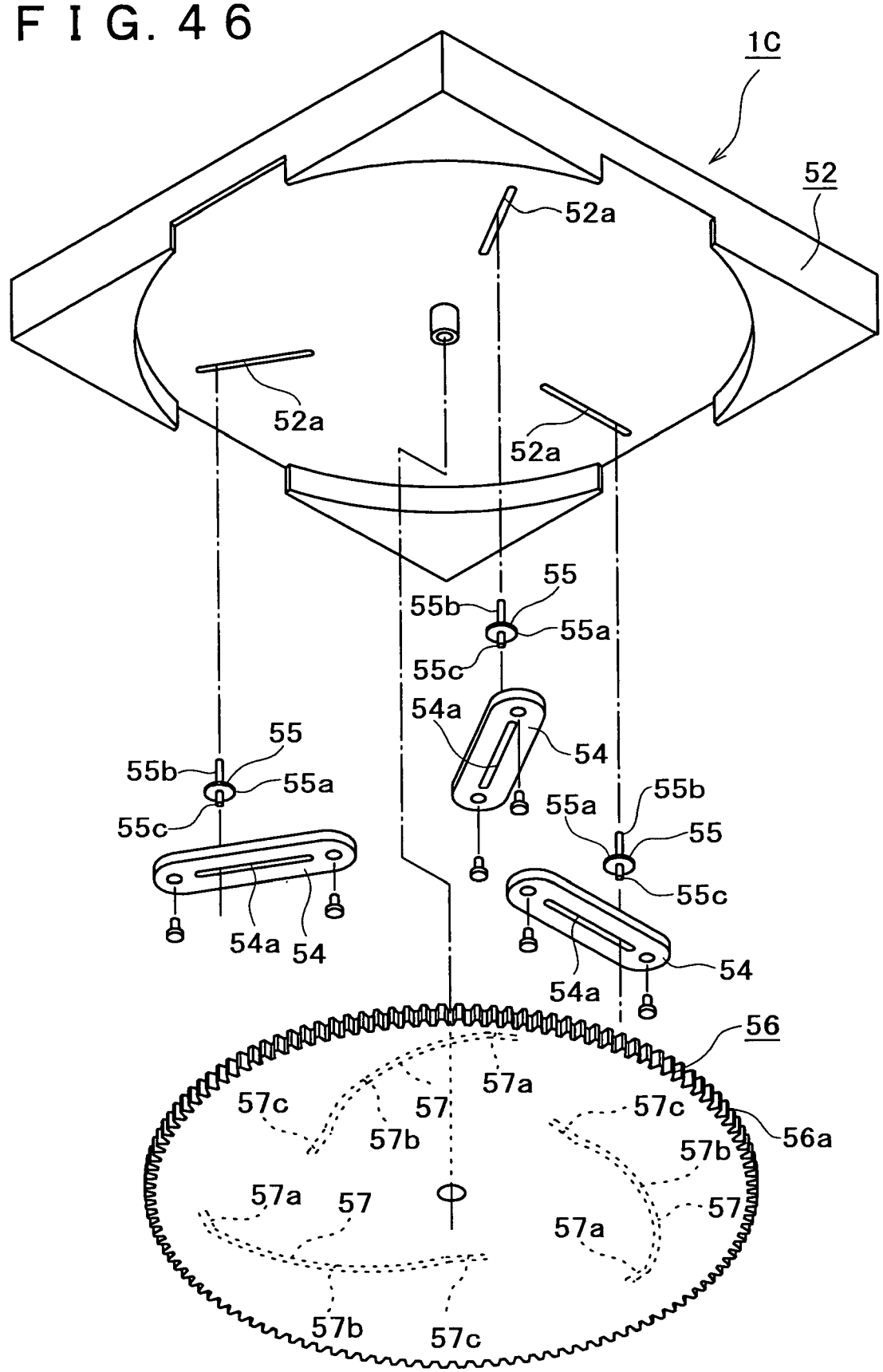
Figure 47:
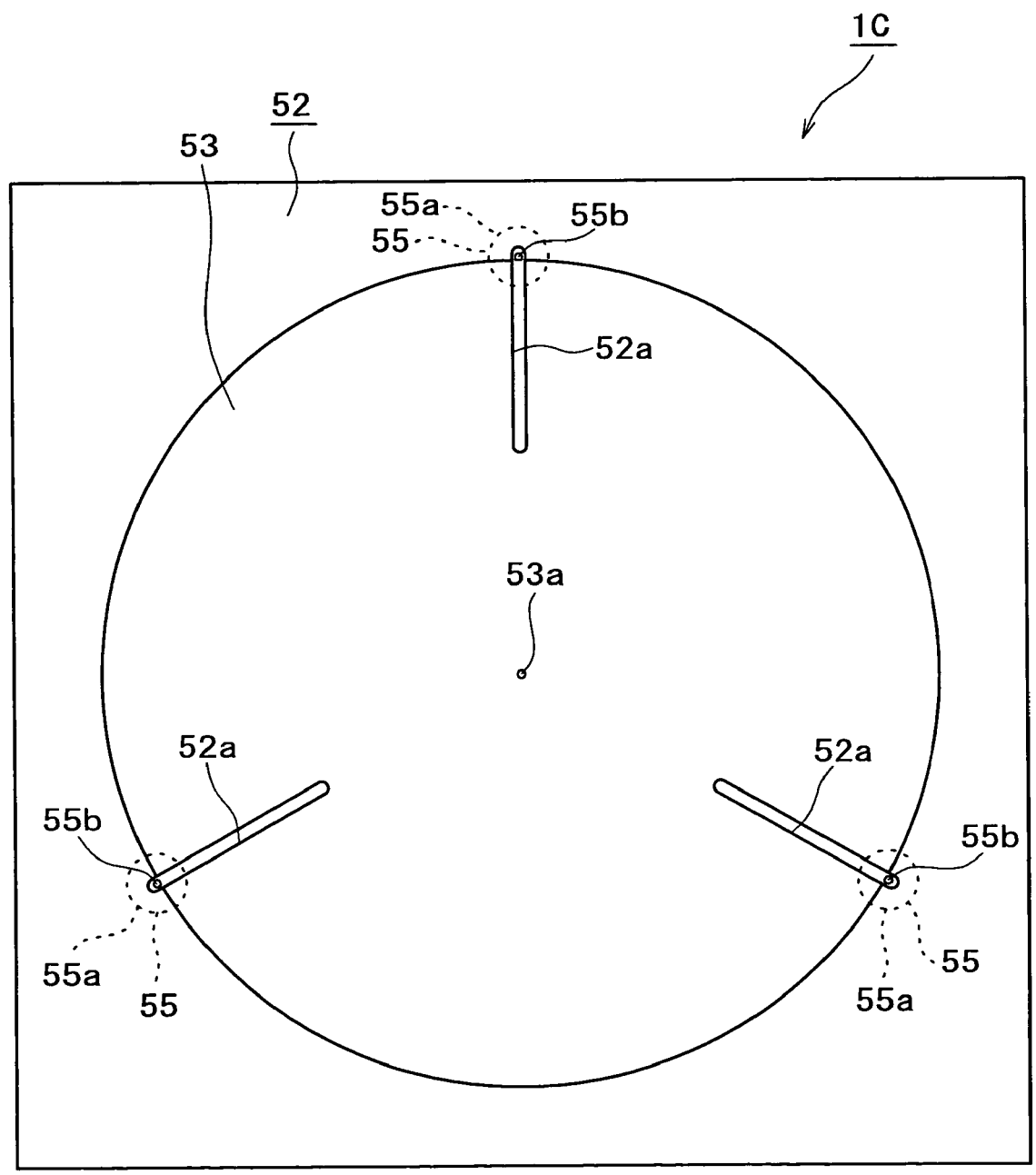
FIG. 47 is a plan view of the disk centering system.

The disk centering system 1C comprises predetermined members mounted to or supported on a disk mount member 52 (see FIGS. 46 and 47). The disk mount member 52 is formed in a substantially flat plate-like shape, and is provided at its upper surface with a disk mount surface 53 formed as a gentle recessed curved surface, for example, a gentle spherical surface (see FIGS. 47 and 48). The disk mount surface is formed, for example, to be circular in plan view, and the center point thereof is formed as a reference point 53a located at the lowermost position.

Figure 48:
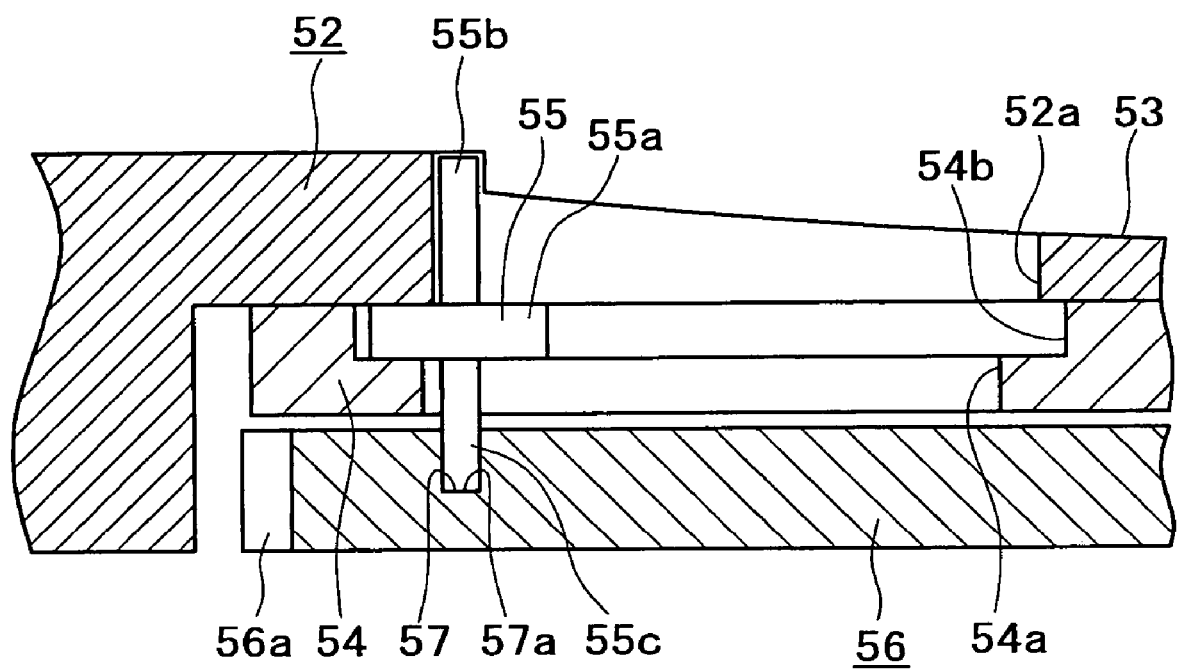
FIG. 48 is an enlarged sectional view of an essential part of the disk centering system.

The disk mount surface 53 of the disk mount member 52 is provided with guide holes 52a, 52a, 52a penetrating vertically through the disk mount member 52 (see FIGS. 46 to 48). The guide holes 52a, 52a, 52a are located at regular intervals along the circumferential direction, and are formed to be elongate in radial directions at positions at an equal distance from the reference point 53a in the radial directions.

Support members 54, 54, 54 are attached to the lower surface of the disk mount member 52 (see FIGS. 46 and 48). The support member 54 is formed in a plate-like shape elongate in one direction, and is provided with a pin support hole 54a extending in the longitudinal direction thereof. The pin support hole 54a is formed to be equal in length to the guide hole 52a in the disk mount member 52. The upper surface of the support member 54 is provided with a shallow slide recessed portion 54b opened to the upper side. The slide recessed portion 54b is formed to be elongate in the extending direction of the pin support hole 54a and to be larger in width than the pin support hole 54a.

The support members 54, 54, 54 are attached to the lower surface of the disk mount member 52 by, for example, screwing in the condition where the pin support holes 54a, 54a, 54a coincide with the guide holes 52a, 52a, 52a in plan view.

Disk centering members 55, 55, 55 are movably supported on the disk mount member 52. The disk centering member 55 includes a slide portion 55a formed in a circular disk shape, a disk centering portion 55b projected upwards from a central portion of the slide portion 55a, and an acted pin 55c projected downwards from a central portion of the slide portion 55a. The disk centering portion 55b and the acted pin 55c are formed in a small-diameter shaft-like shape.

The disk centering members 55, 55, 55 are movably supported on the disk mount member 52 in the condition where the slide portions 55a, 55a, 55a are disposed respectively in the slide recessed portions 54b, 54b, 54b of the support members 54, 54, 54. In the condition where the disk centering members 55, 55, 55 are supported on the disk mount member 52, the disk centering portions 55b, 55b, 55b are projected upwards respectively through the guide holes 52a, 52a, 52a of the disk mount member 52, whereas the acted pins 55c, 55c, 55c are inserted respectively in the pin support holes 54a, 54a, 54a of the support members 54, 54, 54 and projected downwards.

A cam member 56 is rotatably supported on the lower surface of the disk mount member 52 (see FIGS. 46 and 48). The cam member 56 is formed in a circular disk shape, and the upper surface thereof is provided with cam grooves 57, 57, 57 at regular intervals along the circumferential direction. The cam groove 57 includes an outside non-active portion 57a, an active portion 57b displaced toward a central portion of the cam member 56 as one goes away from the outside non-active portion 57a, and an inside non-active portion 57c continuous with the active portion 57b. The outside non-active portion 57a and the inside non-active portion 57c are each formed in a circular arc shape with the center of rotation of the cam member 56 as a center.

A circumferential portion of the cam member 56 is provided as a gear portion 56a.

The cam member 56 is rotatably supported on the disk mount member 52 through the support shaft 26, in the same manner as in the disk centering system 1, for example.

In the condition where the cam member 56 is supported on the disk mount member 52, the acted pins 55c, 55c, 55c of the disk centering members 55, 55, 55 are slidably engaged respectively in the cam grooves 57, 57, 57 of the cam member 56.

Figure 49:
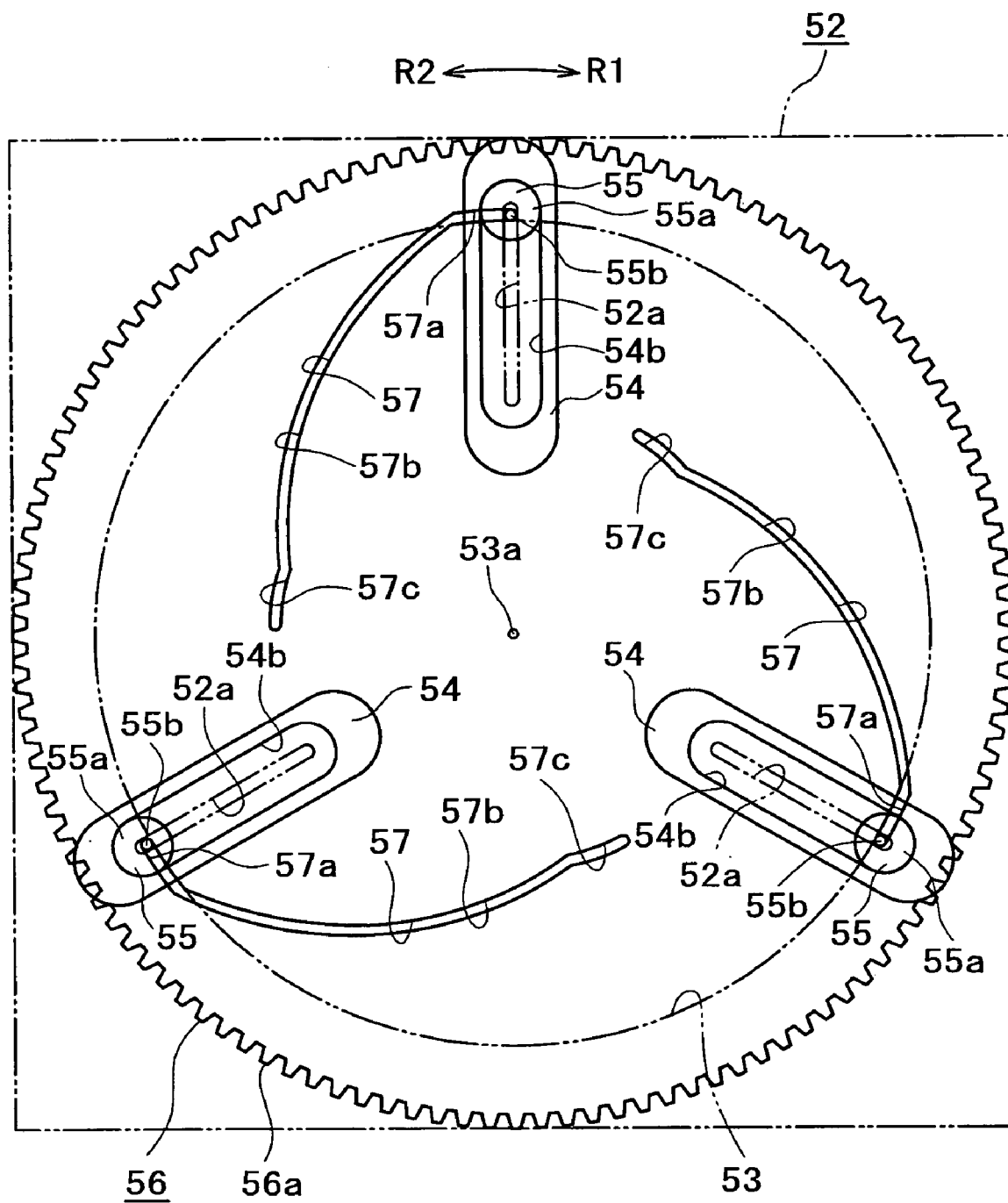

The cam member 56 is rotated by a drive force transmitted from a driving motor (not shown) to the gear portion 56a, in a direction according to the rotating direction of the driving motor, i.e., in direction R1 or direction R2 shown in FIG. 49.

Now, a centering operation of the disk centering system 1C will be described below (see FIGS. 49 to 55).

First, the states of portions before centering of a disk form recording medium 1000 is performed will be described (see FIGS. 49 and 50).

The acted pins 55c, 55c, 55c of the disk centering members 55, 55, 55 are in engagement respectively with the outside non-active portions 57a, 57a, 57a of the cam grooves 57, 57, 57 (see FIG. 49). Therefore, as shown in FIG. 50, the disk centering portions 55b, 55b, 55b of the disk centering members 55, 55, 55 are located at movement ends on the outer side in the moving range, i.e., on the side of spacing away from the reference point 53a.

Figure 51:
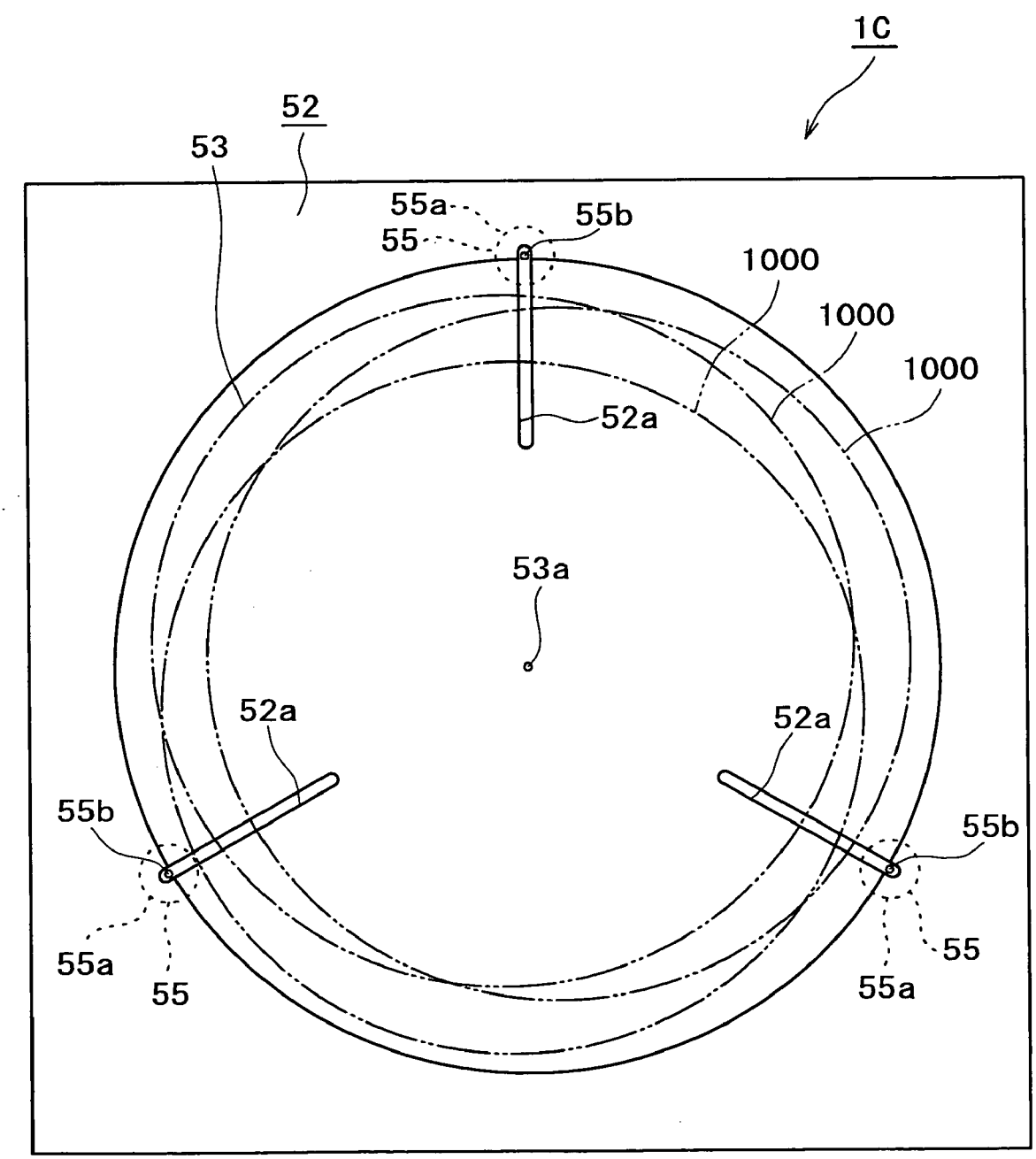
FIG. 51 is a schematic plan view showing the positions where a disk form recording medium can be mounted onto a disk mount surface.

When the disk form recording medium 1000 is mounted on the disk mount surface 53 of the disk mount member 52 and an operating button (not shown) is operated, the driving motor is rotated, whereby the cam member 56 is rotated in the direction R1 shown in FIG. 49. In this instance, as shown in FIG. 51, the disk form recording medium 1000 can be mounted at an arbitrary position, provided that the whole part thereof is located on the inside of the disk centering portions 55b, 55b, 55b of the disk centering members 55, 55, 55.

Figure 52:
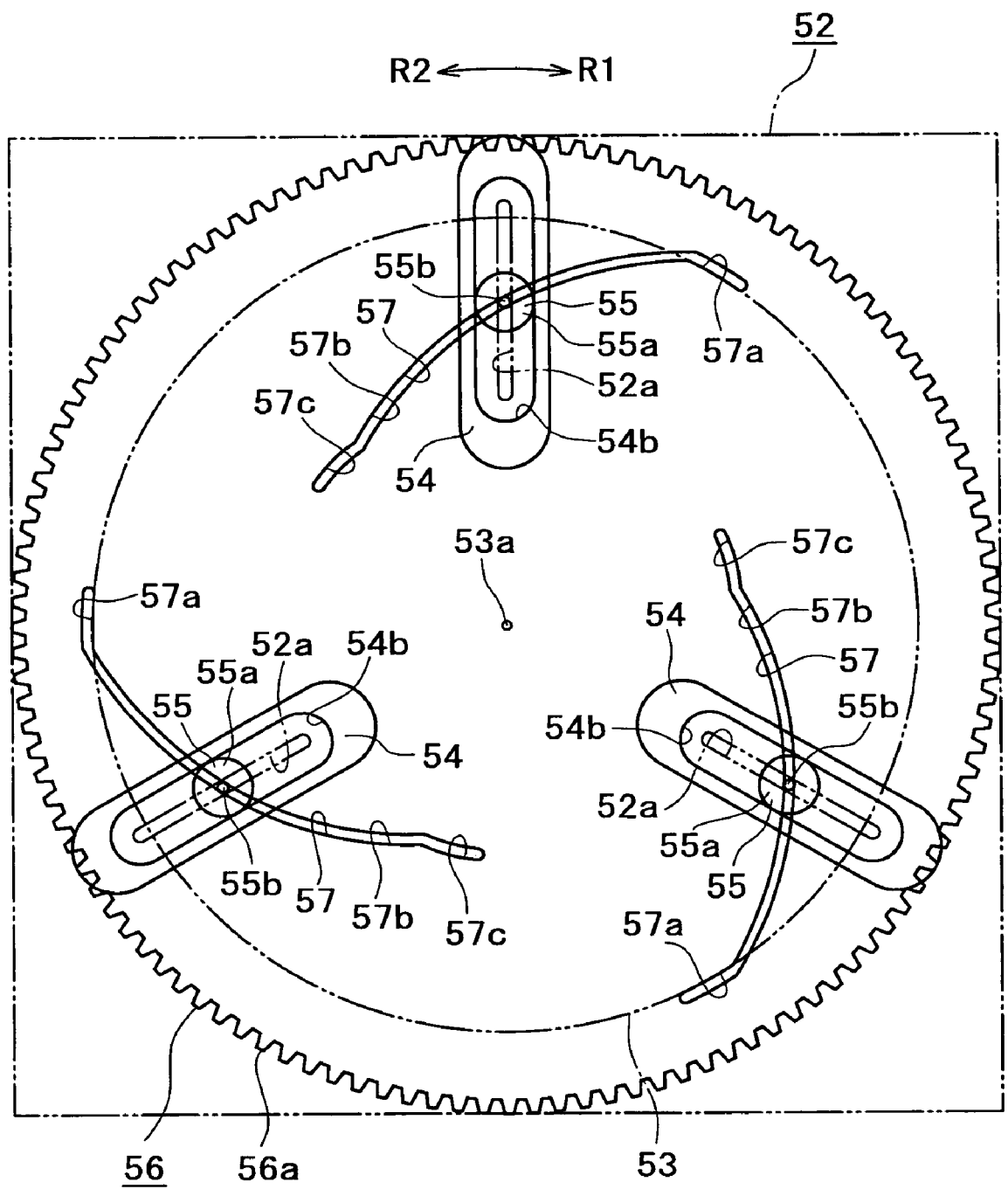
FIG. 52 is a plan view showing the condition where the centering operation has been started and acted pins of disk centering members are engaged with active portions of cam grooves of cam members.
Figure 53:
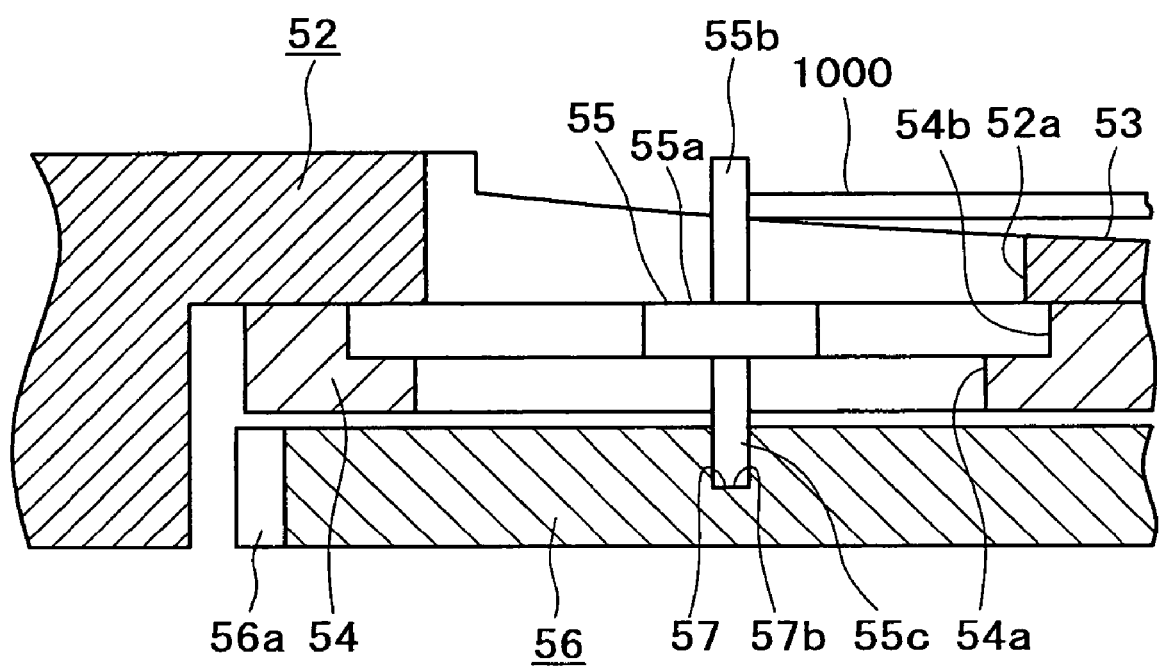
FIG. 53 is an enlarged sectional view showing the condition where the centering operation has been started and a centering member is being moved toward a reference point.

With the cam member 56 thus rotated in the direction R1, the acted pins 55c, 55c, 55c of the disk centering members 55, 55, 55 are relatively moved respectively from the outside non-active portions 57a, 57a, 57a toward the active portions 57b, 57b, 57b of the cam grooves 57, 57, 57 of the cam member 56 (see FIG. 52). Therefore, the disk centering members 55, 55, 55 are gradually moved toward the inner side while being guided by the guide holes 52a, 52a, 52a in the disk mount member 52, the disk centering portions 55b, 55b, 55b are moved respectively from stand-by positions toward centering positions for centering the disk form recording medium 1000, and the disk form recording medium 1000 is gradually moved by being pressed by the disk centering portions 55b, 55b, 55b so that the center shaft thereof will coincide with the reference point 53a (see FIG. 53).

Figure 54:
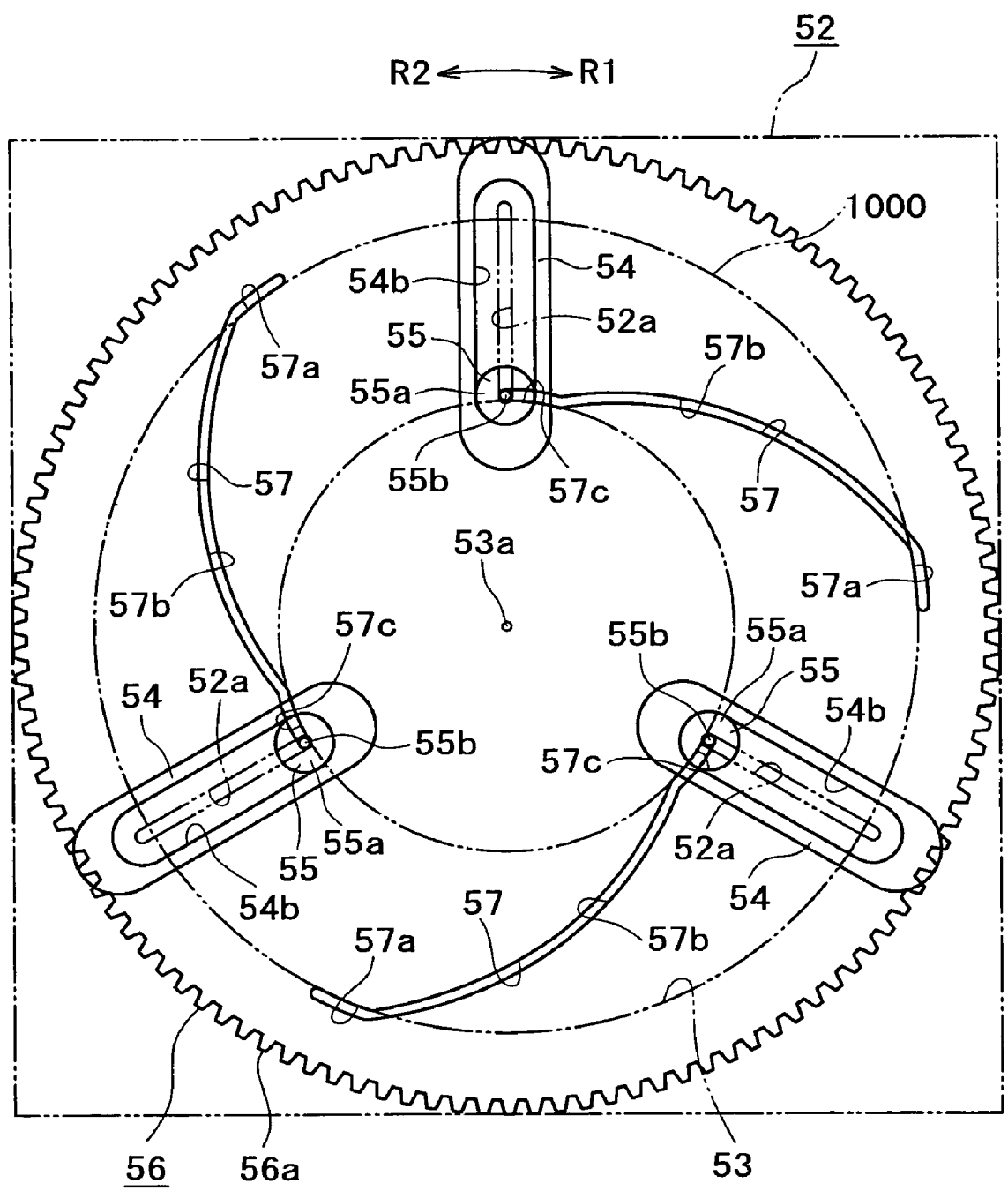
FIG. 54 is a plan view showing the condition where the centering of the disk form recording medium has been completed.
Figure 55:
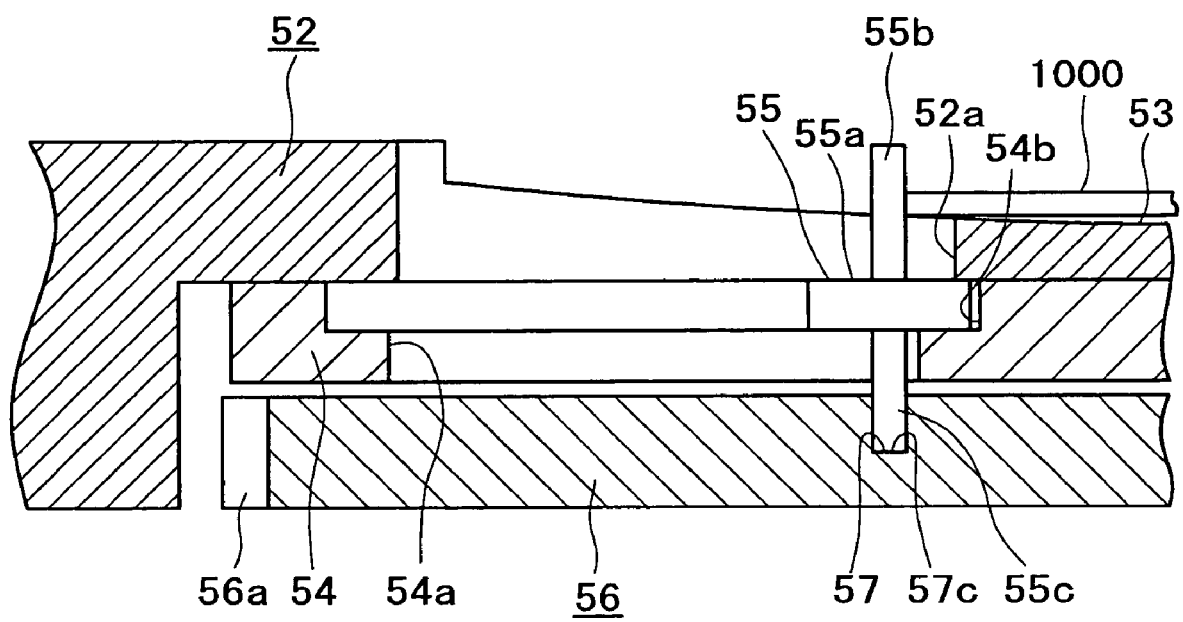
FIG. 55 is an enlarged sectional view showing the condition where the centering of the disk form recording medium has been completed.

When the cam member 56 is further rotated in the direction R1 continuously, the acted pins 55c, 55c, 55c are relatively moved respectively from the active portions 57b, 57b, 57b to the inside non-active portions 57c, 57c, 57c of the cam grooves 57, 57, 57, and the disk centering portions 55b, 55b, 55b are moved respectively to the centering positions (see FIGS. 54 and 55).

At the time when the acted pins 55c, 55c, 55c have been relatively moved respectively to the inside non-active portions 57c, 57c, 57c, the rotation of the driving motor is stopped, and the rotation of the cam member 56 is stopped.

When the disk centering portions 55b, 55b, 55b have been moved respectively to the centering positions, the center axis of the disk form recording medium 1000 coincides with the reference point 53a, and, thus, the centering of the disk form recording medium 1000 is completed.

Subsequently, the disk form recording medium 1000 thus centered is taken out and fed to a predetermined chucking position by the taking-out and feeding mechanism, and is chucked by the disk chucking mechanism. Upon the chucking of the disk form recording medium 1000, the disk form recording medium 1000 is rotated attendant on the rotation of the disk table, and a light pickup is driven to perform recording or reproduction of information signals onto or from the disk form recording medium 1000.

When the recording or reproduction of information signals is finished, the chucking of the disk form recording medium 1000 is canceled, and the disk form recording medium 1000 is fed to the disk mount surface 53 by the taking-out and feeding mechanism.

Figure 50:
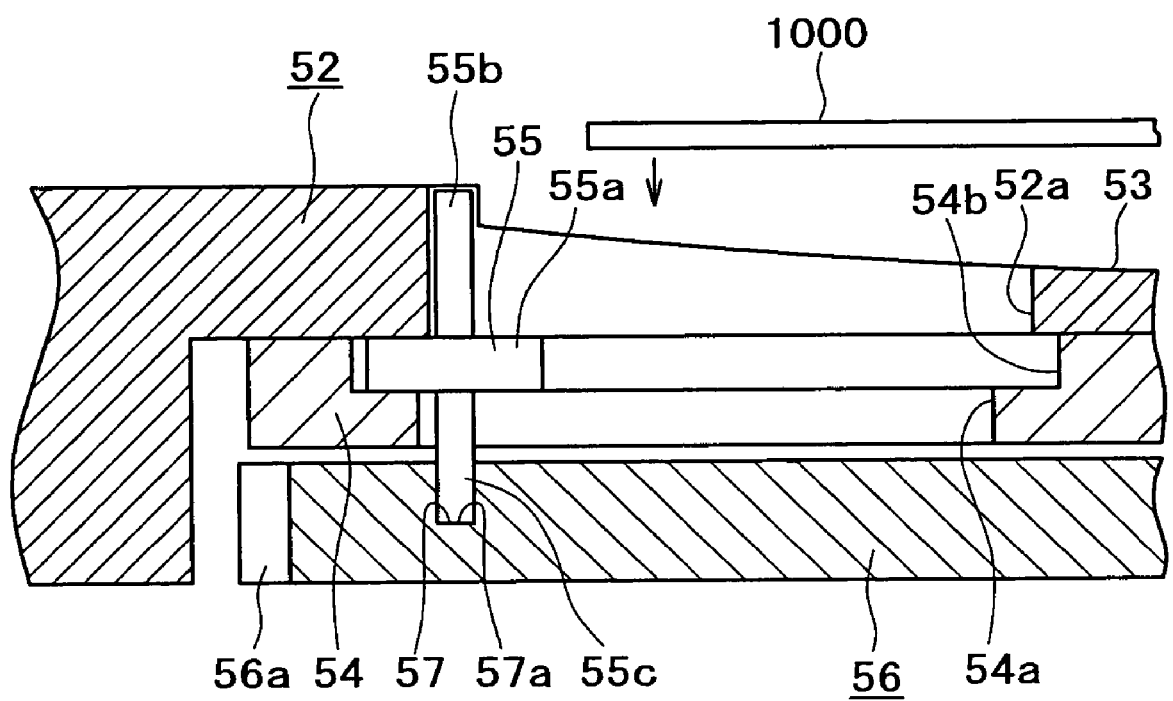
FIG. 50 is an enlarged sectional view showing the condition before the centering operation is performed.

Incidentally, when the centered disk form recording medium 1000 is taken out by the taking-out and feeding mechanism, the driving motor is rotated in a direction reverse to the above, and the portions are returned to the original states thereof as shown in FIGS. 49 and 50.

As has been described above, also in the disk centering system 1C, in the same manner as in the disk centering system 1, the disk centering portions 55b, 55b, 55b are moved from the stand-by position toward the centering positions to make contact with the outer circumferential edge of the disk form recording medium 1000 mounted on the disk mount surface 53, thereby centering the disk form recording medium 1000; therefore, the disk form recording medium 1000 can be mounted at an arbitrary position in a predetermined range on the disk mount surface 53, the user can easily handle the disk form recording medium 1000, and the convenience in use of the disk centering system 1C can be enhanced.

In addition, since the centering positions are located at an equal distance from the reference point 53a in the radial direction with the reference point 53a as a center and the disk centering portions 55b, 55b, 55b are moved from the stand-by positions to the centering positions to thereby center the disk form recording medium 1000, a disk form recording medium can be centered irrespectively of the size thereof.

Further, there is no fear of the trouble that an inner circumferential portion of the disk form recording medium 1000 might be scratched or damaged, which trouble would occur in the case where the disk form recording medium 1000 is mounted to a centering portion of a disk table provided with engagement claws.

In addition, since the disk centering portions 55b, 55b, 55b are moved from the stand-by positions to the centering positions through rectilinear motion, the disk form recording medium 1000 can be centered swiftly.

Also in the disk centering system 1C, in the same manner as in the disk centering system 1, the disk mount surface 53 is formed as a recessed curved surface, so that the lower surface, or recording surface, of the disk form recording medium 1000 can be prevented from being scratched.

Besides, since the disk centering members 55, 55, 55 are moved synchronously, an efficient operation is performed and the mechanism can be simplified.

Incidentally, an example in which three support members 54, 54, 54 and three disk centering members 55, 55, 55 are provided has been described above, the numbers of these members are not limited to three, and four or more support members 54 and four or more disk centering members 55 may be provided in radial directions with the reference point 53a as a center.

The specific shapes and structures of the members or portions shown in the embodiments described above are mere examples of embodiment in carrying out the present invention, and are not to be construed as limitative of the technical scope of the present invention.

What is claimed is:

1. A disk centering system comprising:
    a disk mount portion on which a disk form recording medium is mounted;
    at least three disk centering portions for pressing an outer circumferential edge of said disk form recording medium, said disk centering portions being disposed in radial directions, with a reference point set at an arbitrary position of said disk mount portion as a center, wherein each of said disk centering portions being movable between a centering position at which said disk centering portion makes contact with said outer circumferential edge of said disk form recording medium mounted on a disk mount surface so that a center of rotation of said disk form recording medium substantially coincides with said reference point and a stand-by position located on an outer side of said centering position with reference to said reference point; and
    wherein said disk mount surface is formed as a recessed curved surface.

2. The disk centering system as set forth in claim 1, wherein said centering positions are spaced by an equal distance from said reference point in the radial directions with said reference point as a center.

3. The disk centering system as set forth in claim 1, wherein said disk centering portions are moved between said centering positions and said stand-by position by rotating said disk centering portions.

4. The disk centering system as set forth in claim 1, wherein said disk centering portions are moved between said centering positions and said stand-by positions by moving said disk centering portions rectilinearly in said radial directions.

5. The disk centering system as set forth in claim 1, wherein:
    said disk centering portions are so supported as to be movable in substantially the same direction as a center axis of said disk form recording medium mounted on said disk mount surface, and
    said disk centering portions are retracted into an inside of said disk mount portion when located at said stand-by positions and are projected from said disk mount surface when moved from said stand-by positions toward said centering positions.

6. The disk centering system as set forth in claim 1, wherein said plurality of disk centering portions are moved synchronously with each other.

7. The disk centering system as set forth in claim 1, further comprising:
    a disk lift-up portion supported on said disk mount portion so as to be movable in a substantially a same direction as a center axis of said disk form recording medium mounted on said disk mount surface, said disk lift-up portion lifting up said centered disk form recording medium to a chucking position for chucking of said disk form recording medium by being moved in a direction for spacing away from said disk mount surface.

8. The disk centering system as set forth in claim 7, wherein said disk lift-up portion is moved upwards together with said disk centering portions so as thereby to lift up said centered disk form recording medium to said chucking position for chucking of said disk form recording medium.

9. The disk centering system as set forth in claim 8, wherein said disk lift-up portion and said disk centering portions are formed as one body with each other.

10. The disk centering system as set forth in claim 7, which is provided in a disk drive comprising a disk chucking mechanism for chucking said disk form recording medium at said chucking position, wherein said disk lift-up portion is moved downwards when the chucking of said disk form recording medium by said disk chucking mechanism at said chucking position is canceled.

11. A recording and/or reproduction system comprising:
    a disk mount portion on which a disk form recording medium is mounted;
    at least three disk centering portions for pressing an outer circumferential edge of said disk form recording medium, said disk centering portions being provided in radial directions, with a reference point set at an arbitrary position of said disk mount portion as a center, and each of said disk centering portions being movable between a centering position at which said disk centering portion makes contact with said outer circumferential edge of said disk form recording medium mounted on a disk mount surface so that a center of rotation of said disk form recording medium substantially coincides with said reference point and a stand-by position located on an outer side of said centering position with reference to said reference point;
    wherein said disk mount surface is formed as a recessed curved surface, and;
    a recording and/or reproduction portion for recording and/or reproduction of information onto and/or from said disk form recording medium.

12. The recording and/or reproduction system as set forth in claim 11, further comprising:
- a disk chucking mechanism for chucking said disk form recording medium at a chucking position;
- a disk lift-up portion supported on said disk mount portion so as to be movable in a substantially same direction as a center axis of said disk form recording medium mounted on a disk mount surface, said disk lift-up portion capable of feeding said disk form recording medium between said centering position and said chucking position; and wherein said recording and/or reproduction portion performs recording and/or reproduction of information onto and/or from said disk form recording medium chucked at said chucking position.

* * * * *